March 26, 1968  W. P. HIDDEN ET AL  3,374,616

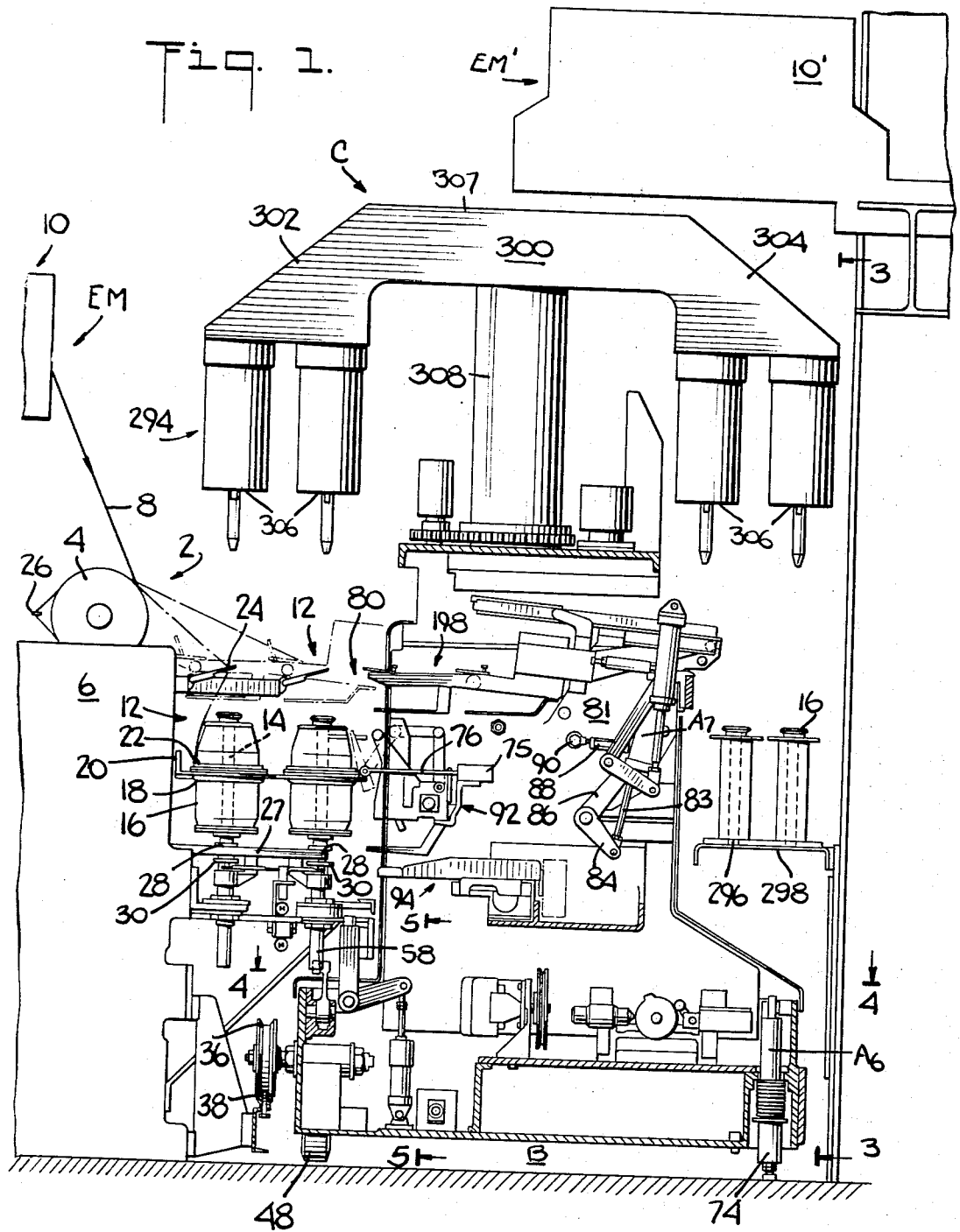

DOFFING MACHINE

Filed Sept. 30, 1965  29 Sheets-Sheet 2

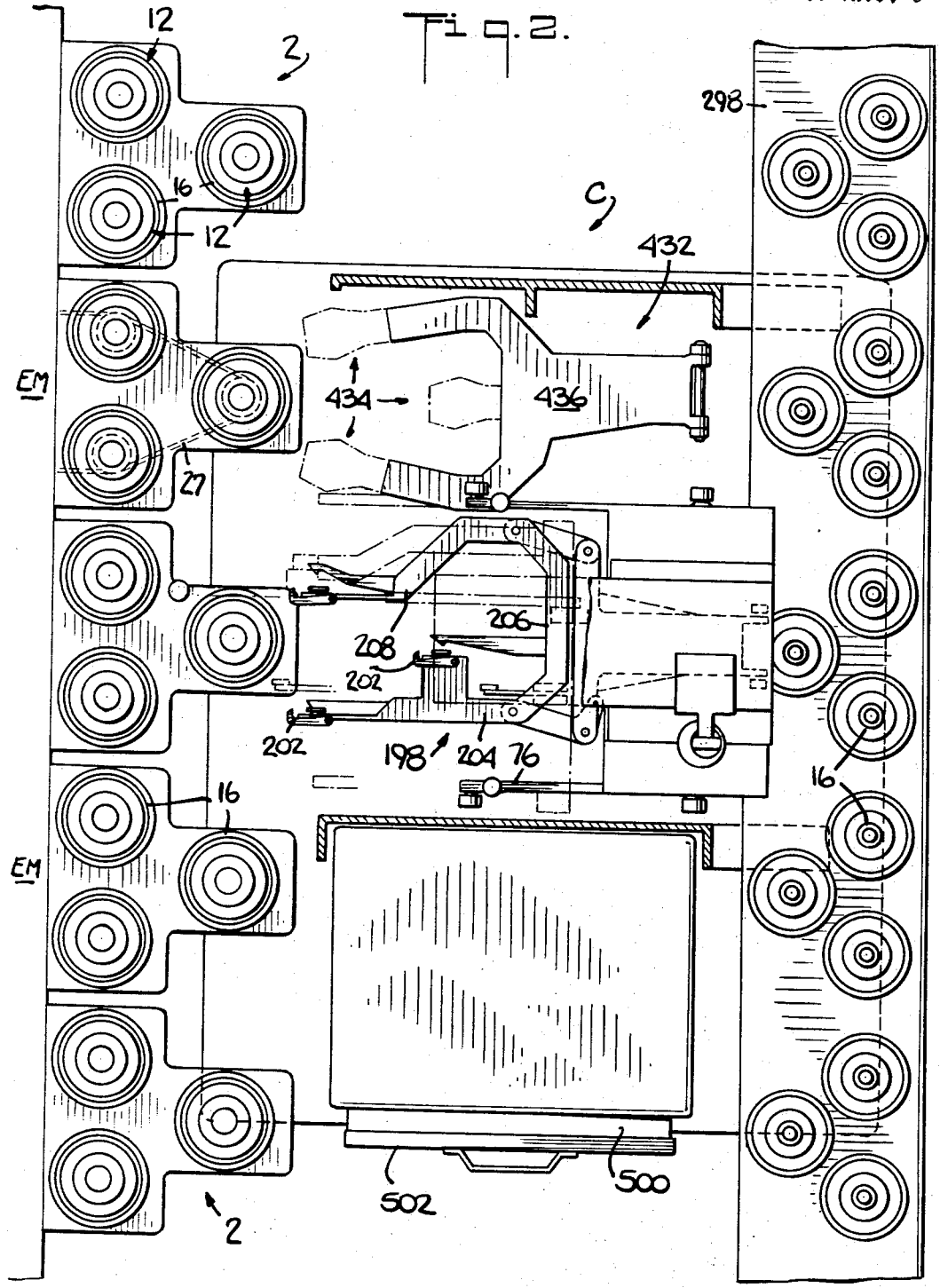

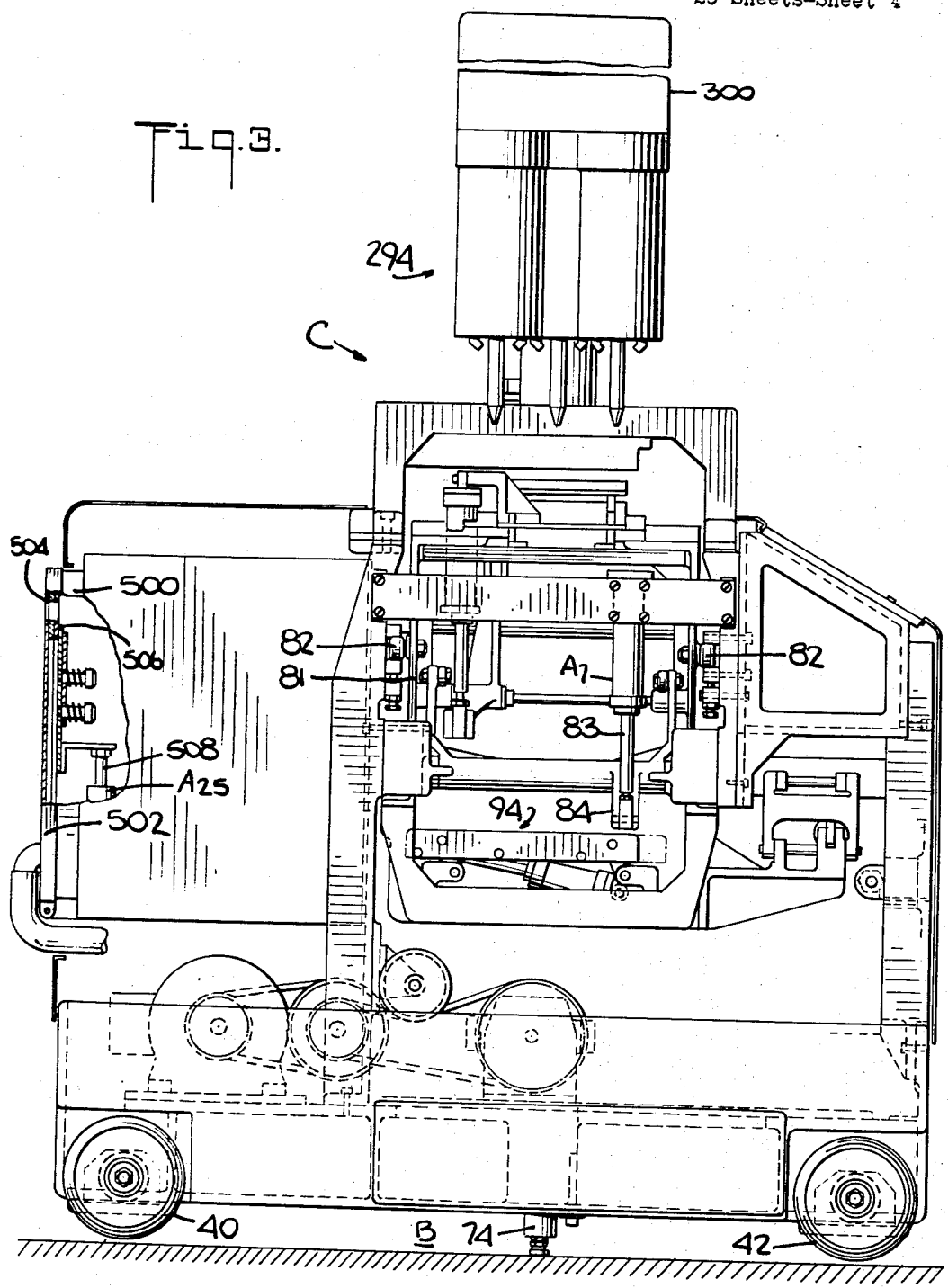

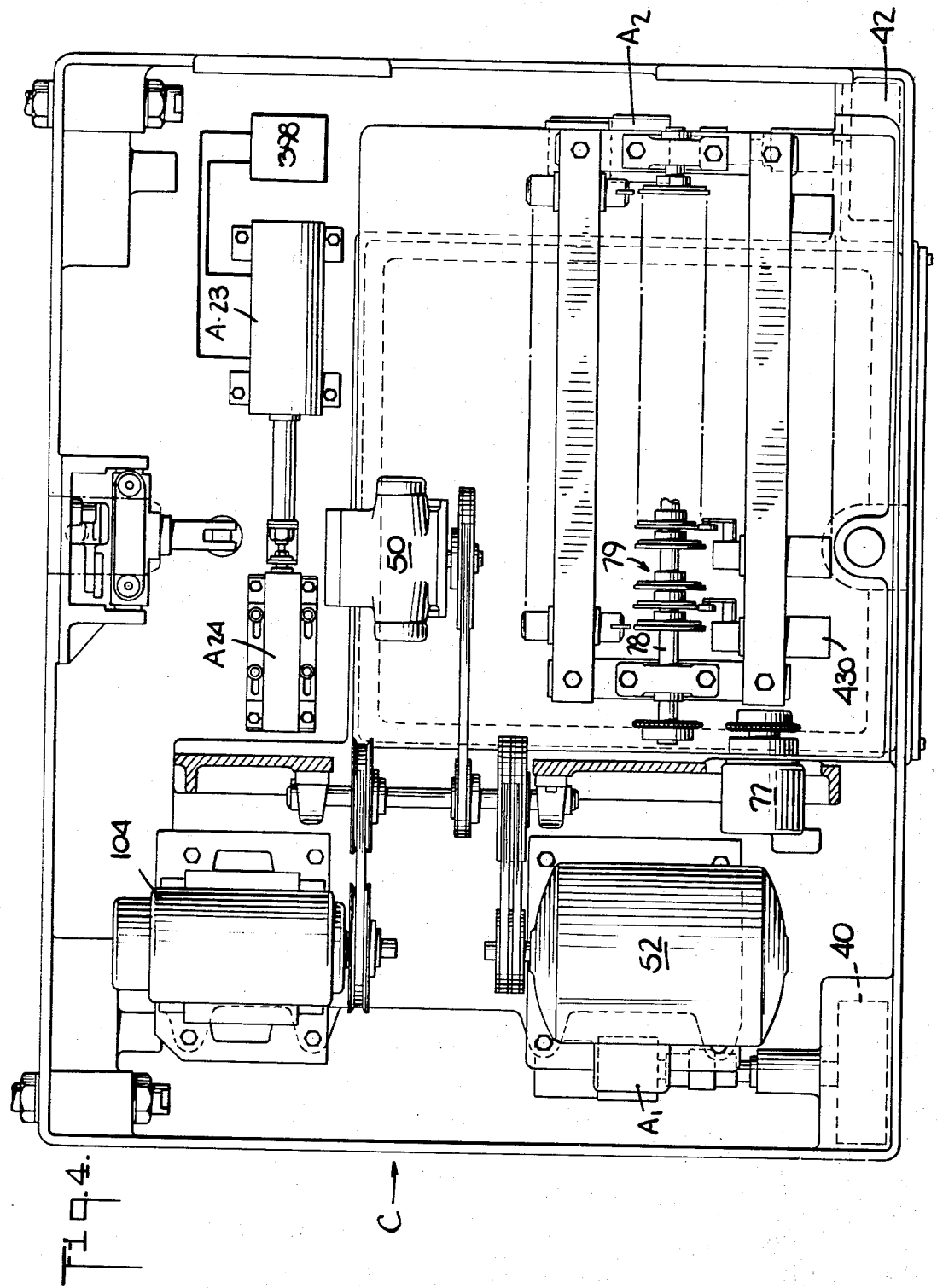

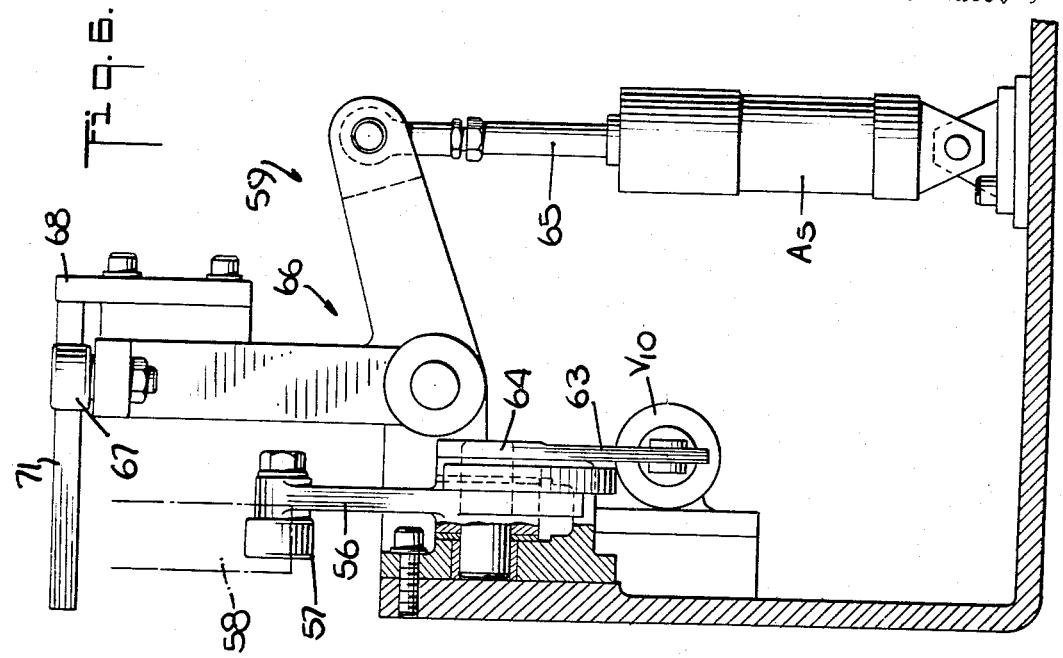
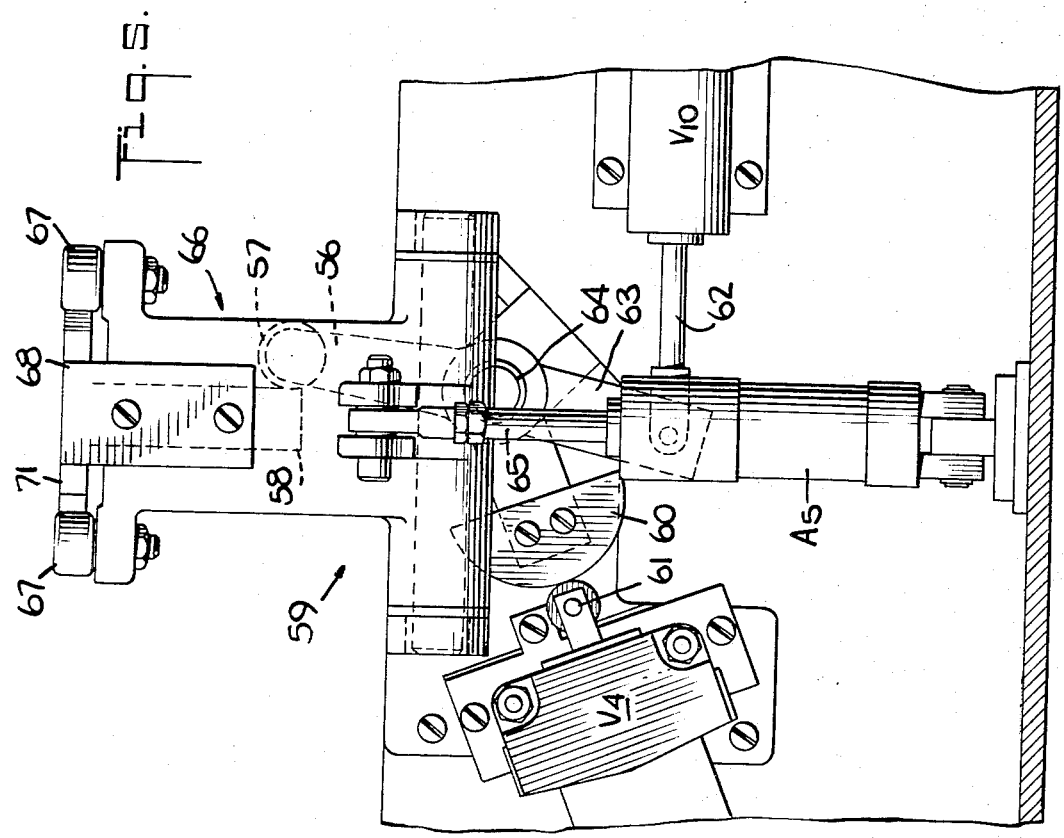

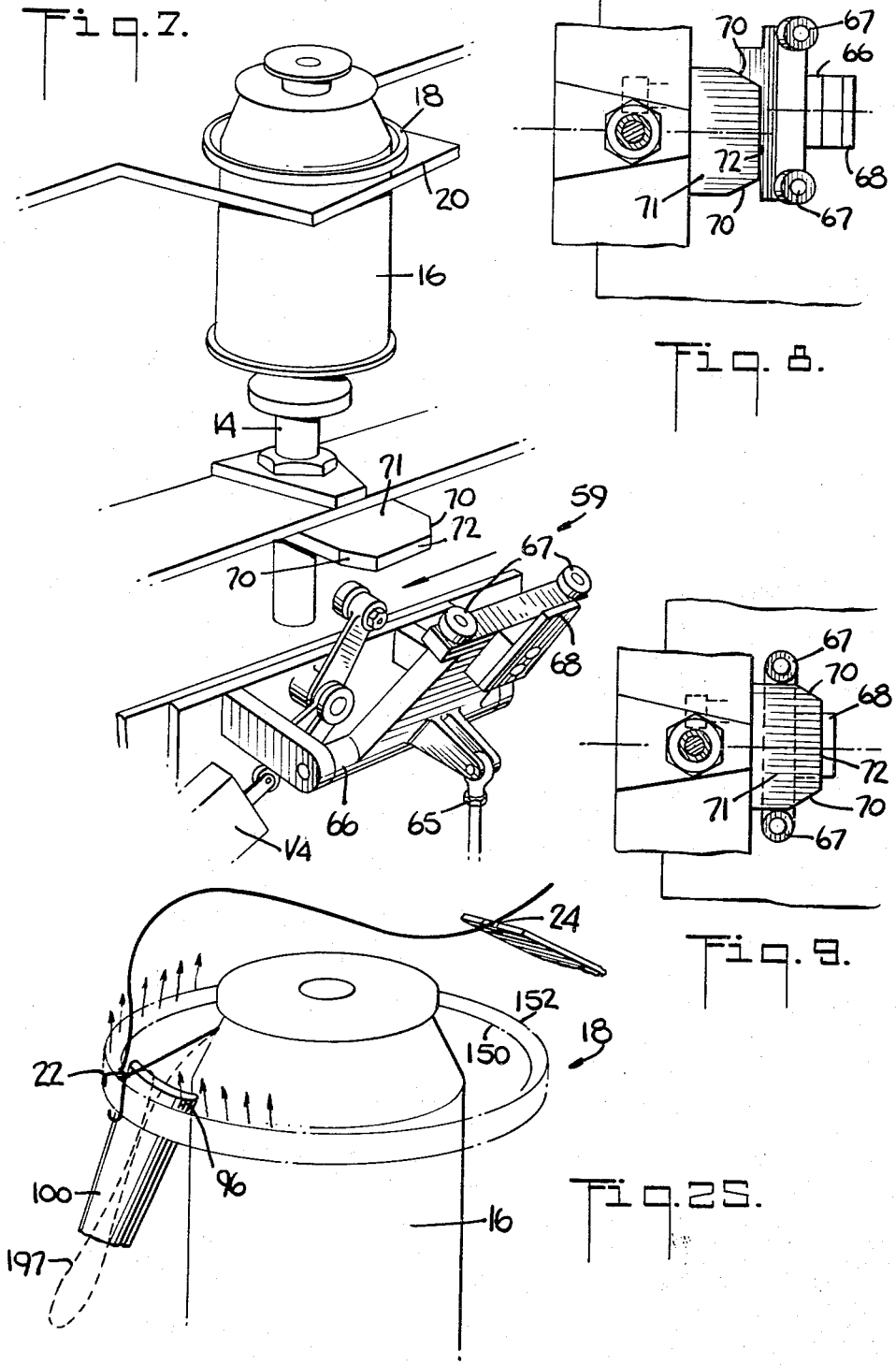

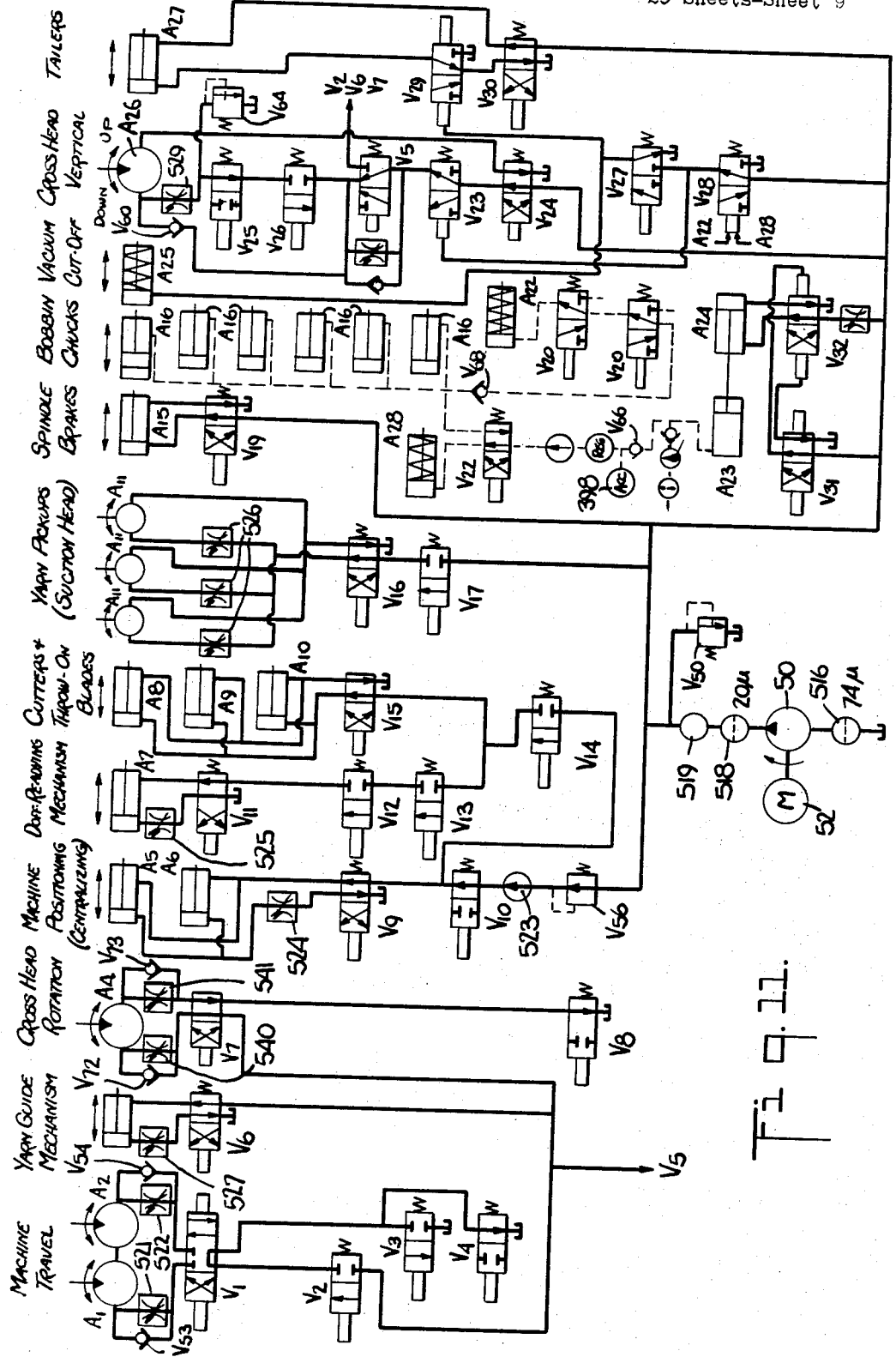

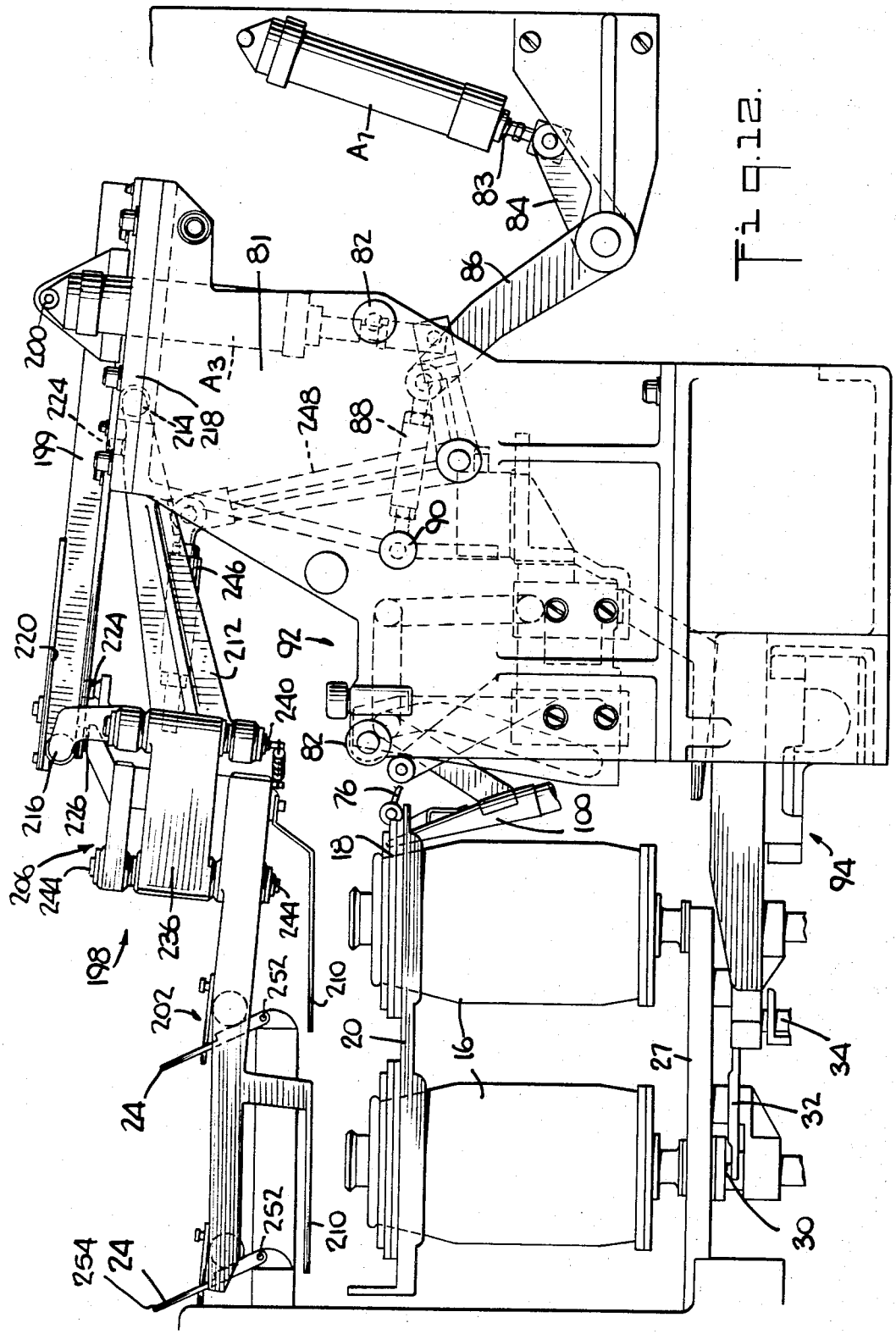

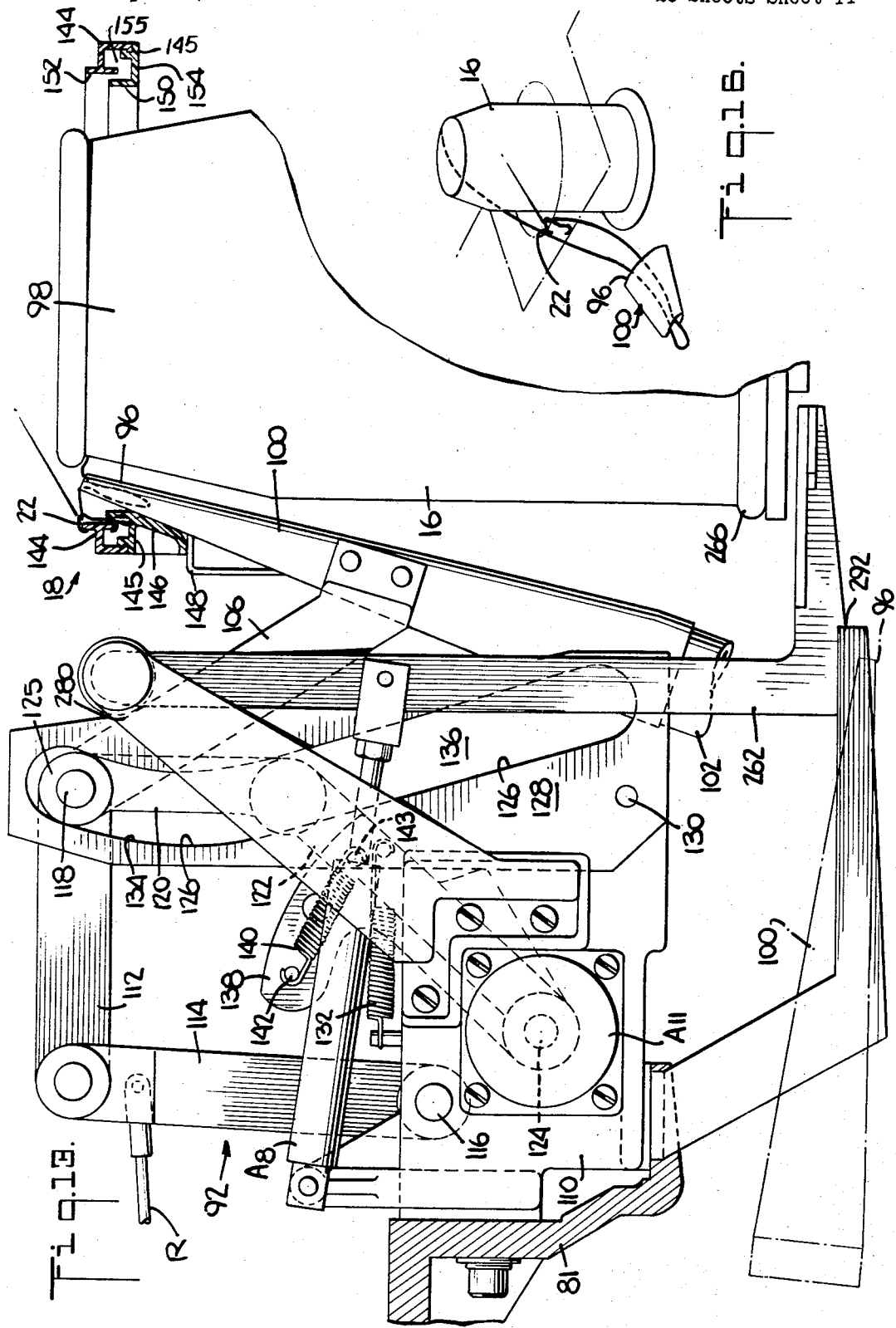

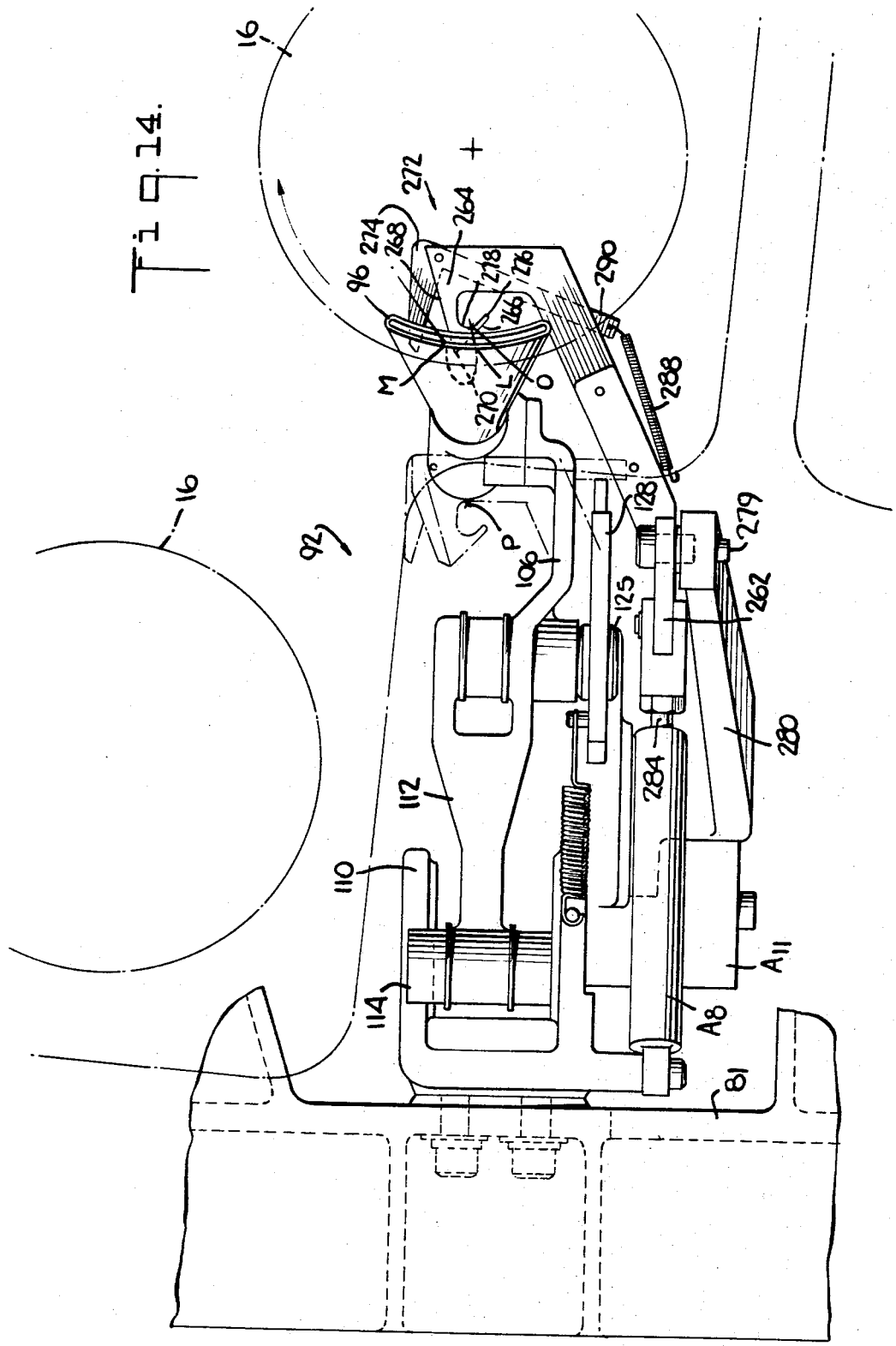

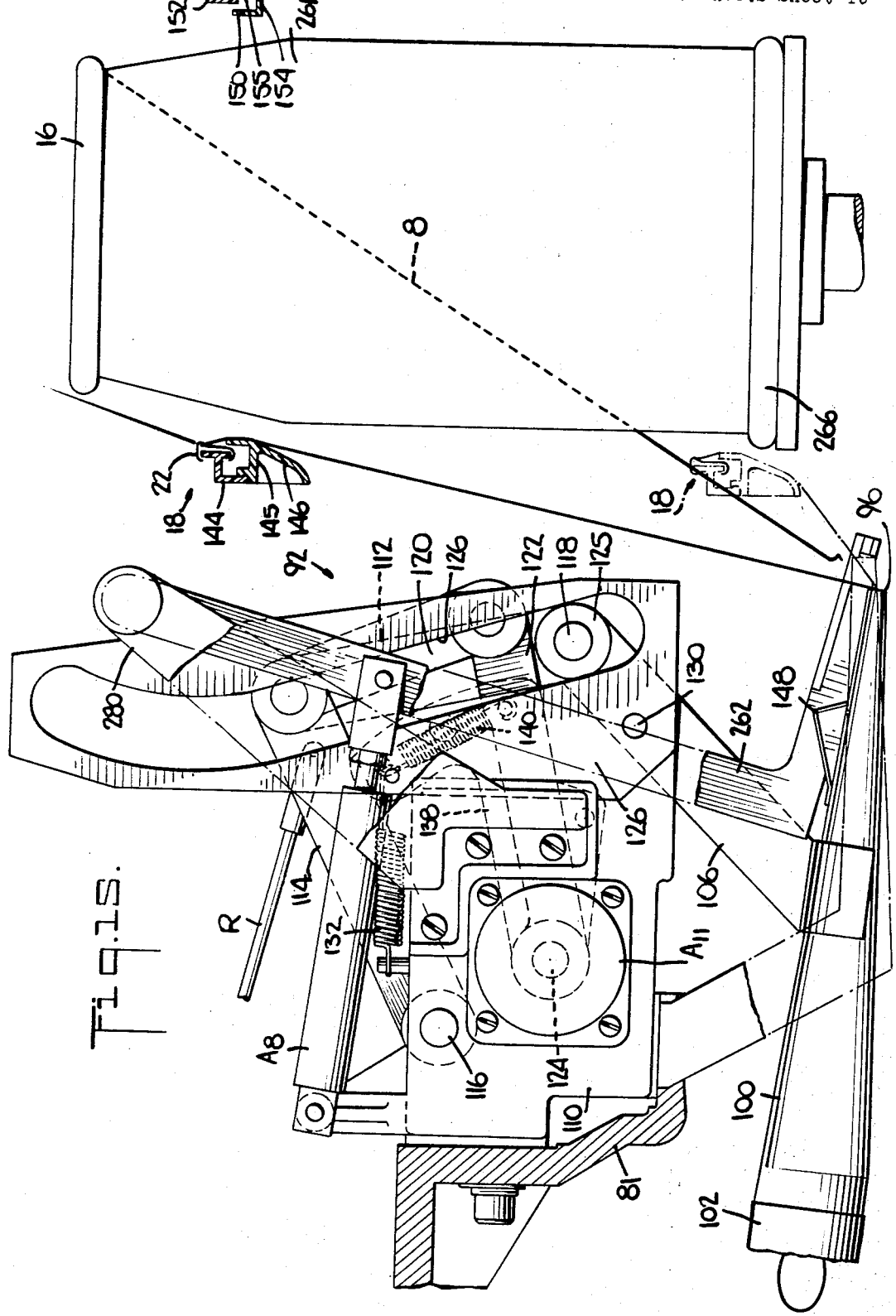

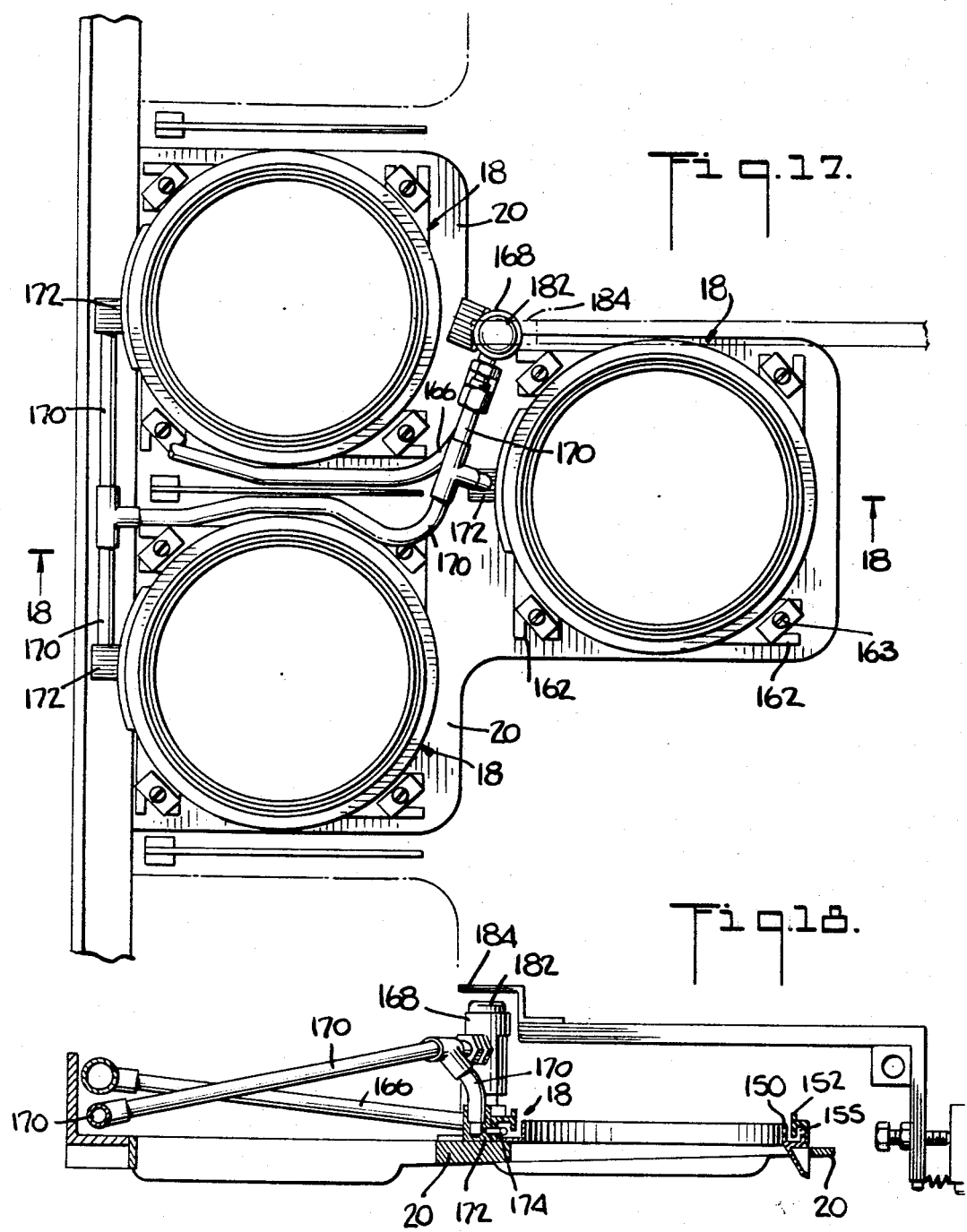

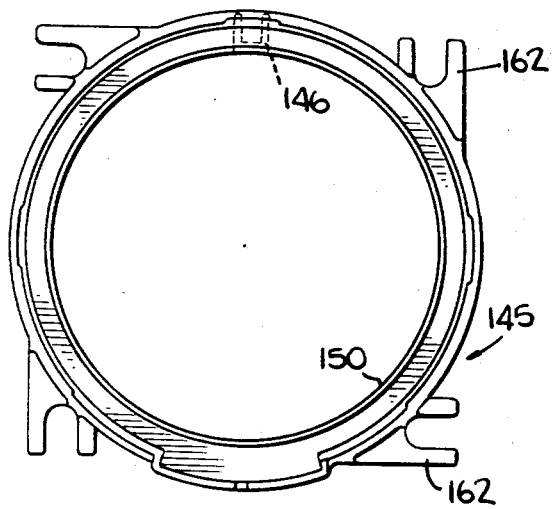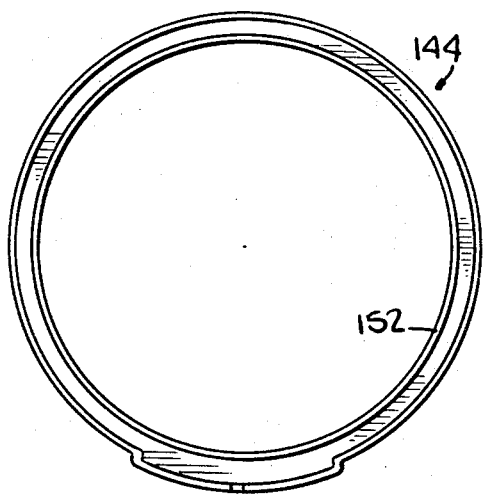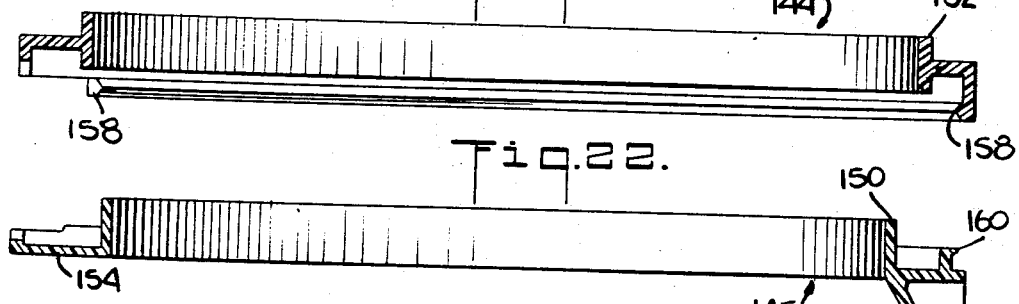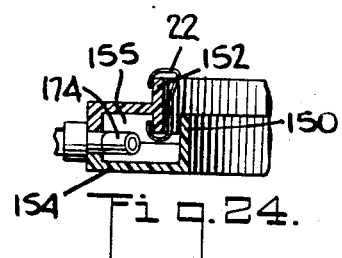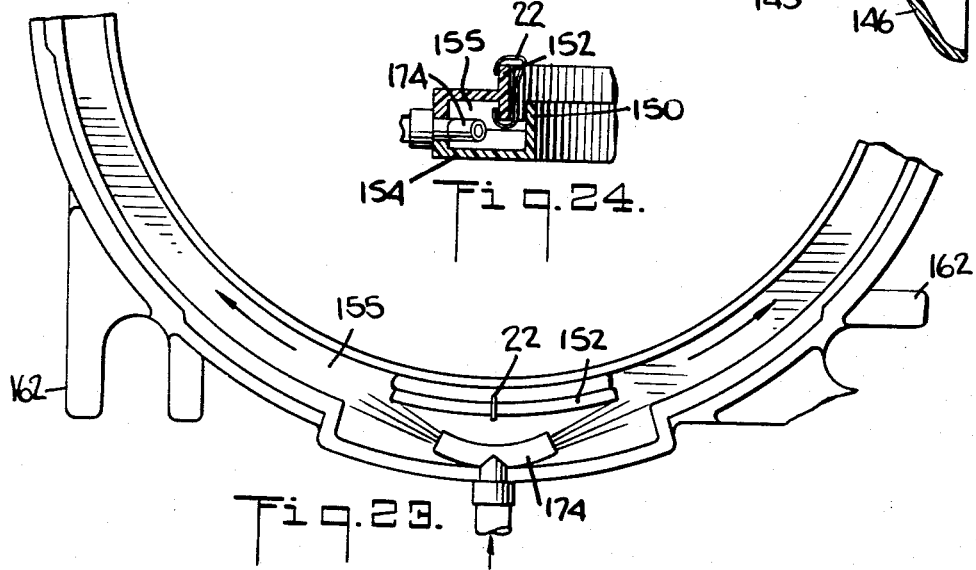

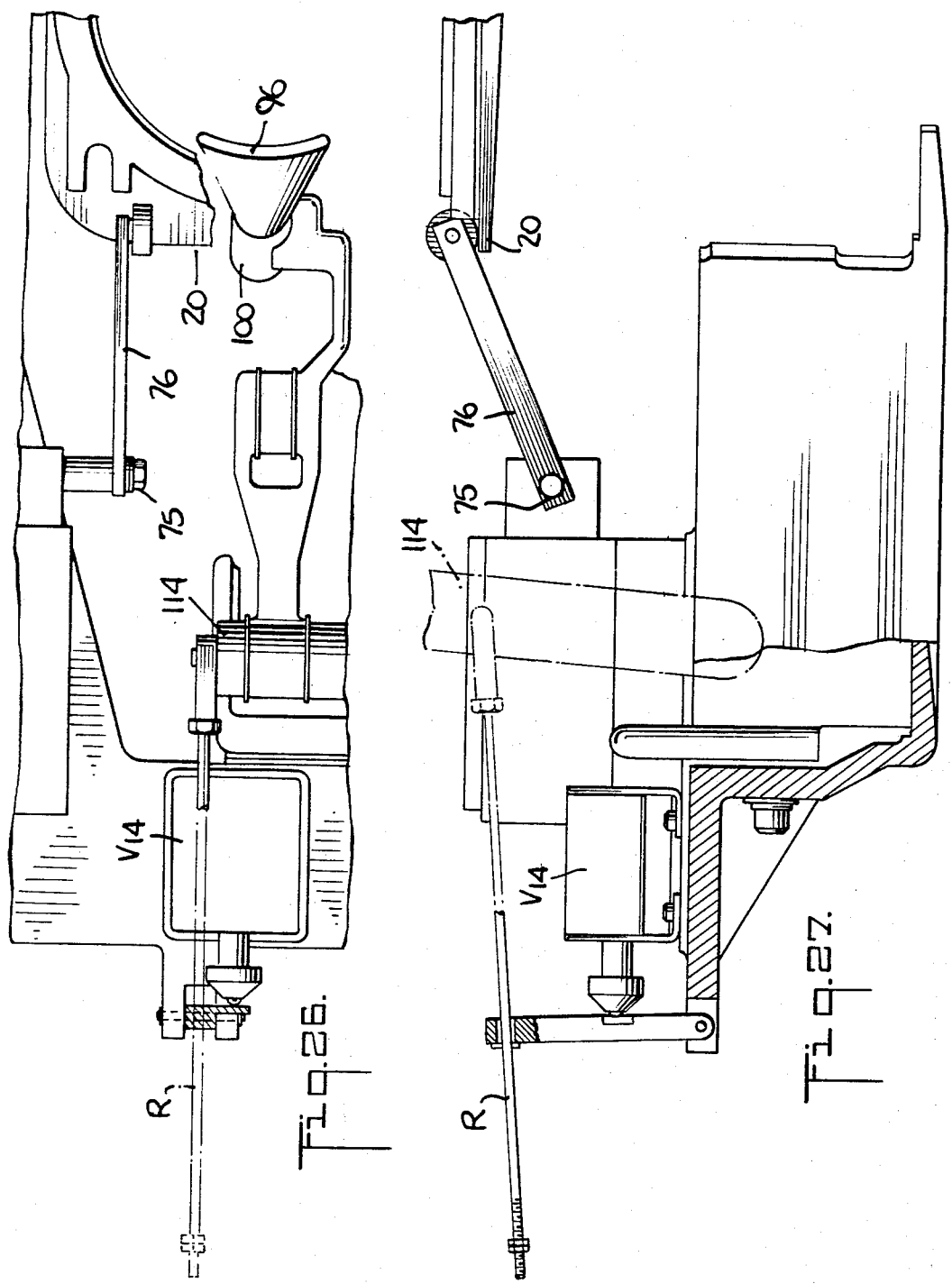

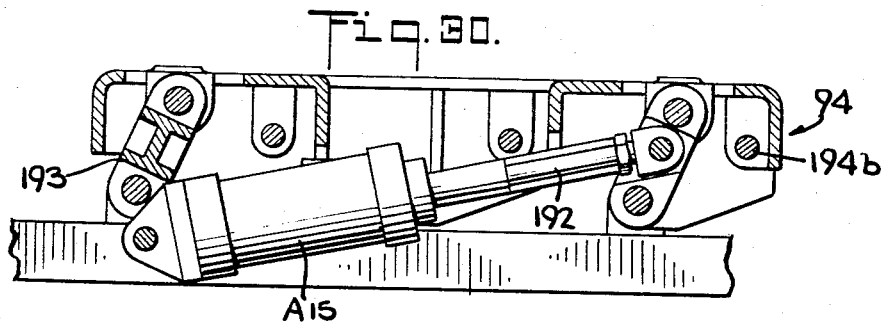
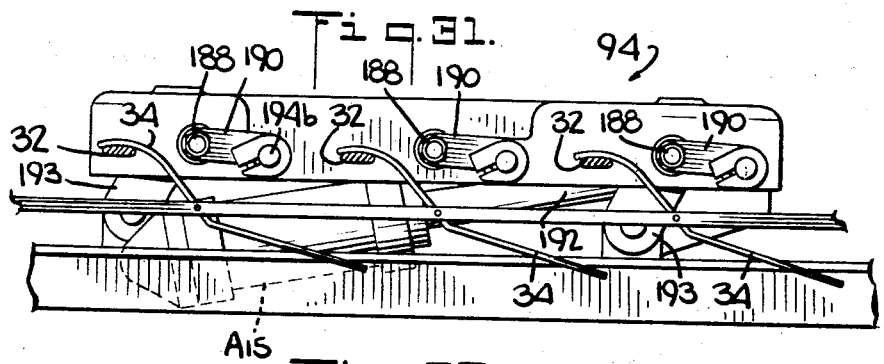
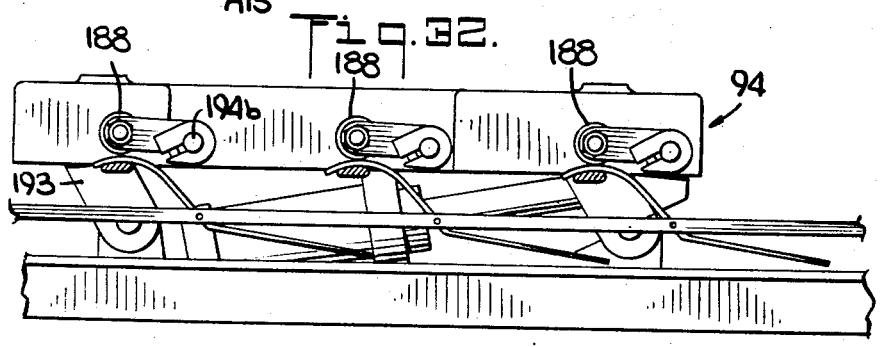
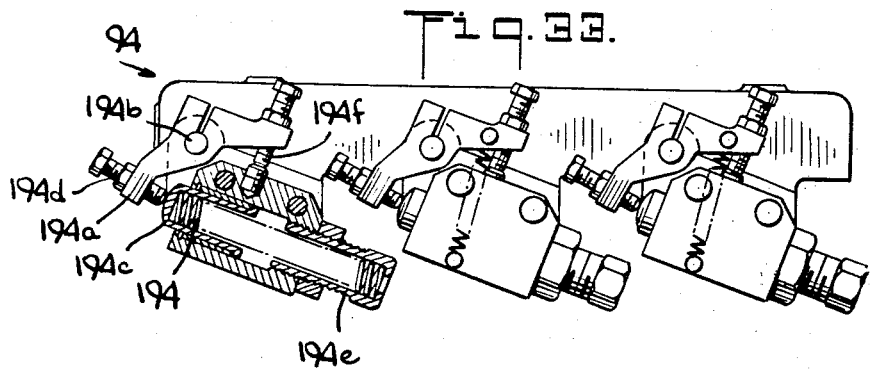

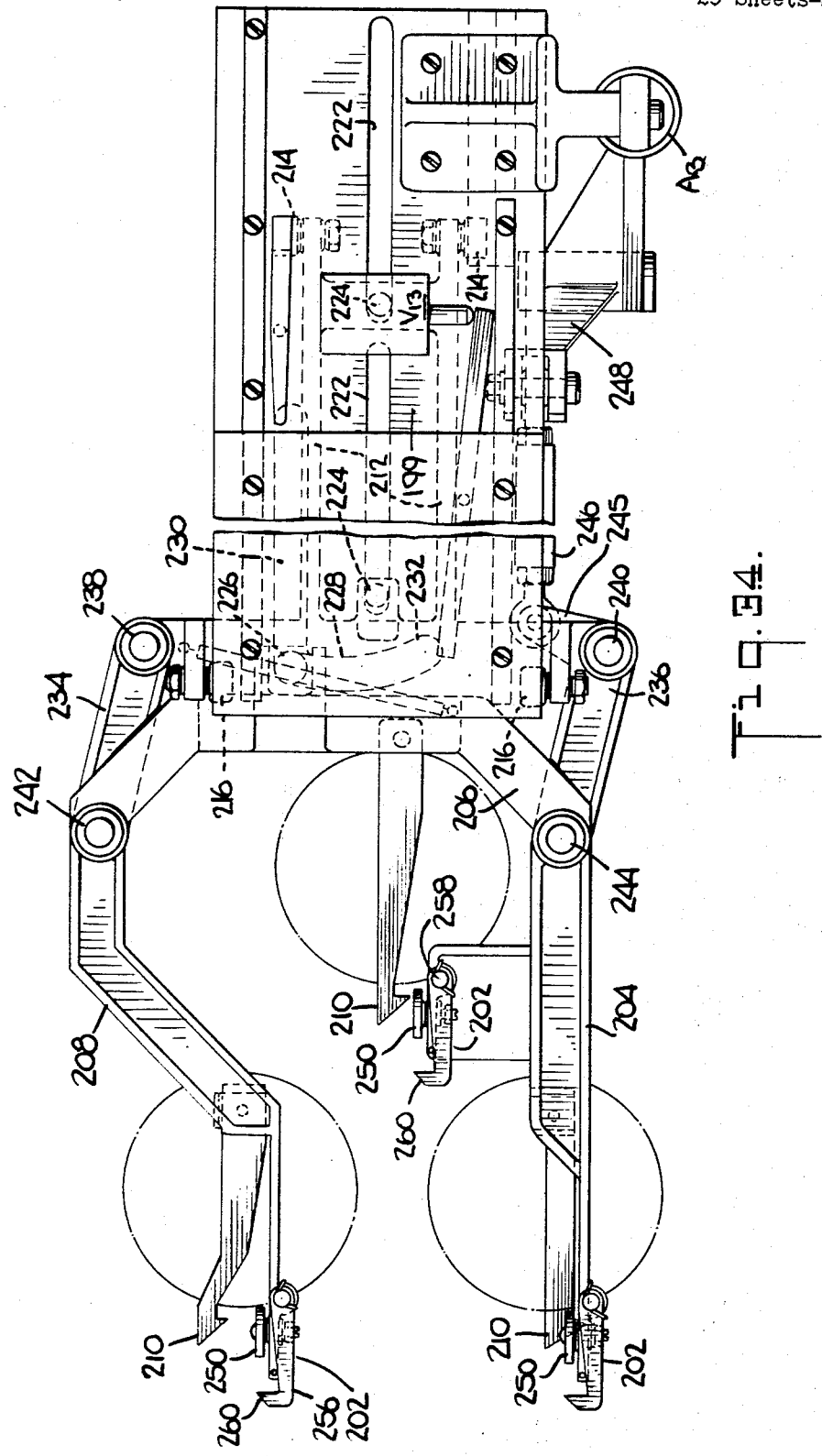

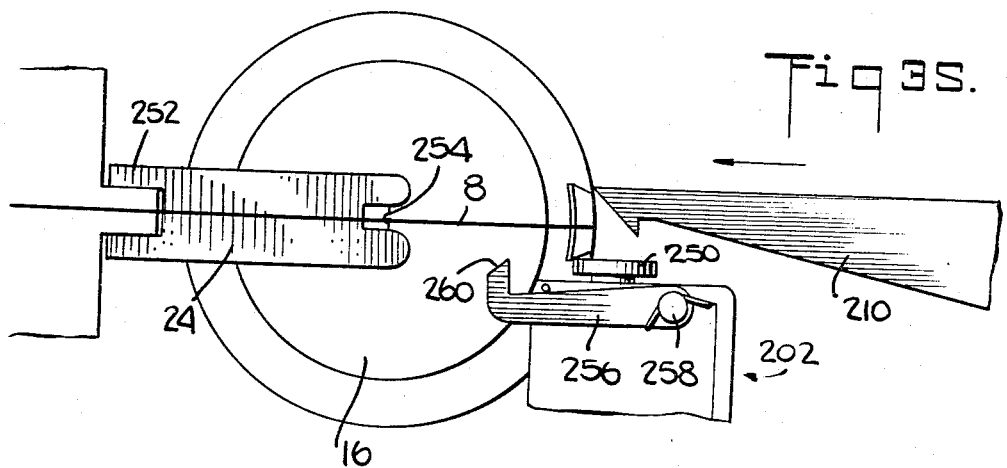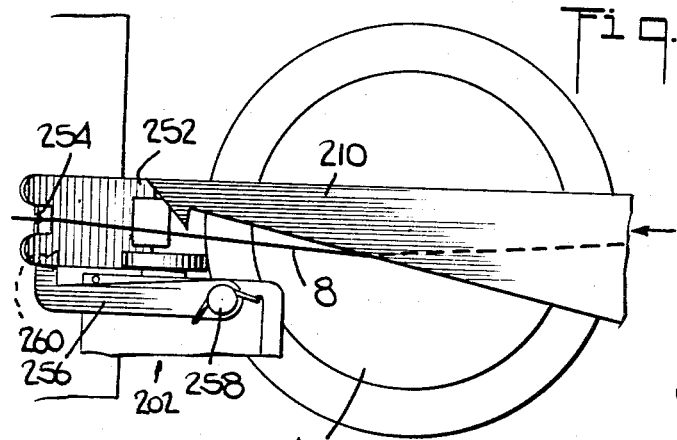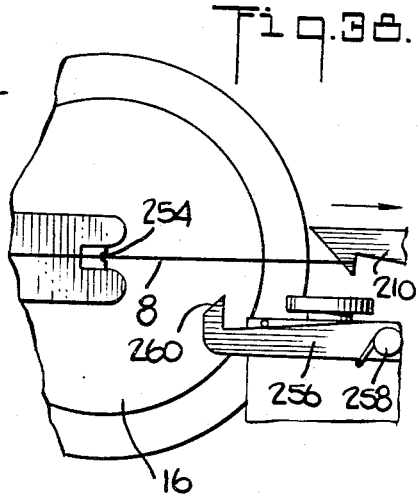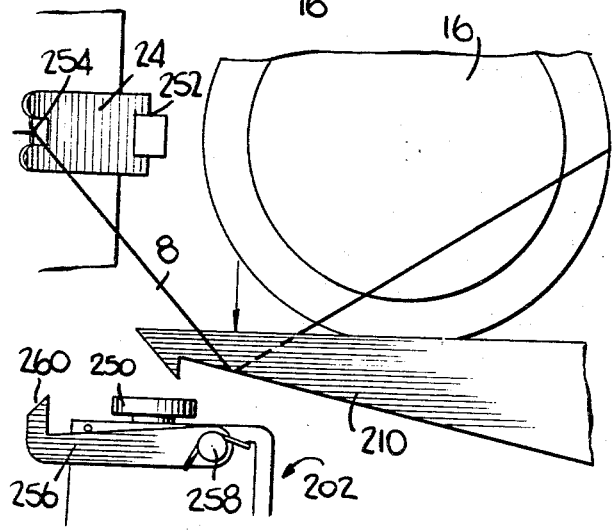

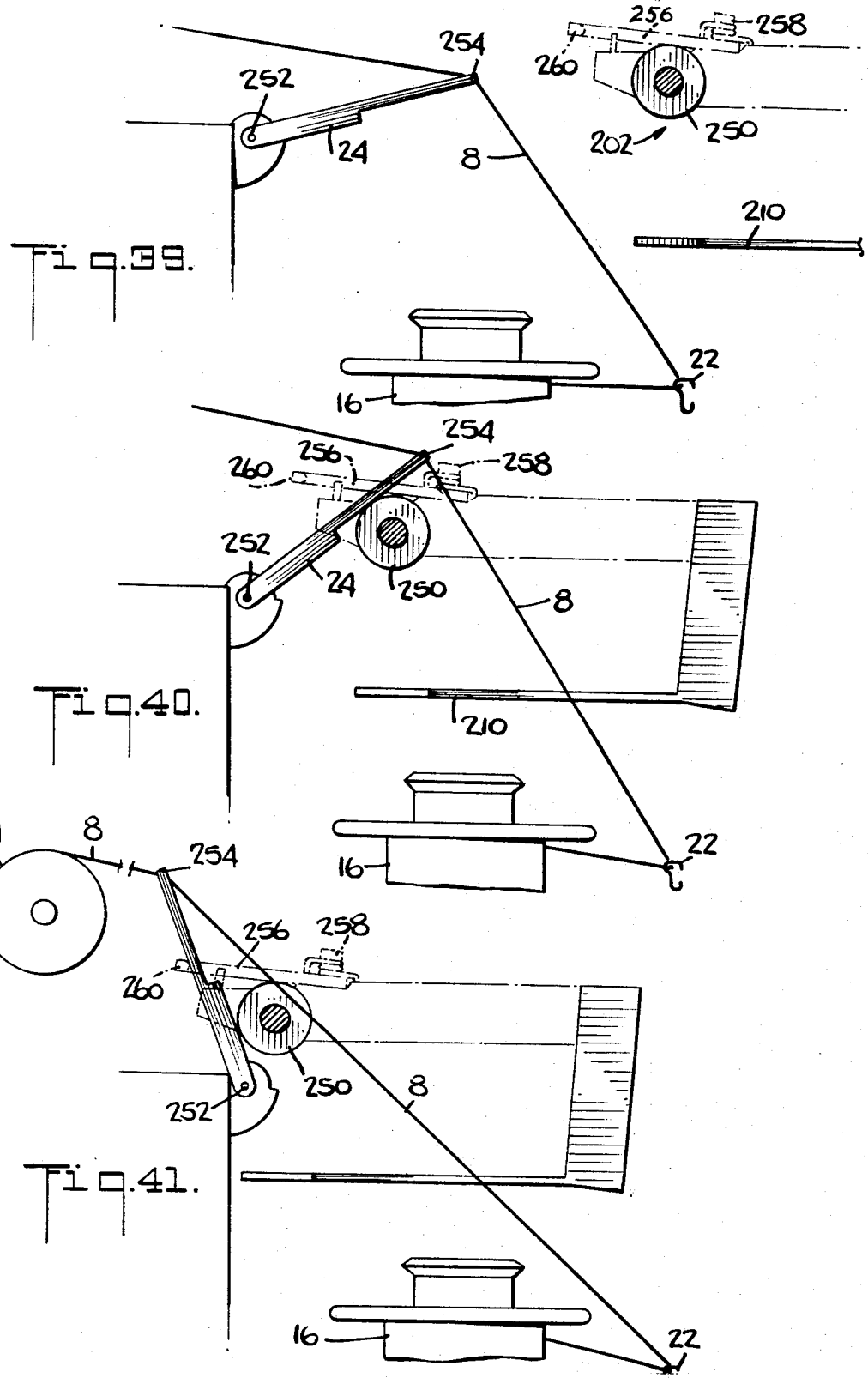

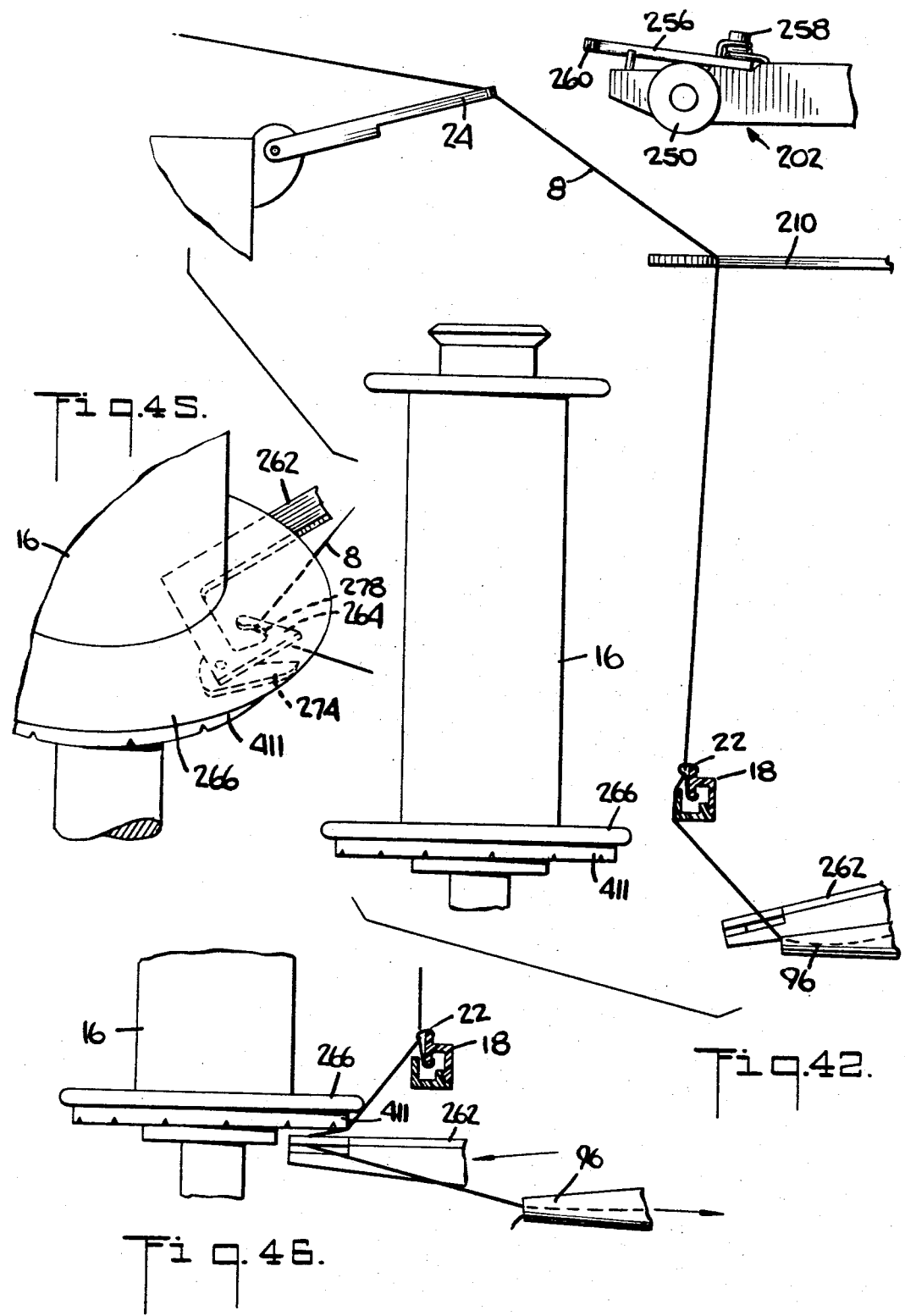

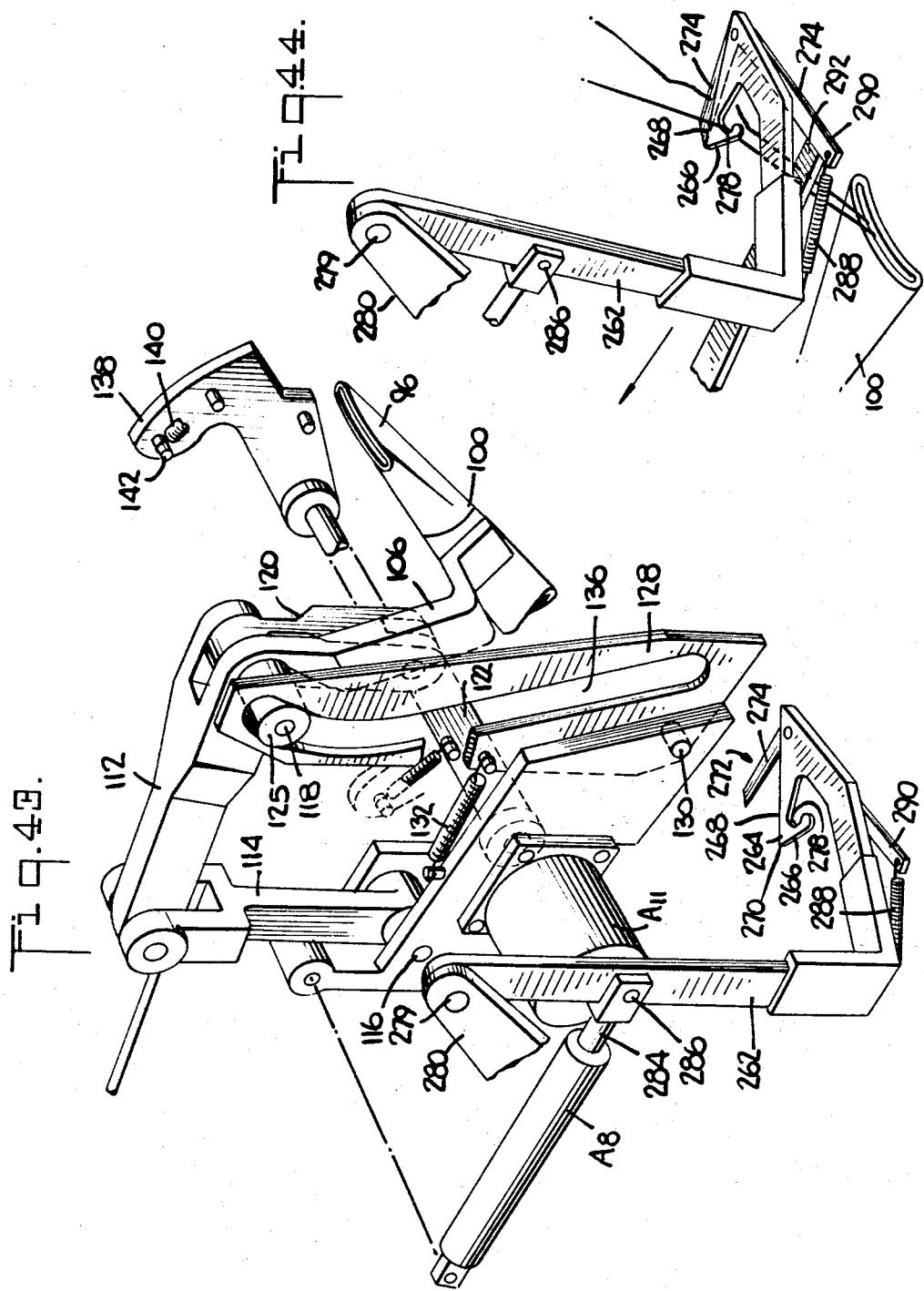

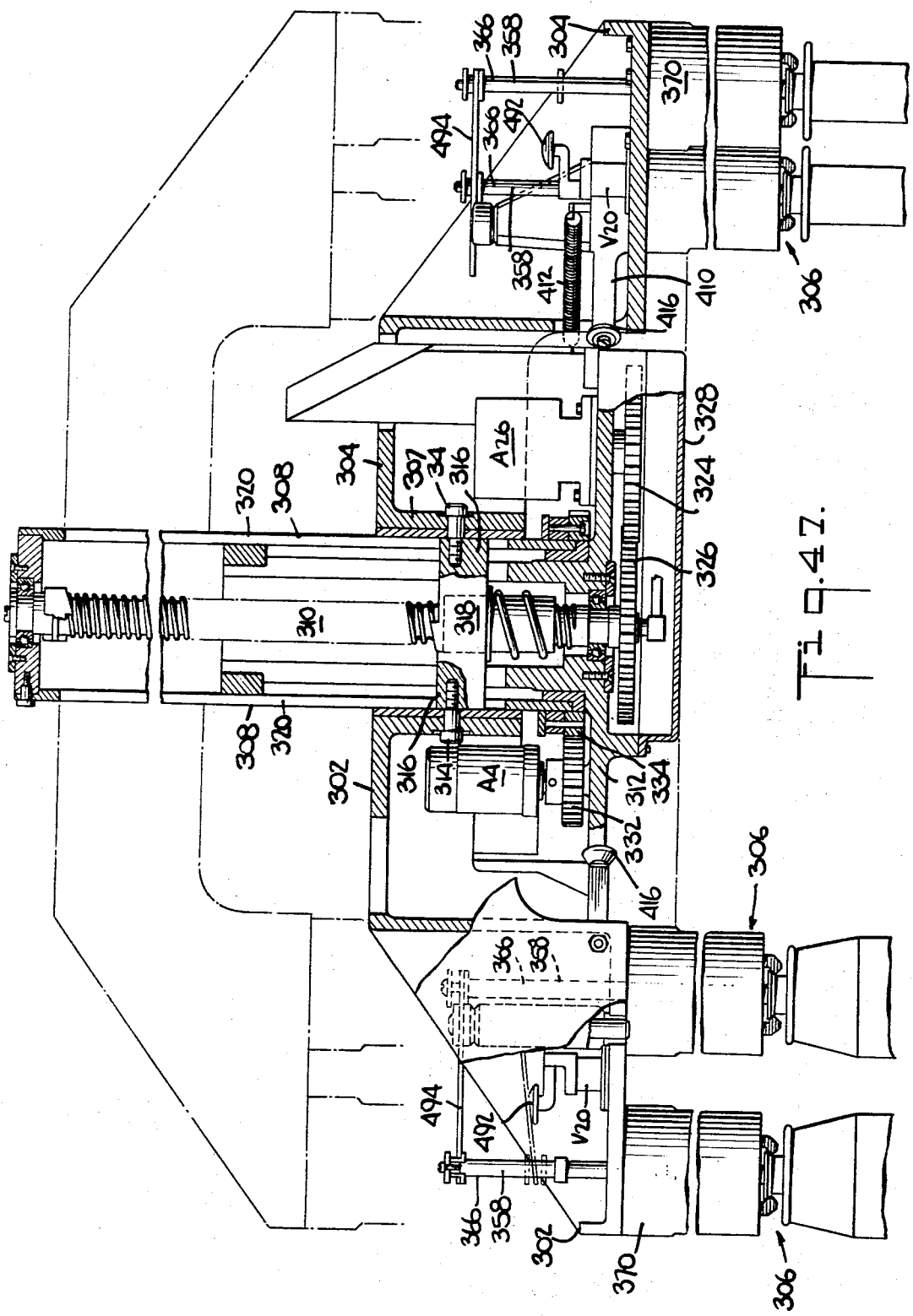

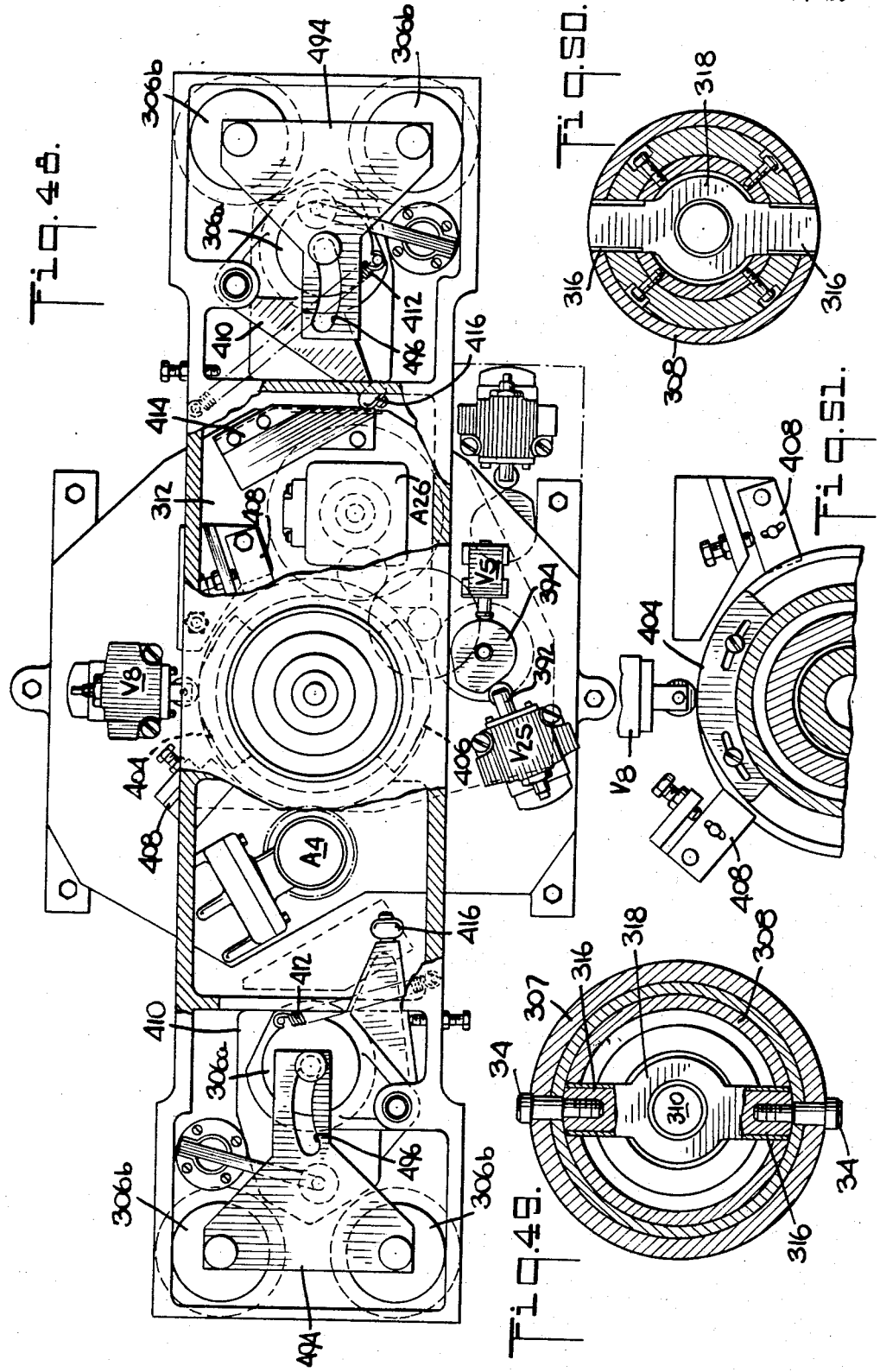

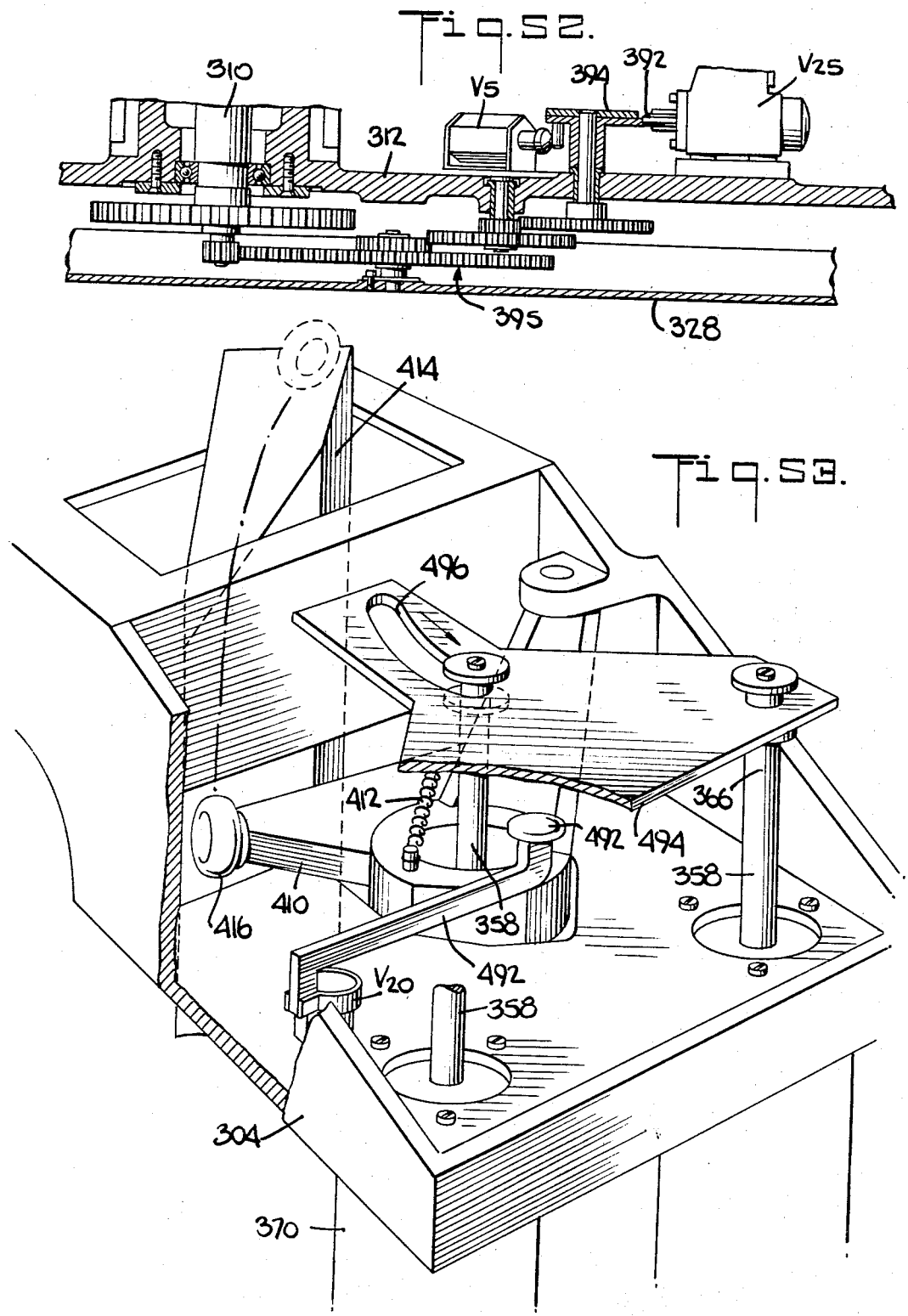

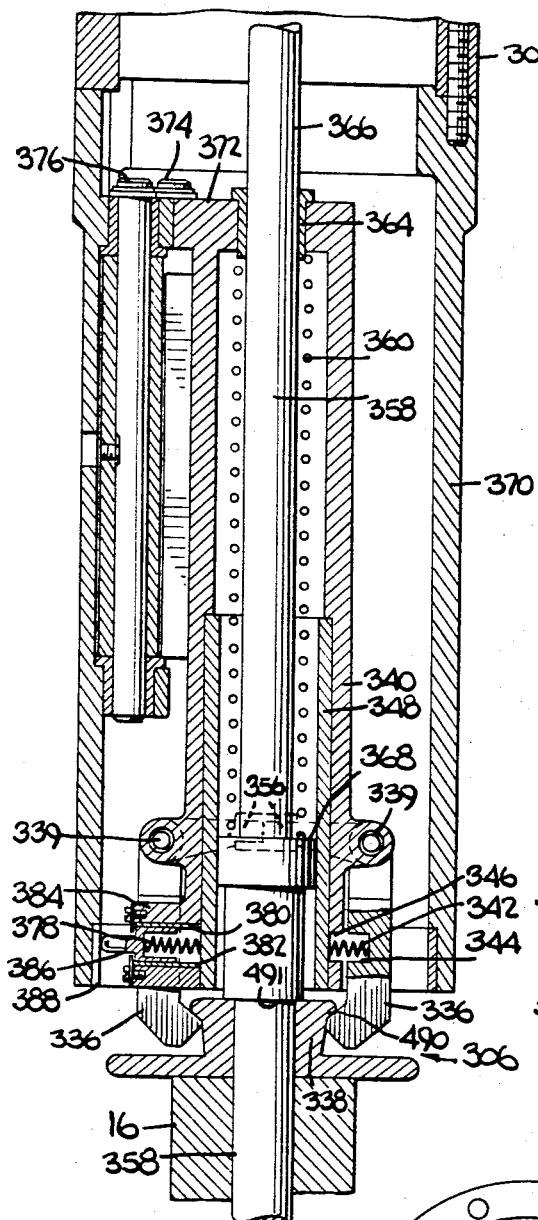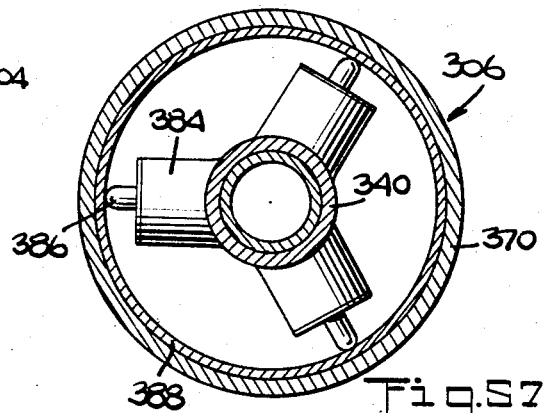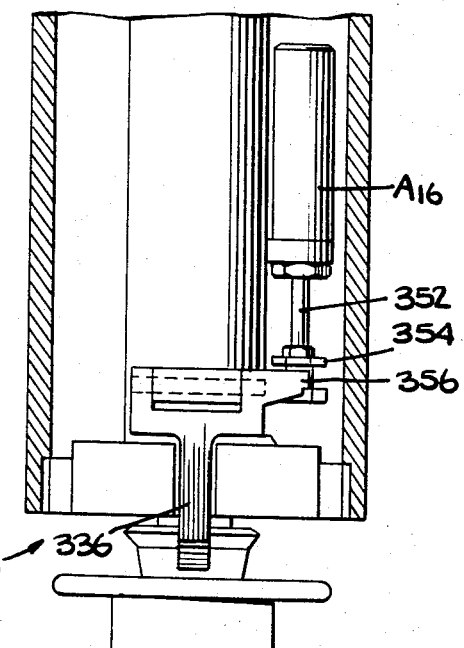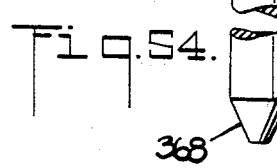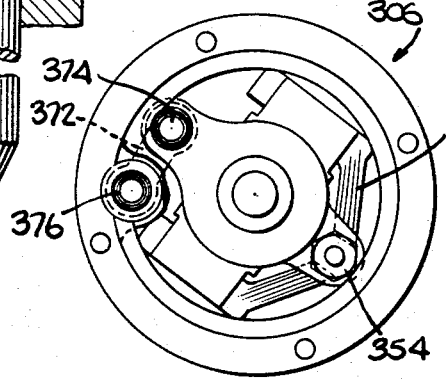

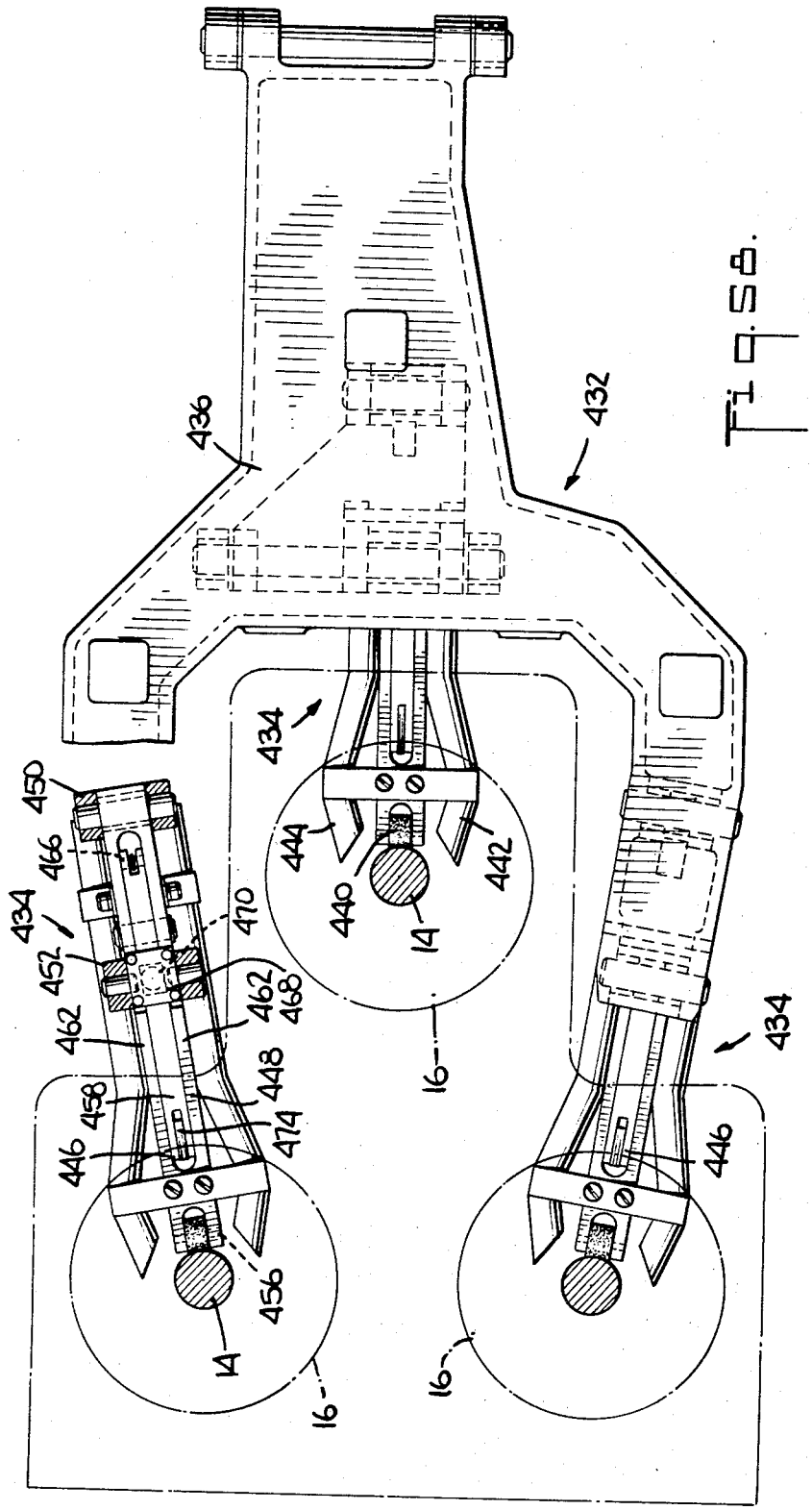

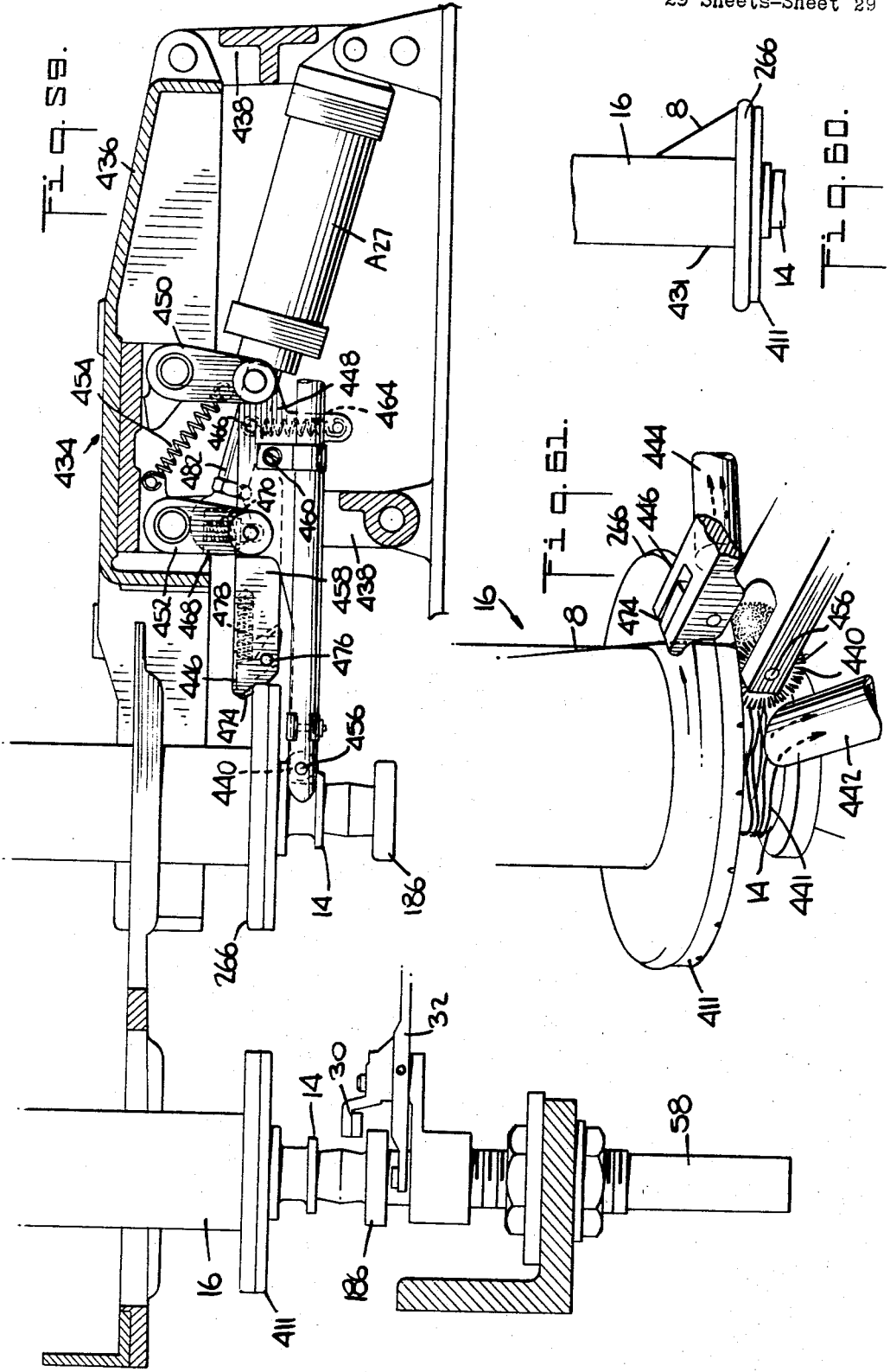

United States Patent Office 3,374,616
Patented Mar. 26, 1968

3,374,616
DOFFING MACHINE
William P. Hidden, Wenham, and Gregory C. Kekopoulos, Ipswich, Mass., assignors, by mesne assignments, to Celanese Corporation, a corporation of Delaware
Filed Sept. 30, 1965, Ser. No. 491,688
66 Claims. (Cl. 57—53)

This invention relates to doffing machines.

It is one object of this invention to provide a machine capable, automatically, of removing wound packages of yarn from a multistation winding machine, replacing them on the winding machine with empty packages, and preparing each winding station for the package-removing operation and for the commencement of proper winding after the package-replacing operaion.

Other objects of this invention will be apparent from the following detailed description and claims.

This invention is particularly suitable for use in the doffing of synthetic fiber extrusion machines in which the fiber is continuously supplied (as a continuous filament yarn) from an extrusion zone; such a machine cannot, from a practical standpoint, be shut down for doffing.

In accordance with one aspect of this invention, there is provided a doffing machine which operates sequentially at successive winding stations of a multisation winding machine at each station of which a strand is wound onto a package while being traversed along the length of said package by traversing means moving back and forth along the package; the traversing means may be, for example, a traveler mounted on a spinning ring on a reciprocating ring rail. The doffing machine, which moves from winding station to winding station, carries means for performing at least one portion of a package doffing cycle, and also carries means responsive to the position of the traversing means at a winding station for initiating operation, at that station, of the doff-performing means. More particularly, the doffing machine performs its doffing functions on a timed cycle, and at each winding station this cycle is commenced at a predetermined position of the traversing means. We have found that this arrangement makes for highly effective synchronization of the cyclic operations of the doffing machine and the winding station, and there is no need to discontinue movement of the traversing means during the doffing operation.

According to another aspect of the invention, means are provided for automatically halting the movement of the traveler of the ring spinner at a predetermined position on the ring which serves at its track. The yarn running from the traveler to the wound bobbin or other yarn package is then automatically taken up, preferably by a suction takeup means, preparatory to removal of the wound bobbin from the winding station.

The stopping of the traveler is preferably accomplished by establishing a current of fluid at the traveler to bring it to a halt at the predetermined position. More particularly, two opposed currents of air are blown through the spinning ring so that the traveler stops at the point where the effects of the two currents neutralize each other.

In another feature of the apparatus there are means to insure that the continuously supplied yarn always passes through the traveler and is not taken up before it reaches the traveler, even when the traveler is stopped and the winding of yarn on the package has halted. This is preferably accomplished by establishing an upwardly flowing stream of air blowing at the reach of yarn being supplied to the traveler while the yarn leaving the traveler is being taken up. That reach of yarn is thus kept under tension and away from the takeup means. Advantageously, the spinning ring is so constructed that the same currents of air that are used to stop the movement of the traveler also supply this upwardly flowing stream.

Another feature of the apparatus is its use of a movable vacuum pickup which moves into a position to suck up the yarn from the stopped traveler while the ring rail (and traveler) continue their traversing movement. Advantageously, the pickup then moves away from the traveler and carries the yarn with it to a position where the yarn can subsequently be thrown onto an empty replacement bobbin at the same winding station.

Yet another feature of the invention relates to the transfer of the wound yarn packages from each winding station and their replacement with unwound bobbins or other unwound central yarn supports. The apparatus has means for engaging the wound package at a winding station and for conveying that wound package, whi'e so engaged, to a storage mounting, and for simultaneously engaging an unwound central support at the storage mounting and conveying the unwound support, while so engaged, to the winding station vacated by the removal of the wound package. Advantageously, this is accomplished by a rotatably and vertically movable transfer head carrying chucks for engaging the ends of the bobbins. The head descends, one set of chucks grasps a group of wound bobbins at one winding station and another set of chucks grasps a corresponding group of unwound bobbins situated on storage mountings. The head then rises, rotates, and descends again to place the wound bobbins on the vacated storage mountings and the unwound bobbins in position in the vacated winding station.

A great many other features of the invention will be apparent from the following detailed description and claims, and the accompanying drawings.

In the drawings:

FIGURE 1 is a side view, partly in cross-section, showing a movable doffing machine positioned in the aisle between two extrusion machines and ready to operate on a trio of ring spinners of the winding, or take-up, portion of one extrusion machine.

FIGURE 2 is a top view, partly in cross-section and with portions broken away, illustrating the arrangement of the bobbins on the ring spinners and on a creel at the opposite side of the aisle and also illustrating the parts of the doffing machine that are concerned with moving the yarn guides and with tailing of the newly emplaced bobbins.

FIGURE 3 is a view of the doffing machine, taken from the rear.

FIGURE 4 is a plan view of the lower portion of the doffing machine showing some of its driving and controlling elements.

FIGURE 5 is an elevational view, taken in a direction facing the rug spinners, of a portion of the centralizing mechanism of the doffing machine and showing also some of the elements which initiate operation of the centralizing mechanism to move the machine to its predetermined position in alignment with the appropriate spinning position.

FIGURE 6 is a view taken at right angles to FIG. 5.

FIGURE 7 is a perspective view of the parts shown in FIG. 5, showing also the relation of these parts to a bobbin in winding position.

FIGURES 8 and 9 are plan views of successive positions of a centering shoe of the centralizing mechanism.

FIGURE 11 is a chart of the hydraulic and pneumatic system used in controlling the sequence of operations of the doffing machine.

FIGURE 12 is a side view of the doff-readying mechanism being shown in its extended position, with its yarn guiding mechanism and yarn pickups also being shown in their extended positions.

FIGURE 13 is a side view of the yarn pickup mechanism and a portion of a yarn cutter, both shown in extended position, this view also showing, in phantom, the retracted position of the suction head of the yarn pickup mechanism.

FIGURE 14 is a plan view illustrating the extended positions of both the suction head and of a yarn cutter.

FIGURE 15 is a side view similar to FIG. 14, but with the suction head and yarn cutter in their retracted positions.

FIGURE 16 (on the same sheet as FIG. 13) is a perspective view with the suction head in retracted position.

FIGURE 17 is a top view of a portion of the ring rail of the ring spinner, modified to provide a flow of air to the spinning rings.

FIGURE 18 is a side view of the parts shown in FIG. 17 and showing a projection extending from the doffing machine and used for operating an air valve on the ring rail.

FIGURE 19 is a plan view of the lower half of a modified spinning ring.

FIGURE 20 is a plan view of the upper half of the spinning ring.

FIGURE 21 is a side view, in cross-section, of the upper half of the spinning ring.

FIGURE 22 is a side view, in cross-section, of the lower half of the ring.

FIGURE 23 is a plan view of the lower half of the ring, showing additional elements for introducing air between the upper and lower halves of the ring.

FIGURE 24 is a side view, in cross-section, of the air inlet portions of the ring.

FIGURE 25 (on the same sheet as FIG. 7) is a perspective view illustrating the effect of a curtain of air directed upwardly from the ring.

FIGURE 26 is a plan view showing a portion of an arrangement for starting the timing cycle of the doffing machine when the ring rail rises to a predetermined level, and also showing details of the connections for controlling an interlock valve.

FIGURE 27 is an elevational view of portions of FIG. 26, partly in section.

FIGURE 30 is a side view, partly in cross-section, of the mounting of the brake-actuating assembly.

FIGURES 31 and 32 are side views illustrating successive positions of the brake-operating assembly, FIG. 31 showing the position before braking and FIG. 32 showing the position during braking.

FIGURE 33 is a side view showing one arrangement for spring loading certain links of the brake-operating mechanism.

FIGURE 34 is a top view of the yarn guide mechanism of the doffing machine, this mechanism being shown in its rectilinearly extended position.

FIGURES 35, 36, 37 and 38 are a series of top views showing successive positions of the projecting portions of yarn guide mechanism and corresponding positions of the yarn and balloon guide.

FIGURES 39, 40 and 41 are a series of side views showing successive positions of the projecting portions of yarn guide mechanism and corresponding positions of the yarn and balloon guide.

FIGURE 42 is a simplified side view illustrating the position of the parts before the yarn is thrown onto an empty bobbin.

FIGURE 43 is a perspective view of the yarn pickup mechanism and of the cutting and throw-on mechanism of the doffing machine.

FIGURE 44 is another perspective view showing the position of the suction head and cutter during the cutting of the yarn.

FIGURE 45 (on the same sheet as FIG. 42) is a perspective view illustrating the throw-on operation.

FIGURE 46 is a side view of the parts shown in FIG. 45.

FIGURE 47 is a side view, partly in section, of the bobbin transfer assembly, including a crosshead and bobbin chucks, used for transferring full bobbins from the winding stations and for replacing them with empty bobbins.

FIGURE 48 is a plan view, partly in section and partly broken away, of a portion of the bobbin transfer assembly.

FIGURE 49 is a plan view, mainly in cross-section, taken through a threaded ball nut used for raising and lowering the crosshead.

FIGURE 50 is a plan view, mainly in cross-section, taken through a vertical tube in which the ball nut travels.

FIGURE 51 is a plan view, partly in cross-section, illustrating a valve and cam used for decelerating the rotary motion of the crosshead.

FIGURE 52 is a cross-sectional side view of the mechanism used for decelerating the vertical motion of the crosshead.

FIGURE 53 is a perspective view of a portion of the crosshead and of elements which alter the distance between bobbins on rotation of the crosshead and other elements which are used in detecting the sticking of a bobbin.

FIGURE 54 is a cross-sectional elevation of a bobbin chuck.

FIGURE 55 is an elevation taken at right angles to FIG. 54.

FIGURE 56 is a plan view looking down at the bobbin chuck.

FIGURE 57 is a plan view of the arrangement for centering the chuck within its housing.

FIGURE 58 is a plan view, with parts in section and parts broken away, of the tailing mechanism shown in extended position.

FIGURE 59 is an elevation showing a portion of the tailing mechanism in the position indicated in FIG. 58.

FIGURE 60 is a sketch, in elevation, showing the reach of yarn between the bobbin base and the central core of the bobbin.

FIGURE 61 is a perspective view illustrating the operation of the tailing mechanism.

Figure 1A:
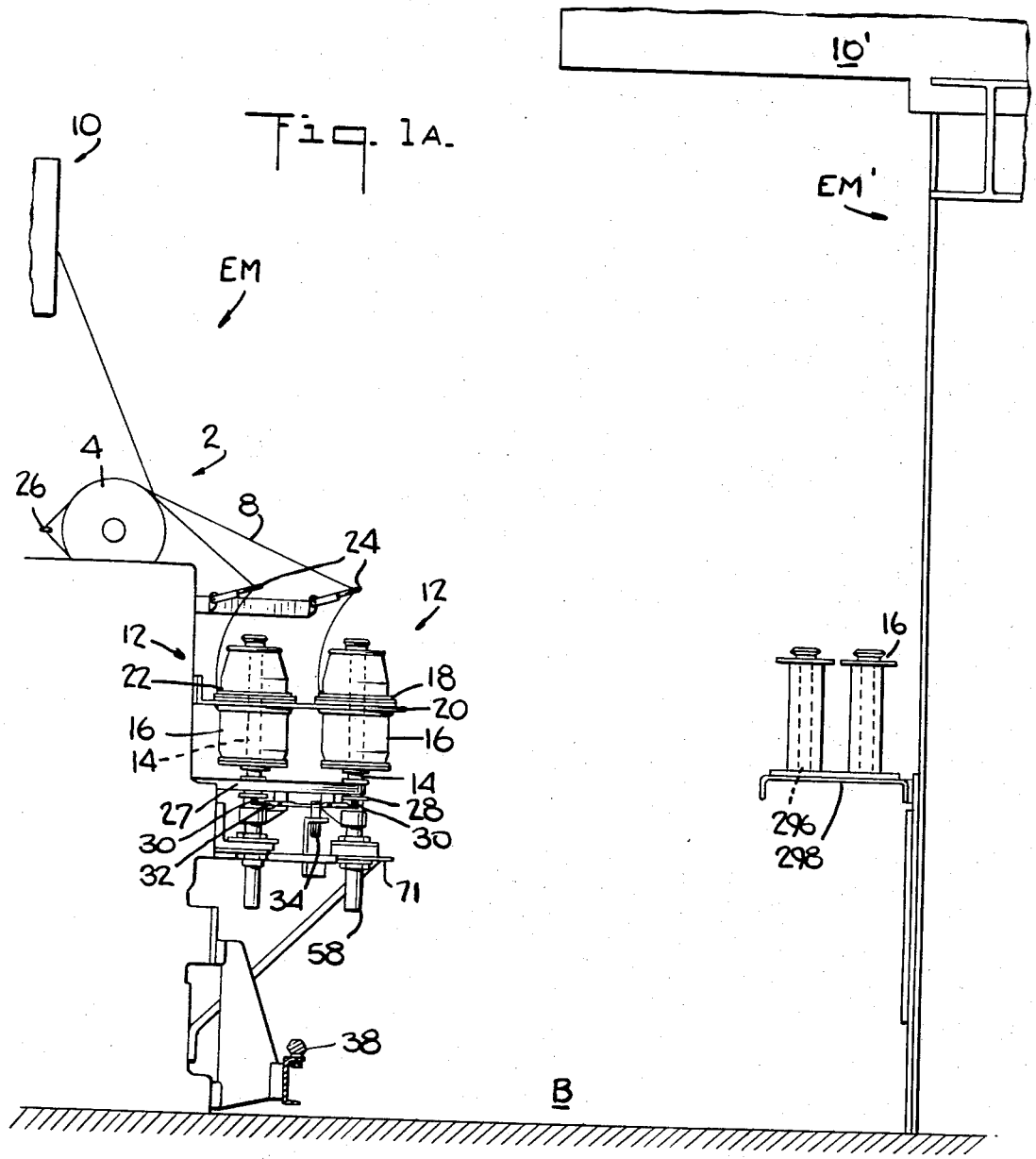
FIGURE 1A is a view similar to FIG. 1, but without the movable doffing machine.

Referring to FIGS. 1, 1A and 2 of the drawing, reference numeral 2 designates generally the takeup portion of an extrusion machine EM. This takeup is of conventional construction and comprises a driven metering roll 4 (FIG. 1) mounted on a fixed frame 6 and arranged to receive yarn 8 continuously from an extrusion zone 10 and to deliver the yarn to a series of ring spinners 12. Each ring spinner 12 (see FIG. 1A) comprises, as is conventional, a driven spindle 14 constructed to support and drive a bobbin 16 on which the yarn 8 is wound by the rotation of the bobbin; and a ring 18 mounted on a vertically reciprocating ring rail 20 and having a circular track for a traveler 22 through which the yarn passes on its way to the bobbin 16 from a balloon guide 24 whose yarn-engaging portion is normally positioned on the prolongation of the axis of the bobbin 16 and its spindle.

In operation, each yarn 8 makes a wrap around the metering roll 4, passing through a guide 26 during that wrap, and passes through the balloon guide 24 to the traveler 22, which moves rapidly in its circular track about the bobbin, the speed of the traveler being dependent on the speed of rotation of the bobbin and the speed at which the yarn is supplied by the metering roll 4. During this operation, the ring rail 20 is moved slowly up and down to traverse the yarn along the length of the bobbin in the desired configuration in a manner well known to the art. In one conventional arrangement the rail is driven through a heart-shaped cam (not shown) which causes the rail to travel faster near the top of its stroke than in the remainder of its stroke; this produces a wound bobbin whose windings are tapered at its upper end, as shown in FIGS. 1 and 1A.

As shown in FIG. 2, the ring spinners 12 are arranged in groups of three along the extrusion machine EM; two ring spinners (hereinafter termed the "base spinners") of each trio are positioned near the metering roll in a line parallel to the extrusion machine, and the third ring spinner (hereinafter termed the "apex spinner") is positioned further from the metering roll than the other two spinners. Each trio of ring spinners receives three separate yarns from a single extrusion zone 10 (FIG. 1), one for each ring spinner, said yarns passing around a common metering roll 4. The extrusion machine EM has a large number of extrusion zones 10 aligned along its length, and a corresponding number of aligned metering rolls 4 and groups of ring spinners similarly aligned. As is conventional, the spindles 14 are driven by a system of belts 27 frictionally engaging the whorl portions 28 of said spindles and each ring spinner is provided with its individual brake 30 operable without affecting the rotation of the other spindles. Each brake 30 is operable by its own pivoted brake lever 32 (FIG. 1A) which is adapted to be forced to the braking position by an extension lever 34, accessible, like the rest of the takeup portions of the machine, from an aisle B between adjacent parallel extrusion machines, EM, EM'.

The automatic doffing machine C (see also FIG. 3) is adapted to move sidewise through the aisle B. To this end the front of the doffing machine has a pair of flanged wheels 36 (FIG. 1) adapted to ride on a track 38 fixed to the extrusion machine EM while the rear of the doffing machine has drive wheels 40, 42 (FIGS. 3 and 4) adapted to ride on the floor of the aisle B. There is an individual hydraulic motor A1 and A2 (FIG. 4) for each of the drive wheels 40, 42. These hydraulic motors are arranged to receive the same hydraulic fluid in series, so that if both drive wheels 40, 42 are in contact with the floor, the driving torque is divided between them. This series arrangement provides for driving the doffing machine at a constant speed regardless of the unevenness of the floor. Thus, if only one drive wheel is in contact with the floor, it will obtain the full torque and there will be no change in the speed at which the wheel is driven. For travel from one extrusion machine to the next, the doffing machine is equipped with another set of wheels 48 (FIG. 1); when the doffing machine is in its operative position with its front end supported by the wheels 36 on the track 38, the wheels 48 are clear of the floor.

The energy for driving the hydraulic motors A1 and A2, and other hydraulic actuators to be described below, is supplied from a hydraulic pump 50 (shown at the middle of FIG. 4), preferably of the gear type, and this pump is in turn driven by an electric motor 52 (e.g. a 3-phase induction motor), all on the doffing machine C. Electricity may be supplied to the doffing machine through a suitable flexible cable (not shown leading from a stationary power supply.

The doffing machine includes a number of other hydraulic and pneumatic motors and actuators, all designated herein by reference numerals beginning with the letter A, as in A1, A2, A3, etc. The valves controlling the various hydraulic and pneumatic systems are designated herein by reference numerals beginning with the letter V, as in V1 V2, V3, etc.

As the doffing machine moves along the extrusion machine it is stopped automatically at each operative position. To this end, there is mounted on the doffing machine a hydraulic deceleration valve V4 (FIG. 5) operated by the movement of a rockable feeler 56 (FIGS. 5 and 6) whose upper end 57 is adapted to be brought (by the movement of the doffing machine) into contact with a portion of the extrusion machine, in this case the lower part of the elongated housing 58 (also known as a "spindle bolster") for the apex spindle of the next trio of spindles to be doffed. The rockable feeler is biased so that its bolster-contacting end 57 is normally uppermost; this end may carry a roller, to reduce friction. At the other end of the feeler 56 there is an arcuate cam 60 which is in contact with the end of the operating rod 61 of the deceleration valve V4. Thus when the movement of the doffing machine brushes the feeler end 57 against the spindle bolster 58, the rocking of the feeler gradually closes the deceleration valve V4 to gradually shut off the fluid supply to the motors $A_1$, $A_2$ (by diverting this supply to another portion of the hydraulic system), thus slowing down the movement of the doffing machine so that it stops in approximate registry with the trio of spindles to be doffed (e.g. in about ¼" of precise registry). In this position the upper feeler end 57 is still depressed by the bolster 58.

The rocking of the feeler 56 by contact with the spindle bolster 58 also initiates the operation of a centralizing mechanism which serves to bring the doffing machine into exact registry with an operative position of the extrusion machine. The centralizing mechanism (shown generally as 59 in FIG. 7) is hydraulically operated under the control of a valve V10 (FIGS. 5 and 6) whose operating rod 62 is connected to an arm 63 attached to the feeler 57. As shown in FIGS. 5 and 6, the feeler 57 and the arm 63 may be attached, for movement together, by keeping them both to the same rock shaft 64.

The centralizing mechanism includes a cylinder A5 (FIGS. 5 and 6) operatively attached, through its rod 65 (see also FIG. 7), to a rockable centering shoe 66 carrying a pair of spaced rollers 67 and an intermediate butting plate 68 (see also FIGS. 8 and 9). The rollers 67 are adapted to engage the tapered edges 70 of a stationary detent plate 71 mounted on the extrusion machine below the apex bobbin of the trio and projecting into the path of the outer end of the rockable centering shoe 66. It will be seen that, depending on the position of the doffing machine, one or the other of the rollers 67 will engage the detent plate 71 first and by further rocking movement of the centering shoe, cause the doffing machine to move slightly, sidewise, on the track 38 and the floor, until the shoe 66 is aligned with the detent plate. The rollers 67 are now in position, straddling the detent plate 72 so that they prevent any sidewise movement of the doffing machine during the doffing cycle.

Accurate positioning of the doffing machine with respect to the extrusion machine in a direction at right angles to the direction of the doffing machine travel is effected by raising the rear portion of the doffing machine to force the butting plate 68 of the centering shoe 66 firmly against the end 72 of the detent plate 71. This action is also under the control of valve V10 (FIG. 5), which when it is opened (by the movement of feeler 56) admits fluid to another cylinder A6 (FIG. 1, lower right) to force down a supporting foot 74 (FIGS. 1 and 3), thus raising the rear to level the mechanism and bring the drive rolls 40, 42 off the floor; any tendency for the rear of the doffing machine to roll is thus avoided.

At each operative position of the doffing machine, the doffing cycle is initiated by movement of the ring rail 20. In its upward movement, this ring rail brushes against and actuates a limit switch 75 (FIGS. 1 and 27) whose operating arm 76 projects from the doffing machine, and which starts a synchronous electric motor 77 (FIG. 4) mounted on the doffing machine. The synchronous motor 77 drives (through a sprocket and chain connection) a cam shaft 78 which acts as the main timing means for the machine. Cams, indicated generally as 79, are mounted on the shaft 78 and are adapted to directly actuate suitable hydraulic valves controlling almost all the functions of the doffing machine. The cam timing is pre-set to synchronize with the pre-set timing of the ring rail cycle. The limit switch 75 is of such construction that it is actuated only by movement of the ring rail in one direction and is ineffective, once the synchronous motor is on, to shut off the motor. A typical sequence of operations, in relation to the position of the ring rail, is illustrated in the chart designated as FIG. 10. The various valves and hydraulic and pneumatic operators are shown diagrammatically in their operative relationship in FIG. 11.

The doffing machine includes doff-readying mechanism indicated generally as 80 (FIG. 1) for acting on the ring spinners to prepare them for the removal of the full bobbins and to restore each trio of ring spinners to its operative condition after these ring spinners have received empty bobbins. This doff-readying mechanism is, in the embodiment shown in the drawings, mounted on a frame 81 slidably supported on rollers 82 (FIG. 3) on the doffing machine and movable from a rearward, idle, position to a forward, active, position. The forward movement of the frame is effected under the control of valve V10 concurrently with the centralizing of the doffing machine, previously described. More specifically, opening of valve V10 admits fluid to hydraulic cylinder A7 (see also FIG. 12) whose piston rod 83 pulls upward the lower end 84 of a bell crank 86 attached to one ned of arod 88, whose other end 90 is fixed to the frame 81. Spacial considerations, particularly when the takeup mechanism comprises trios of ring spinners instead of entirely aligned ring spinners, make it desirable to mount the doff-readying mechanism on a retractible frame, instead of fixing it in its forward active position, during the travel of the doffing machine along the aisle.

The doff-readying mechanism carried on frame 81 includes a vacuum pickup assembly 92 and a brake-actuating assembly 94 for operating the spindle brakes. The vacuum pickup assembly cooperates with the spinning ring (or traveler ring) 18 to take up the yarn between the travelers 22 and the bobbins 16 after the spindles 14 have been braked. All these elements are provided in triplicate to operate simultaneously on all three ring spinners of a trio at one time.

The vacuum pickup assembly (FIG. 13) includes a suction head 96 adapted to be inserted between the spinning ring 18 and the upper, tapered, portion of the windings 98 on the bobbin 16. In the embodiments shown in the drawings, this suction head is at the tapered end of a hollow tube 100 connected, by means of flexible pneumatic hose 102 to an electrically driven suction pump 104 (FIG. 4) carried by the doffing machine. The hollow tube 100 is mounted on a movable bent arm 106 (FIGS. 13, 14, 15) constituting one part of a 5-bar linkage which is actuated (indirectly, as will appear below) by a rotary hydraulic actuator ("Rotac") All mounted on an extension 110 of the frame 81. More specifically, the bent arm 106 has one end 112 (see also FIG. 43) pivoted to a link 114 which is in turn pivoted at a point 116 fixed to the frame extension 110. At the middle of the bent arm 106 it is pivoted, by a pin 118, to the end of a second link 120 which is pivoted at its other end to a third link 122, freely pivoted in turn on the oscillatable shaft 124 of the Rotac A11. The movement of the five-bar linkage is constrained in a more-or-less fixed path by the engagement of a roller 125 mounted at the end of the pin 118 (at the middle of the bent arm 106) in a slot 126 in an upstanding plate 128; the plate itself is pivoted to the frame extension 110 at 130 and is biased to the position shown in solid lines in the drawing by a relatively strong spring 132 fixed to the frame extension 110. The slot 126 is arcuate in its upper portion 134 and then inclined in a straight line 136 in its lower half. By this arrangement, as will be seen below, the suction head 96 can, at a later stage in the operation, bring the yarn down in a substantially straight path under relatively low tension (e.g. 8 grams) to a point just below the base of the bobbin 16, for engagement therewith during the subsequent throw-on operation. The five-bar linkage illustrated in the drawing makes it possible to do this, in a relatively limited space, without interfering with the positioning, or operation of, the brake-actuating assembly 94.

The five-bar linkage described above is actuated by the Rotac A11 through an arm 138 keyed to the shaft 124 of the Rotac, the arm 138 being operatively connected to the third link 122 by a helical spring 140, one of whose ends is pinned to the arm 138 at 142, the other end being pinned to the third link 122 at 143. This spring connection makes it possible to keep the suction head 96 in close relationship to the moving spinning ring 18 during the up-and-down movement of the latter, as will appear below.

When the ring rail 20 carrying ring assembly 18 has risen almost to the upper limit of its normal travel (e.g. to about one inch below said upper limit) the Rotac is actuated (through the operation of a cam-operated hydraulic valve V16) to bring the suction head 96 from the position shown in dotted lines in FIG. 13 (which is the same as the position shown in FIG. 15) to about the position shown in solid lines in FIG. 13. The extent of movement of the Rotac arm 138 is greater than is necessary to accomplish this, and the vacuum tube 100 is therefore pressed against the spinning ring 18 against the force of the spring 140. In the embodiment illustrated in the drawing, the spinning ring 18 is a two-part assembly of an upper traveler track portion 144 and a lower portion 145, and the side of the vacuum tube 100 is pressed against the inner side of an outwardly flared depending cam 146 carried by the lower portion 145, while a stop 148 fixed to the side of the tube 100 is pressed upward against the bottom of the cam 146. The vacuum pickup is thus kept in an accurate vertical and radial position with respect to the moving spinning ring. As will be seen from the drawing, the taper at the outer end of the vacuum tube 100 makes it possible for the suction head to enter the relatively narrow space between the upper tapered part of the bobbin and the spinning ring. Coordinating the actuation of the vacuum pickup linkage with the motion of the ring rail so that the inward movement of the suction head 96 is delayed until the ring rail is nearly at the upper end of its travel takes advantage of the increased clearance which is present because of the taper at the top of the windings of the full bobbin; at the same time it permits the bobbin to be wound, over most of its length almost to the full diameter of the spinning ring 18.

The cam 146, depending from the spinning ring 18, facilitates accurate positioning of the suction head 96 by guiding said head during its upward movement relative to the spinning ring.

In a preferred form the suction head 96 is arcuately flared, as seen in FIG. 14, along an arc which, when the vacuum head is pressed against the spinning ring 18, is concentric with the spinning ring. For a spinning ring having a 6-inch internal diameter, an arc of about 1 to 2 inches in length is quite suitable.

In commercial operations the traveler 22 may move around the bobbin at very high speeds, e.g. speeds on the order of 4000 r.p.m. or more. One function of the two-part spinning ring 18 is to help stop the traveler in a preselected position when the spindle is braked, so that the reach of yarn between the traveler and the now-stationary bobbin can be taken up readily by the suction head 96. This is accomplishes by blowing air in a controlled fashion at the traveler, through the spinning ring.

Preferably two currents of air are formed in the ring, in the annular space between its track portion 144 and its lower portion 145. These currents are blown at the traveler from opposite sides, so that the traveler stops at the point where the effects of the two currents neutralize each other.

The lower portion 145 of the spinning ring 18 has an upstanding circular wall 150 within the circular traveler track 152 of the track portion 144 (see FIGS. 13 and 15, and also FIGS. 19–24). This wall 150 is radially spaced from that track 152 a sufficient distance to permit free movement of the traveler 22 between the track and the wall. The top of the circular wall 150 is advantageously sufficiently below the top of the traveler to permit free passage of the yarn from the traveler to the bobbin. The lower portion 145 has a bottom wall 154 so that an air-conducting passageway 155 is formed between it and the track portion 144 of the spinning ring. Advantageously the lower ring portion 145 is so constructed that it is not integral with the track portion. In the embodiment shown in the drawing these two parts are so constructed that they can be snapped together, one or both being of plastic, with the track portion 144 having an annular ridge 158 (FIG. 21) adapted to co-operate with spaced ridges 160 (FIG. 22) on the lower portion 145 for this purpose. In that embodiment the lower portion 145 of the spinning ring may have integral therewith the depending flared cam 146 as well as lugs 162 (FIGS. 17 and 19) used for mounting the spinning ring on the usual threaded studs 163 carried by the ring rail 20. Additionally, or alternatively, the track portion 144 may also be provided with lugs adapted to be engaged by the upper portions of the same studs 163 to clamp the track portion in place.

Air is supplied to the passageway 155 between the lower ring portion 145 and the track portion 144, usually from a point on the ring about half-way round the ring from the desired stopping point of the traveler. In the embodiment shown in the drawing, the air is supplied, from a central source of compressed air (not shown) through suitable flexible tubes 166 (FIGS. 17 and 18) to a valved fitting 168 on the ring rail 20 from which fitting it is distributed through individual tubes 170 supported on the ring rail, to adapters 172 leading to branched inlets 174 (FIGS. 23 and 24) in the two-part spinning ring 18, each branched inlet 174 splits the incoming air into two controlled streams directed, through the passageway 155, around opposite sides of the spinning ring, as indicated by the arrows in FIG. 23.

The admission of air to the passageway 155 is controlled by a normally closed, spring-pressed push valve 182 (FIG. 17) in the fitting 168 mounted on the rail 20. This valve is in turn actuated by contact with an overhanging projection 184 (FIG. 18) extending from the doffing machine, which projection is in vertical alignment with the valve 182 when the doffing machine is in operative position. The position of the projection 184 is such that it is engaged by the valve when the rising ring rail reaches a point within about an inch from the top of its travel. This forces the valve 182 open, admitting air to the tubes 170, and keeps the valve open as long as the ring rail is within that inch or so from the top of its travel. See item 8 of FIG. 10.

Figure 28:
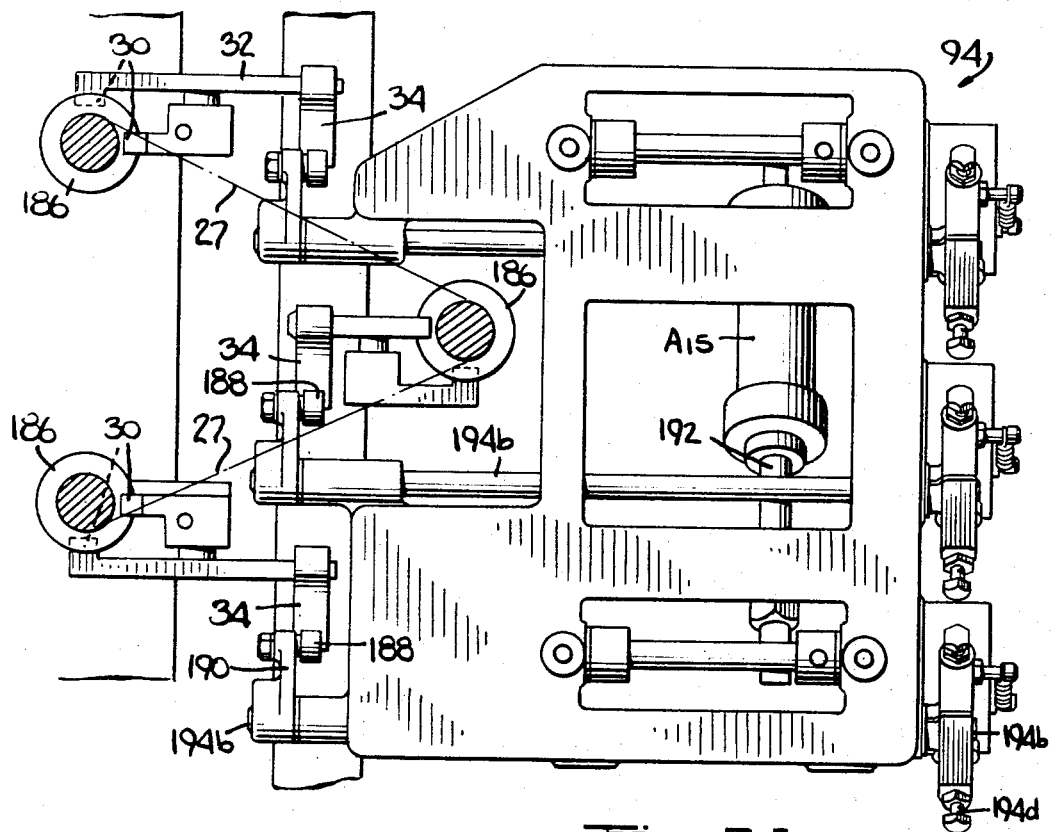
FIGURE 28 is a plan view illustrating the brake-actuating mechanism of the doffing machine.
Figure 29:
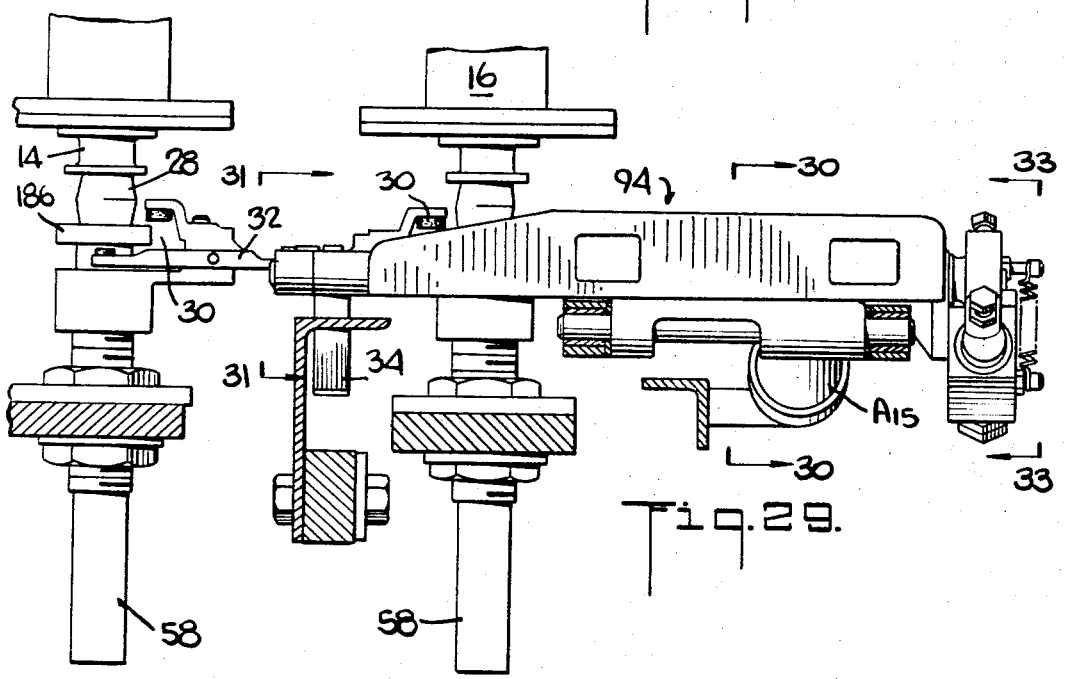
FIGURE 29 is a side view, partly in cross-section, of the parts shown in FIG. 28.

In the preferred sequence of operations, the air valve 182 is opened just before the spindle brakes are actuated. In one standard form of spindle brake there are pivoted brake levers 32 (FIGS. 1A and 29) projecting from the front of the takeup portion of the extrusion machine, below the bobbins. These levers operate the friction brakes 30 which are pressed against enlarged portions 186 of the spindles 14. When the ring spinners are arranged in trios, the brake levers 32 (see FIG. 31 as well as FIGS. 28 and 29) are arranged side-by-side in a position facing the aisle and may be operated by extension levers 34. The brake-actuating assembly 94 shown in the drawing has three rollers 188, each mounted on a spring loaded link 190 and situated beside the corresponding brake levers 32. The assembly 94 is operated by the retraction of the piston rod 192 (FIGS. 28, 30 and 31) of a hydraulic cylinder A15 (in turn controlled by a timing cam-controlled valve) which moves the assembly sidewise, on its supporting links 193, from the position shown in FIGS. 30 and 31, to the position shown in FIG. 32. During this movement the rollers 188 ride up against the ends of the extension levers 34 at the points where they contact the brake levers 32 and thereby depress the latter, bringing the spindles to a halt. Details of the spring loading of the links 190 are shown in FIG. 33, from which it can be seen that compression springs 194 exert their force on the links 190 through rocker arms 194a which, like the links 190, are clamped to long pivot pins 194b (see also FIG. 28); the ends of the springs 194 are encased in slidable caps 194c, and various screwed adjusting devices 194d, e and f may be provided for control of the spring loading and movement of the links 190.

As previously indicated, when the spindles stop and the traveler is halted at the desired position, the supply of yarn from the extrusion machine continues without a letup and the yarn, instead of winding on the spindles under tension, now is taken up by the suction head 96. (Previously, the tension in the winding yarn had been sufficient to prevent the yarn from being pulled into the suction head.) The supply of air to the spinning ring 18 is continued and this air continues to emerge, in a more or less annular curtain, from the space between the inner wall 150 and the track 152 (see also FIG. 25, on same sheet as FIG. 7). This curtain now serves to blow the yarn in the reach between the balloon guide 24 (FIG. 25) and the traveler 22 upwards and thus prevents this yarn from being sucked into the suction head 96 before it passes through the traveler. The vacuum pulls the yarn through the traveler and forms it into a continuously-lengthening loop 197 within the tapered tube 100 of the vacuum pickup assembly and the associated pneumatic hose 102; one end of this loop is, of course, at the fixed yarn windings on the now-stationary bobbin 16. By this time the ring rail 120 has reached the top of its travel and is starting to move downward. (Note FIG. 10.)

The next operation performed by the doffing machine is to clear the way for the full bobbins 16 to be lifted vertically through the spinning ring 18 and off the spindles 14. To facilitate this there is brought into action a yarn guide assembly, indicated generally as 198 (FIG. 12), mounted on an upwardly extending portion 199 of the frame 81 of the doff-readying assembly 80, above the vacuum pickup assembly 92. To operate the yarn guide assembly 198 there is a hydraulic cylinder A3 pivoted at its upper end 200 at a point near the top of the upwardly extending frame portion 199 and, like the other hydraulic cylinders, actuated upon opening of a suitable timing cam-controlled valve.

The yarn guide assembly 198 (see also FIGS. 2 and 34) includes three forwardly projecting balloon guide lifters 202, one for each balloon guide 24 of the trio of ring spinners, two of the balloon guide lifters being mounted on one arm 204 of a movable subframe 206 and the other balloon guide lifter being mounted on another arm 208 of the same subframe. The subframe 206 also carries three yarn-engaging hooks 210, positioned below and to the side of the balloon guide lifters. Two of these hooks are fixed to the respective arms 204 and 208, and the third is fixed diectly to the subframe 206. The subframe is supported for reciprocating and transverse motion on a slidable support 212 which rides on two pairs of wheels 214 and 216 on corresponding pairs of tracks 218 and 220, respectively, of the frame extension 199 of the doff-readying assembly. To guide the slidable support for rectilinear movement, the frame extension 199 has two straight aligned slots 222 (FIG. 34) in which ride two rollers 224 attached to the slidable support 212. The motion of the subframe 206 is guided, in accurate relation to the frame extension 199, by the engagement of another guide roller 226, attached to that subframe, in a compound slot 228 of the frame extension, the slot having a rectilinear portion 230, for the initial forward movement of the subframe 206 with the slidable support 199, and an arcuate portion 232 for the subsequent rocking motion of the subframe 206. The tracks 218 and 220 are tilted so that as the slidable support 212 moves forward, it also moves upwardly slightly. At both sides the slidable support 212 carries rockable arms 234 and 236, swivelled on pins 238, 240; at the ends of these arms the subframe 206 is pivotally mounted, on a second set of pins 242, 244. One of the rockable arms 236 has an extension 245 engaged by an adjustable push rod 246 which is actuated by a large bell crank 248 operatively attached to the hydraulic cylinder A3. Thus, in operation, the upward movement of the piston of the cylinder A3 rotates the bell crank 248 in a direction to urge the slidable support 212, and the subframe 206 carried thereby, rectilinearly from the position shown in FIG. 2 to the extreme forward position shown in FIGS. 12 and 34. Further forward movement of the piston of cylinder A3 causes the subframe 206 to rock, with the roller 226 of subframe 206 moving in the arcuate portion 232 of slot 228.

Each balloon guide lifter 202 has a roller 250 (see also FIGS. 39, 40 and 41), mounted on a horizontal axis, for pushing against the balloon guide 24, which is an element hinged at one end 252 and having a yarn-engaging portion at its other end 254. The balloon guide is thus tipped-up, as shown in FIGS. 39–41, to the stable position shown in FIG. 41. In this tipped-up position, the yarn-engaging portion of the balloon guide remains in contact with the yarn 8 which continues to travel in a nearly straight path from the metering roll 4 to the traveler 22.

The ballon guide lifter also includes a spring-biased hook latch 256 which is mounted on a generally vertical axis 258. At a later stage in the operation, the latch 256 serves to pull the balloon guide from the tipped-up position to its original position. When the balloon guide is in its normal position (shown in FIG. 39) the latch 256 clears the top of the balloon guide during the initial forward movement of the balloon guide lifter 202, and the balloon guide is brought into engagement with the inner side of the latch when that guide is tipped up by the roller 250, as shown in FIGS. 40 and 41. If a previous manual doffing has left the balloon guide in its tipped-up position, the forward movement of the balloon guide lifter will bring the outer cam surface 260 of the latch 256 into contact with the tipped-up balloon guide; the latch will then yield against the force of its spring and will, on further forward movement, snap back into place, taking the position shown in FIGS. 36 and 41.

During the forward motion of the subframe 206 the hooks 210 move in the direction indicated by the arrow in FIG. 35 to the position shown in FIG. 36, deflecting the yarn 8 slightly. During the rocking motion of the subframe 206, the hooks 210 and balloon guide lifter 202 move in the direction indicated by the arrow in FIG. 37. The hooks 210 thus move out of the area directly above the bobbins 16 and push the yarn, coming from the balloon guide, to the side. The space directly above the bobbin is then effectively clear.

At about the same time as the yarn guide assembly 198 is extended (see item 11 of FIG. 10), the Rotac A11 controlling the vacuum pickup assembly 92 is actuated (again by a timing cam-operated valve) to retract this assembly (see item 6 of FIG. 10) to its lower position shown in FIG. 15. The linkage arrangement supporting the vacuum pickup causes the suction head 96 to follow a path, clear of, but close to, the wound bobbin. The suction head 96 is now close to and just below the base of the bobbin 16 with the yarn still moving directly from the traveler 22 to the suction head 96. There is still a loop of yarn within the tapered tube 100 and the associated pneumatic hose and there is still a reach of stationary yarn between the suction head and the upper part of the yarn windings 261 on the stationary bobbin 16.

After the suction head 96 has moved well below the traveler 22, the air supply to the spinning ring 18 is shut off. This is accomplished by the downward movement of the ring rail 20, which movement carries the air-controlling push valve 182 (FIG. 18) below the overhanging projection 184 so that the spring of this valve can automatically close the valve. The position of the parts at this stage is such that there is no danger of drawing the yarn into the suction head before it passes through the traveler 22; the air curtain is thus unnecessary.

The machine then cuts the loop of yarn, but continues to take up the fresh yarn in the vacuum pickup. For this purpose there is provided a retractible pivoted cutter arm 262 which is supported on the vacuum pickup assembly 92 and whose lower, operative, end has a rearwardly facing hook 264 (FIGS. 14, 43 and 44). Before its retraction, to be described below, the cutter arm is positioned with its lower end just below the base 266 of the bobbin 16, so that the descent of the vacuum pickup head moves the yarn behind the hook 264. At this stage the moving reach of yarn, coming from the traveler 22, is entering the arcuate suction head 96 at about its midpoint; this is illustrated at point L of FIG. 14. The other, stationary, reach of your (between the suction head and the stationary yarn windings at the top of the bobbin) enters the arcuate suction head at one side, as illustrated at point M of the same FIG. 14. (It will be understood that this is the case when the winding direction of the now-stationary bobbin is clockwise as seen in FIG. 14, for the opposite direcon of bobbin rotation, to give a Z-twist, the stationary reach of yarn would be situated at the opposite side of the arc of the suction head and a reversal of parts would be needed.) The relationship of yarn, traveler, bobbin, and suction head at this stage is shown in perspective in FIG. 16. It will also be understood that the use of the points L and M is intended to illustrate the relationship between the reaches of yarn and the suction head; the suction head is actually, at this stage, in its retracted position (as shown in FIGS. 15 and 16) rather than in the extended position shown in FIG. 14.

The hook 264 of the yarn cutter has two oppositely directed cam edges 266 and 268 meeting at a rearwardly facing apex 270. One cam edge 268 also serves as one blade of a scissors, indicated generally as 272, whose other blade 274 is pivoted at the forward portion of the hook 264. The hook 264 is so positioned, in relation to the suction head 96, that the traveler-to-suction head yarn reach (indicated at L) is at one side of the apex 270, while the pickup head-to-bobbin yarn reach (indicated at M) is at the other side of that apex.

The retraction of the hook 264, by means to be described below, causes the reach of yarn at L to be deflected along the cam edge 266 and to slip past a nose 276 at the end of that edge; this yarn then moves, under suction tension, to a point O within the arcuate inner portion 278 of the hook. The retracting motion of the hook causes the other reach of yarn at M to be deflected along the edge 268, thus lodging the yarn between the blades of the scissors 272, which are then closed automatically to cut the yarn (FIG. 44). The suction of head 96 draws away the portion of yarn having the cut end below the scissors.

The hook 264 is, as previously stated, situated at the lower end of the cutter arm 262. The latter is pivoted at 279 at the end of a bracket 280 fixed to the frame extension 110 adjacent to the Rotac A11. The frame extension 110 also pivotally carries a hydraulic cylinder A8 whose rectractible piston rod 284 is pivotally connected, at 286, to the cutter arm 262. The cutter arm 262 supports one end of a coil spring 288 which is attached to the tail 290 of the scissors blade 274 and which serves to bias the scissors to its open position. Operation of the cylinder A8 (again by a hydraulic fluid regulated by a suitable timing cam-controlled valve) to retract the piston rod 284, thus swings the cutter arm 262 in a direction to retract the hook 264, as previously discussed. As this occurs, the tail 290 of the scissors blade 274 comes in contact with a projection 292 (depending from the frame extension 110) and, on continued movement of the cutter arm 262, the scissors blade is thus rotated to its closed position (shown also in phantom in FIG. 14), against the force of the spring 288, and the yarn is cut. The ring spinner is now fully prepared for removal of the wound bobbin from its spindle.

At the upper part of the doffing machine, a bobbin transfer assembly, indicated generally as 294 (FIG. 1) now functions to remove the wound bobbins and replace them by empty ones. The supply of empty bobbins is situated on the pins 296 of a stationary creel 298 mounted at the opposite side of the aisle B, the pins being arranged in groups of three positioned opposite, and in substantially mirror images of, the corresponding spindles of the ring spinner.

The bobbin transfer assembly 294 has a cross head 300 comprising two horizontally extending arms 302 and 304, each carrying a trio of chucks 306 adapted to grasp and carry the bobbins from a corresponding trio of the ring spinners or creel pins. The two arms 302 and 304 are joined by an integral central collar 307 and centrally supported, in diametrically opposed positions, for oscillating and vertical movement on a vertical oscillatable tube 308 (see also FIG. 47) and a rotatable lead screw 310 situated within the tube 308. Both the tube and the lead screw are supported by suitable bearings on a horizontal plate 312 fixed to the main body of the doffing machine. The two arms 302 and 304 are fixed, as by screws 314 passing through the central collar 307, to the two wings 316 of a central ball nut 318 (see also FIGS. 49 and 50) having an internal thread engaging a corresponding external thread of the lead screw 310. The two wings 316 of the ball nut ride in two straight vertical slots 320 of the tube 308. which slots extend for most of the length of that tube, intermediate its ends. Thus on rotation of the lead screw 310, the ball nut 318 moves rectilinearly up or down the tube 308, while on rotation of the tube the ball nut and its attached arms 302 and 304 rotate correspondingly.

The lead screw 310 is adapted to be driven, at the appropriate times in the doffing cycle, by a hydraulic motor A26 mounted on the plate 312. To this end, a drive gear 324, mounted on the shaft of the motor A26, meshes with a driven gear 326 mounted on a prolongation of the lead screw 310, both gears being situated on the underside of the plate 312, above a drip pan 328 supported by the plate.

The tube 308 is adapted to be rotated 180°, again at the appropriate time in the doffing cycle, by another hydraulic motor A4 supported on a bracket on the plate 312; a gear 332 mounted on the shaft of the motor A4 meshes with a ring gear 334 fixed to, and encircling, the tube 308.

Each chuck 306, shown in detail in FIGS. 54–57, has a pair of jaws 336 adapted to grasp the projecting knob 338 of a bobbin 16. These jaws, which are pivoted at 339 to a tubular core 340 are outwardly biased toward their inoperative position by springs 342 fitting in pockets 344 of the jaws and recesses 346 of the core; the springs abut against a sleeve 348 lining the core. To force the jaws to their operative bobbin-grasping position, at a suitable time during the cycle, there is a pneumatic cylinder A16 whose piston rod 352 has a shoe 354 slidably engaging projecting tails 356 of the jaws 336.

Each chuck 306 carries a projecting bobbin-centering pin 358 whose diameter is about the same as that of the spindle on which the bobbin is mounted. The centering pin is biased downwardly by a spring 360, within the core 340, which engages a shoulder 362 of the centering pin, which shoulder rides within the sleeve 348. Another sleeve 364 at the top of the core 340 acts to guide the upper part 366 of the centering pin 358. When the arms 302 and 304 carrying the chucks 306 are lowered, the tapered end 368 of each centering pin 358 enters the hollow central passage of the corresponding bobbin 16.

Each chuck 306 is supported within a hollow cylindrical housing 370 bolted at its upper end to one of the arms 302 or 304. To provide limited movement of the chuck, and its centering pin 358 (so as to compensate for slight differences in the positions of the bobbins on the ring spinners), the upper end of the core 340 is attached to its supporting housing by means of a horizontal link 372, which is hinged to the core by a pin 374 and which is hinged to the housing by a similar pin 276. The lower end of the core 340 is yieldably urged to a position concentric with the housing 370 by three radial springs 378 arranged 120° apart around the core. Each of these centering springs 378 fits in a corresponding recess 380 having a liner 382 in an integral lug 384 of the core 340; one end of each spring 378 abuts against the sleeve 348 while the other end is housed within a cap 386 having a rounded tip abutting a ring 388 fitted at the lower end of the housing 370.

The downward movement of the two-armed cross head 300 carrying the chucks 306 is initiated, after the yarn has been cut, by the actuation of a timing cam-controlled valve supplying hydraulic fluid to the proper inlet of motor A26 to drive the lead screw 310 in the proper direction to lower and cross head. When the crosshead approaches its predetermined lowermost position, this motion is brought to a smooth stop, gradually, by the closing of a suitable deceleration valve V25 (FIG. 48), on plate 312, which blocks the flow of fluid in the hydraulic circuit. The valve V25 is actuated gradually by engagement of its operating lever 392 with the nose of a suitable cam 394 driven by the rotation of the lead screw 310, the lower end of the lead screw being operatively connected to the cam 394 through clockwork gearing 395 (FIG. 52) also mounted below the plate 312.

After the crosshead 300 has reached its lowest position the individual air cylinders A16 of the chucks 306 are actuated to close the jaws 336 about the bobbin knobs 338. The air is supplied (under the control of a timing cam-actuated valve) to the individual cylinders A16 through flexible tubing (not shown) by a central compressed-air accumulator 398 (FIG. 4) supplied by a central air-compressing cylinder A23 (FIG. 4) which is in turn driven by a hydraulic cylinder A24. The use of air cylinders to operate the individual chucks avoids any drip of hydraulic fluid which might dirty the yarn or bobbins, but retains the advantages of overall hydraulic operation for those mechanisms which do not overlie the yarn.

The crosshead 300 is next returned to its uppermost position by a reverse rotation of the lead screw 310 driven by its hydraulic motor A26 after timing cam-actuation of a suitable control valve. This vertical movement of the crosshead carries the full bobbins up off their spindles and through the spinning rings 18 and above the tipped-up balloon guides 24, and similarly raises the empty bobbins. At the upper limit of the vertical travel of the crosshead, the rotation of the lead screw 310 is stopped gradually, in a way very similar to the way it was stopped at the lower limit, by the engagement of the clockwork-driven cam 394 with another deceleration valve V5. The timing of these movements of the crosshead and chucks is illustrated in items 12, 13 and 15 of FIG. 10.

The next step in the cycle is the rotation of the crosshead 300 to bring the full bobbins directly over the corresponding vacated spindles for subsequent placement thereon. As previously indicated, this 180° rotation is effected by the hydraulic motor A4 which is controlled by a suitable timing cam-actuated valve. The rotary movement is brought to a gradual stop by the action of a decelerating valve V8 (FIGS. 48 and 51), which almost completely blocks the flow of fluid in the hydraulic circuit of the motor A4. This decelerating valve V8 is mounted on the plate 312 and is controlled by a cam 404 extending from, and adjustably mounted on, the vertical rotatable tube 320. A similar cam 406 acts on the decelerating valve for the same purpose when the crosshead 300 is rotated in the opposite direction at a later stage in the cycle. Adjustable stops 408 are also provided to positively limit the rotation of the tube.

In certain yarn-producing plants the aisle space between extrusion machines is very limited. Since it is desirable to provide ample front-to-back space for the doffing machine, in one form of the invention provision is made for using correspondingly less space for the creel by spacing the creel pins closer together; that is, the row of creel pins at the apices of the trios is closer to the row of pins constituting the bases of the trios. To this end the spacings between the apex chuck, designated as 306a in FIG. 48, and the base chucks designated as 306b in FIG. 48 are changed during the rotation of the crosshead 300. The apex chuck 306a on each arm of the crosshead is mounted on a pivoted sector 410 which is biased by a spring 412 to a position (see left side of FIG. 48) in which the apex chuck is spaced from the base chucks by a distance equal to the distance between the apex spindle and the base spindles of each trio of ring spinners. At its rear side, adjacent the creel, the plate 312 carries an upstanding cam 414 (see also FIG. 53) adapted to be engaged by a roller 416 on the sector 410, so that each time the crosshead descends the sector will be cammed backward, against the force of the spring 412 (which is connected to the crosshead arm and the sector), thus bringing the apex chuck into alignment with the corresponding pin of the creel.

After its rotation, the crosshead 300 is next lowered so that the empty bobbins are placed on the spindles and the full bobbins are placed on the creel pins. The jaws holding the bobbin knobs are then opened and the crosshead is raised again. All this is effected under the control of the timing cams which, in appropriate sequence, actuate the valve controlling the supply of fluid to the crosshead lowering motor A26 and the valve controlling the supply of air from the accumulator A23 to the individual jaw—closing cylinders A16.

By this stage in the cycle the ring rail 20 has reached the lowest point of its vertical travel and is moving upwardly again. The balloon guides 24 are next returned to their original position by the retraction of the yarn guide assembly 198 actuated, under control of the timing cam, by the downward movement of the piston of the hydraulic cylinder A3. On this retraction the initial rocking movement of the subframe 206 permits the return of each yarn path, under the tension induced by the vacuum pickup, to the position it occupied before it was pushed aside by the hook 210. This rocking movement also brings the latch 256 of the balloon guide lifter 202 behind the tipped-up balloon guide 24 (as shown in FIG. 36), so that this guide extends between the latch 256 and the roller 250 of the balloon guide lifter. The rectilinear retraction of the subframe 206, immediately following the rocking movement, brings the balloon guide back to its normal operating position and also causes the hooks 210 to engage the yarn in the reach between the balloon guide and the vacuum pickup; this deflects the yarn path so that it is now clear of the top flange of the bobbin, as shown in FIG. 45.

Following the retraction of the yarn guide assembly, the spindle brakes are released, the empty bobbins begin rotating and the yarn is thrown onto these empty bobbins. Release of the brakes is effected by the sideward movement of the brake-actuating assembly 94, which is returned to its initial position by the extension of the piston rod of its timing cam-controlled operating cylinder A15. A short period of time (e.g., 2 seconds) after the release of the brakes, the yarn in the reach between the traveler 22 and the suction head 96 is thrown onto the bobbin, in the manner illustrated in FIGS. 45 and 46 by the action of the hook 264 of the cutter arm 262, which arm is returned to its extended position by extension of the attached piston rod 284 of its timing cam-controlled cylinder A8.

In the throwing on of the yarn, the mechanism makes use of the conventional throw-on yarn-receiving grooves which are formed either in the outer periphery of the base flange 266 of the bobbin or in the outer periphery of a catch pad 411 on which the bobbin is supported. The movement of the cutter arm 262 causes the hook 264 to pull the yarn from a point P (FIG. 14) back to the point O below the outer periphery of the base flange (or catch pad) of the rotating bobbin, so that the yarn travelling to the suction head 96 rubs against this rapidly rotating outer periphery, catches in the throw-on groove, and then breaks between the groove and the suction head. The yarn thus starts winding around the bobbin.

During the braking and throw-on period, the crosshead of the bobbin transfer assembly is rotated 180° back to its original position by the same mechanism as was employed for its original rotation, the hydraulic fluid being supplied to the apropriate hydraulic motor A4 in the reverse direction by a suitable timing cam-actuated valve.

After throw-on the doff-readying mechanism 80 is retracted (by the action of its hydraulic cylinder A7 which brings its slidable frame 81 back to its idle position), the centering shoe 66 is likewise withdrawn to its idle position (by the action of its cylinder A5), thus unlocking the doffing machine from the trio of ring spinners, and the fluid is permitted to flow from the hydraulic cylinder A6, thus lowering the rear end of the doffing machine onto its drive wheels 40, 42. These operations are initiated by timing cam-actuated hydraulic valves. Retraction of the doff-readying mechanism also opens a hydraulic valve which causes the fluid supply to the series-connected drive motors A1 and A2 to be resumed, and the machine starts to travel along the aisle to its next position. The fluid flowing from these drive motors passes through a previously opened valve V3 (FIG. 11, to be discussed later). During the movement of the doffing machine along the aisle the feeler 56 (FIGS. 5 and 6), which controls the deceleration valve V4 for drive motors A1, A2, moves out of contact with the spindle bolster and snaps open, thus providing two pathways for fluid exhaust from those motors. Shortly thereafter the valve V3 is closed by the timing cam, leaving the motors under the control of the deceleration valve V4.

Further movement of the doffing machine along the aisle brings its feeler 56 into contact with the next apex spindle bolster 58 and the machine thereupon gain accurately positions itself and extends its doff-readying mechanism 80, all in the manner previously described.

The synchronous timing motor 77 (FIG. 4) then shuts itself off by camming a limit switch 430 which cuts off its supply of electricity. As described earlier, the synchronous motor is started again by movement of the ring rail 20, at a particular phase of that movement. This insures synchronization of the position of the timing cams with the position of the ring rail.

During each doffing cycle the doffing machine also performs a tailing operation on the trio of spindles it has just doffed, to break the reach of yarn (FIG. 60) extending from the lower portion of the windings to the bobbin base flange 266, which would otherwise interfere with subsequent windings on the lowermost portion 431 of the cylindrical part of the bobbin 16. At the same time, the machine removes the portions of yarn which have become wrapped around part of the spindle below the bobbin. These operations are performed by tailing unit 432 (FIGS. 2 and 58), carried at the side of the doffing machine. This tailing unit comprises three tailing sub-assemblies 434, one for each ring spinner of a trio, mounted on a bifurcated support 436 which is in turn mounted on the doffing machine by means of a pair of parallel links 438 (FIG. 59), each pivoted at both its ends.

Each tailing sub-assembly 434 includes a freely rotatable non-sparking wire brush 440 (see also FIG. 61) adapted to be brought into engagement with the waste yarn 441 wound on the rotating spindle 14 below the bobbin 16, and a pair of vacuum pickup tubes 442 and 444 for sucking off the pieces of yarn freed by the action of the brush 440. It also includes a nose 446 adapted to be brought into contact with the upper side of the lower flange 266 of the rotating bobbin so as to block, and thus break, the reach of yarn between the flange and the windings. These elements are all mounted on a subframe 448 (FIG. 59) which is carried by the support 436, there being a pair of parallel links 450 and 452, each pivoted at its upper end to the support 436 and at its lower end to the subframe 448. The subframe 448 is resiliently held in its most forward position, with respect to the support 436, by the action of a helical spring 454 attached at one end to the support and at the other to the link 450. The brush 440 is freely mounted on a pin 456 at the forward end of the subframe 448 while the pickup tubes 442 and 444 are fixed to both sides of the subframe and are connected to the vacuum pump 104 by means of flexible lines (not shown). The nose 446 is at the end of a finger 458 pivoted to the subframe 448 at a pin 460. This finger, which is situated at the midline of the subframe 448 and supported between the spaced parallel upstanding sides 462 (FIG. 58) of the subframe, is resiliently biased, to keep its nose 446 raised, by the action of a helical spring 464 stretched between the tail 466 of the finger and the lower part of the subframe. The upward tilting of the finger is limited by contact thereof with the lower part of a block 468 mounted on the subframe 448. A resilient connection between the finger and the subframe is also provided by a spring 470 which is pocketed within the block 468 fixed to the subframe. To insure interception of the yarn by the nose 446, the nose carries a forwardly projecting spring-pressed pivoted elements 474 (pivoted at 476 and pressed by spring 478).

In operation the tailing unit 432 is moved forward from the position shown in FIG. 2 to that shown in FIGS. 58, 59 and 61 by the action of a hydraulic cylinder A27 (FIG. 59) which is pivoted to the doffing machine and whose piston rod 482 is pivoted to the link 452. The forward end of the subframe 448 hangs down below its expected operating position and is lifted upward into accurate alignment with the ring spinner by the camming engagement between lower flange 266 of the bobbin and the forward-moving inclined edge of the nose 446. Thus, the tailing unit can accommodate itself, within a limited range, to bobbins situated at various levels on the extrusion machine. If by some accident, the tailing unit is at some time in such a projected position that it is struck by the downwardly moving ring rail, the finger 458 can yield, against the force of spring 464, and the subframe 448 can yield, against the force of springs 470 and 454, so that no damage is done.

The doffing machine also includes means to handle the situation arising when a bobbin is stuck to its spindle or creel pin. The chuck jaws 336 (FIG. 54) are so formed that their knob-engaging faces 490 are, like the portion of the knobs 338 which they engage, inclined with respect to the vertical movement of the chucks. If, after these jaws have closed on the knobs 336 and the crosshead is rising, a full bobbin sticks to its spindle and will not move upward, the upward movement of the jaws will thus force them off the knob of the stuck bobbin, against the air pressure in the jaw-closing cylinder A16. A shoulder 491 of the spring-pressed centering pin 358 continues, however, to rest on the top of the knob, and there is accordingly relative motion between the chuck and its centering pin. This relative motion starts a sequence of occurrences, as a result of which the crosshead descends again to replace the raised bobbins on their original positions, the vacuum supply to the suction heads is shut off, and the yarn starts winding on the metering roll 4 of the extrusion machine. These events are triggered by depression of either of two air valve control arms 492 (FIGS. 47 and 53), one of which is mounted on each arm 302, 304 of the crosshead. These air valve control arms are operatively connected to air valves V20 (normally spring-pressed to closed positions). To open an air valve V20 when a bobbin is stuck there is provided at each arm 302, 304 a plate 494 which is supported, above the rod 492, on the upper ends 366 of the centering pins 358. The plate 494 is mounted in such fashion that it tips sufficiently when any one centering pin is depressed and is thus brought into contact with the arm 492, pressing the latter to move its valve V20 to its open position; there is sufficient play, for this tipping motion, in the connections between the upper ends of the centering pins 358 and the plate 494. The plate 494 also has an arcuate slot 496 to accommodate the previously described movement of the axis of the apex chuck towards and away from the base chucks. While the valve 494 will normally be depressed by the plate 494 when the chucks are in their at-rest position, the arrangement of the air-lines and air cylinders is such that such depression of the valve has no effect except at the time when the air in the pneumatic lines leading to the jaw-actuating cylinders is under pressure. The remaining steps in the stuck-bobbin sequence will be described later, when the overall arrangement of valves and cylinders is discussed.

To collect the yarn taken up by the vacuum pickup, the doffing machine carries a waste bin 500 (FIGS. 2 and 3). The waste bin is maintained under subatmospheric pressure, being connected to the vacuum pump 104, and its cover 502 has four inlets 504 for receiving yarn from the flexible hoses leading from the three vacuum pickups 96 and from the trailing unit. The cover 502 carries a slidable blade 506 which is normally maintained in its inactive position but which, during a stuck-bobbin cycle, is moved by the piston rod 508 of a hydraulic cylinder A25 to block the inlets 504 and cut the yarn at those inlets.

In the hydraulic and pneumatic circuit illustrated in FIG. 11, the symbols employed are the proposed American Standard Symbols described in the periodical "Machine Design," Dec. 12, 1963, pages 11 to 15. As previously stated the energy for driving the hydraulic motors and actuators is supplied from a hydraulic pump 50 driven by the electric motor 52 and drawing hydraulic fluid from a return tank which is indicated by the symbol ⊥ throughout FIG. 11. The fluid is taken from the return tank through a coarse filter 516 through the pump 50 through a finer filter 518 past a pressure gage 519; if the fluid pressure is too high it is relieved by a pressure relief valve V50, which bypasses a portion of the fluid to the return tank.

As will be seen from the subsequent description of FIG. 11, many of the hydraulic circuits are interconnected in such a fashion that one circuit will not operate if the mechanism controlled by another circuit could be damaged by the operation of the first circuit. For example, fluid will not flow to the machine travel circuit or to the yarn guide circuit (both these circuits being shown to the left of FIG. 11) if the two-position interlock valve V5 of the crosshead circuit is in a position indicating that the crosshead 300 is lowered.

The various interlock valves are shown on the hydraulic circuit diagram (FIG. 11), but are generally not illustrated on the other figures, to avoid complicating the drawings unnecessarily. The selection of appropriate positions for these interlock valves will be obvious in the light of the functions they perform; see, e.g., valve V14 (FIGS. 26 and 27) controlled through rod R connected to link 114.

Figure 62:
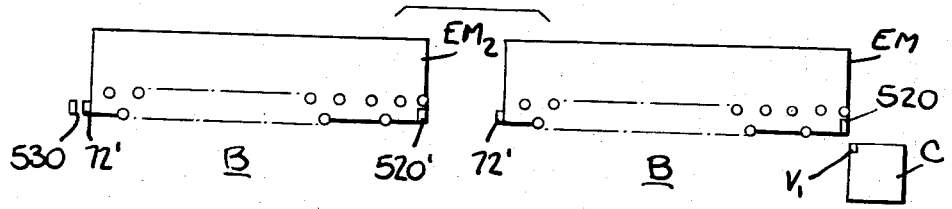
FIGURE 62 is a schematic view showing the relationship between several extruding machines and the doffing machine.

In the machine travel circuit there is a three-position valve V1, shown in its central, blocking, position. When the doffing machine is at the beginning of an asile and it is desired to begin the doffing of a whole series of trios of ring spinners the valve V1 is moved in any suitable manner (toward the left in FIG. 11) to a position in which it permits fluid to flow through it in the forward direction (provided, of course, that the other appropriate valves in the circuit are open) through hydraulic motors A1 and A2. Actuation of the valve V1 may be effected by a timer (not shown), which is connected to the extrusion machine EM. When the extrusion machine is ready for doffing the timer moves a suitable actuator 520 (FIG. 62, below FIG. 1A) on the extrusion machine which pulses the valve V1 to its "forward" position. The flow of fluid through the motors A1 and A2 is regulated by adjustable flow control orifices 521 and 522. Suitable check valves V53 and V54 prevent undesirable reverse flow.

At the time of actuation of valve V1, bypass valve V3 in the machine travel circuit is in its released (closed) position, but the fluid flows through the motors A1 and A2 through a circuit including the open interlock valve V5, another open interlock valve V2 and deceleration valve V4. The deceleration valve V4 is open, since the feeler 56 (FIGS. 5 and 6) is not depressed by a spindle bolster 58. The open position of the interlock valve V2 indicates that the doff-readying mechanism 80 is retracted. It will be appreciated that the valve V3 is normally controlled by a timing cam operated by the synchronous timing motor 77 of the doffing machine, but that the timing motor has not yet been started, in this initial operation of the doffing machine at the head of the aisle.

When the doffing machine approaches its operative position, the closing of the deceleration valve V4 by the contact of feeler 56 with an apex spindle bolster 58, as previously described, brings the machine to a halt in approximately the operative position, and also opens the valve V10 (in the centralizing circuit). The opening of V10 permits fluid to flow (in a circuit including a pressure-reducing valve V56 and pressure gauge 523, a previously opened valve V9 and an adjustable flow control orifice 524) through hydraulic cylinders A5 (for the centering shoe 66) and A6 (for the supporting foot 74), in a direction to extend the centering shoe and supporting foot, and to maintain these parts in their extended positions. Cylinders A5 and A6 are arranged in parallel in the circuit. (Valve V9 is usually under the control of a timing cam, but operation of the timing cams has not yet begun, as mentioned above.)

Opening of valve V10 also permits fluid to flow through a circuit including previously opened valve V11 (again, normally under the control of a timing cam whose operation has not yet begun) to the cylinder A7 in a direction to extend, and keep extended, the doff-readying mechanism. To insure that the parts are in the proper position the circuit includes interlock valves V12 (whose open position indicates that the brake-actuating mechanism is not extended), V13 (whose open position indicates that the yarn guide assembly is not extended) and V14 (whose open position indicates that the vacuum pickup assembly is not extended). For adjustment a variable orifice 525 is included in the circuit.

After the synchronous timing motor 77 has been started (by contact of the limit switch 75 with the upwardly moving ring rail 20) one of the timing cams 79 then actuates another two-position reversing valve V16 in the circuit of the vacuum pickup, moving this valve to a position where fluid flows through it to the three Rotacs A11, through an interlock valve V17 (whose open position indicates that the doff-readying mechanism is extended). For adjustment variable orifices 526 are included in the circuit.

The next valve to be actuated by a timing cam is V19 in the brake-actuating circuit; this two-position reversing valve is moved to a position where fluid flows through it to the cylinder A15.

Thereafter a timing cam actuates another two-position reversing valve V6 so that fluid flows therethrough to the cylinder A3 to extend, and keep extended, the yarn guide assembly. For adjustment a variable orifice 527 is included in the circuit. Here again the interlock valve V5 must be in open position, indicating that the crosshead is raised.

The timing cams thereafter:

Move valve V16 to reverse position, causing vacuum pickups to retract;

Move a two-position reversing valve V15 to reverse position permitting fluid to flow to cylinders A8 in a direction to retract the cutter arm 262;

Move a two-position reversing valve V24, in the crosshead vertical circuit, to a position (moved toward the right in FIG. 11) permitting fluid to drive the motor A26 in the crosshead-lowering direction. An interlock valve V26, open at this time because the yarn guide assembly is fully extended, is in the same circuit. The flow of fluid through motor A26 is regulatable by an adjustable orifice 529. Suitable check valves (e.g. V60) prevent undesirable reverse flow. As previously indicated, when the crosshead approaches its lowest position, its motion actuates the decelerating valve V25 to gradually almost block the flow of fluid through the crosshead vertical circuit. A spring-loaded relief valve V64 in this circuit permits bleeding of fluid through an exhaust line directly to the return tank to prevent undesirable pressure surges which may be caused by deceleration of the crosshead.

The timing cams then actuate a two-position reversing valve V22 in the chuck-actuating circuit, which admits compressed air to the chuck-actuating air cylinders A16 in a direction to cause the chuck jaws to close and grasp the bobbins. A supply of compressed air has previously been built up in the accumulator tank 398 by air compressing cylinder A23 actuated by hydraulic cylinder A24. Cylinder A24 is caused to cycle automatically and continuously by interaction with control valves V31 and V32. Thus valve V31 is actuated by A24 at each end of its stroke, and V31 in turn actuates a pilot valve V32 to reverse the flow of fluid to A24. A suitable check valve V66 maintains the pressure in accummulator tank 398.

When compressed air is admitted to the cylinders A16 it also flows (past a check valve V68) through valves V20 to another cylinder A22, for use in the stuck bobbin cycle, as will be described later.

A timing cam then moves the valve 24 (in the crosshead vertical circuit) in the opposite direction, reversing the flow of the hydraulic fluid to the motor A26 so that the crosshead rises, its terminal motion being decelerated by the action of decelerating (and interlock) valve V5.

The tailing mechanism is then operated. To this end a timing cam moves a two-position reversing valve V30 to a position in which the fluid is admitted to the cylinder A27 to extend the tailing mechanism. An interlock valve V29 is in the same circuit, but is maintained open as long as the "stuck-bobbin" circuit (to be described below) is inactive.

Rotation of the crosshead is the next step, effected when a timing cam moves a two-position reversing valve V7 to a position in which the fluid flows through it to drive the motor A4 in a direction to rotate the crosshead 180°, the rotation being brought to a smooth stop by the almost complete closing of the deceleration valve V8. Interlock valve V5, also in this circuit, is open when the crosshead is at its uppermost position, but otherwise would block the flow. As with the circuits for motors A1, A2 and A26, there are adjustable flow control valves 540 and 541 and check valves V72 and V73 to insure that the flow occurs at the intended rate and in the intended direction.

The tailing mechanism is then retracted by timing cam-actuation of valve V30 to reverse the flow direction, following which V24 is again reversed by a timing cam, causing the crosshead to move downward to the bottom of its travel. The bobbin chucks are then opened by a similar timing cam-actuated movement of valve V22 to exhaust the air from cylinders A16.

When the winding machine is of the type having bobbin drive lugs (as on the catch pads 411 supporting the bobbins) which lugs engage detents in the bobbin base flanges 266, it is advantageous to include a timing cam arranged to operate, momentarily, the brake-controlling valve V19 (just after the bobbin chucks are opened) so as to deenergize the spindle brakes for a time sufficient to allow the bobbin drive lugs to engage the detents. Because of the presence of the centering pins 358 within the central passages of the bobbins at this moment the bobbins are frictionally retarded (by their contact with pins 358); this makes for relative movement between the bobbins and the supporting catch pads and thus facilitates seating of the lugs in the detents. Directly thereafter the cam causes the valve V19 to move in a direction to reenergize the brakes.

The crosshead is then driven upward by timing cam-actuated movement of the valve V24 reversing the flow through motor A26. Next the timing cams, in sequence, release, for spring actuation, the following:

valve V6 to retract the yarn guide mechanism;
valve V19 to move the brake-actuating mechanism to "brake-off" position, allowing the spindles to start rotating again;
valve V7 to cause the crosshead to rotate back to its original position (if interlock valve V5 indicates that the crosshead is raised);
valve V15 to move the cutter hook forward (provided interlock valve V14 indicates that the vacuum pickup is retracted); and
valve V11 to retract the doff-readying mechanism (if interlock valves V12, V13 and V14 indicate that the brake-actuating, yarn-guiding, and vacuum-pickup mechanisms are retracted).

A timing cam also operates valve V9 in the centralizizing circuit to cause retraction of the centering shoe 66 and supporting foot 74.

Figure 10:
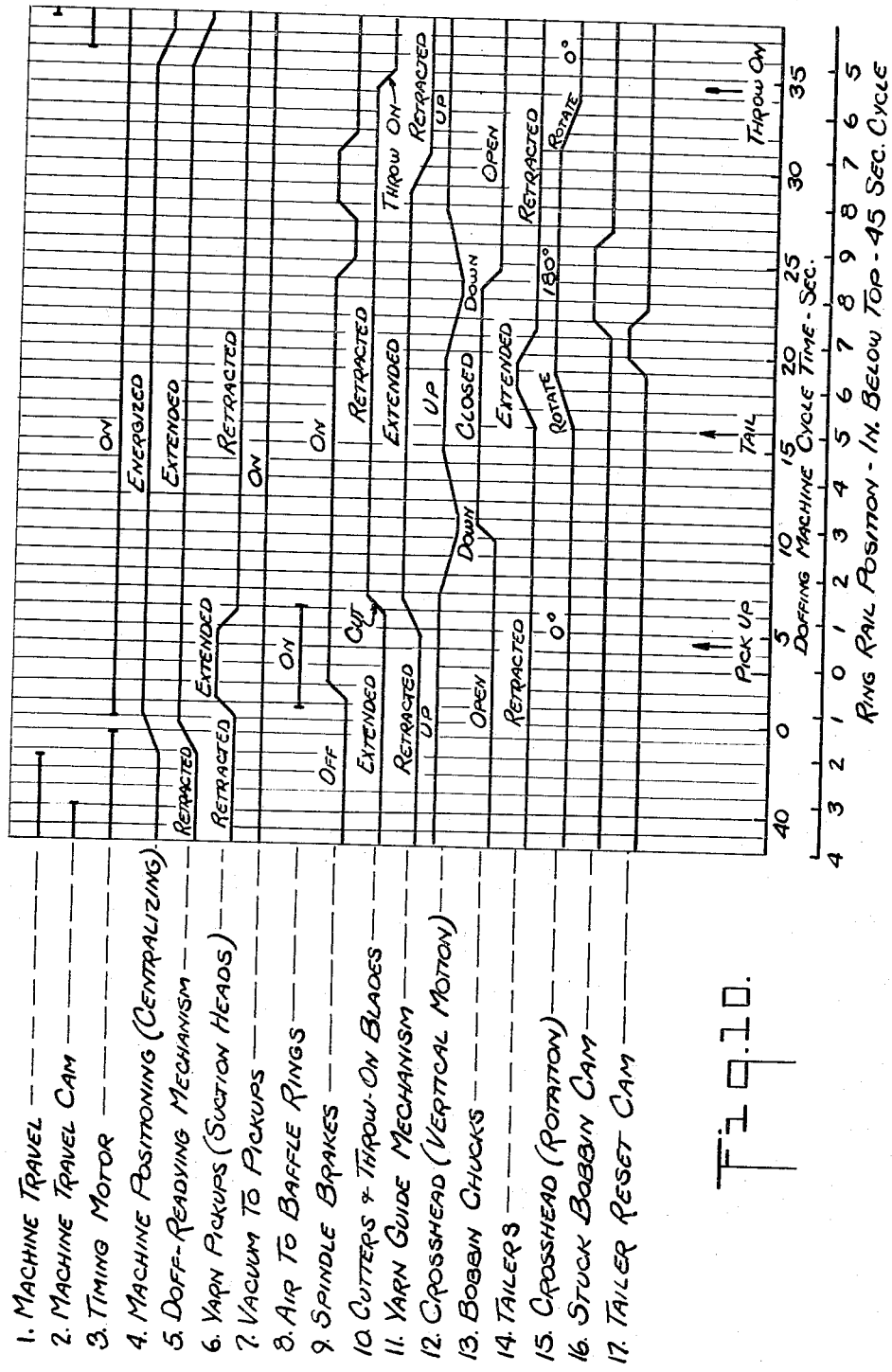
FIGURE 10 is a timing chart indicating the sequence of various operations of the doffing machine, at a 45 minute ring rail cycle with a ring rail travel of 9 inches.

Another timing cam (designated as the "machine travel cam" in the timing chart of FIG. 10), also driven by the timing motor 77, actuates a valve V3 just prior to the retraction of the doff-readying mechanism.

The retraction of the doff-readying mechanism opens interlock valve V2 permitting fluid to flow to machine travel motors A1 and A2 (provided that valve V5 indicates that the crosshead is up), the previous actuation of V3 having opened the exhaust circuit from A1 and A2. The machine then advances to the next winding station (note item 1 of FIG. 10), while timing cams re-position the valves V9 (in the centralizing circuit) and V11 (in the circuit of the doff-readying mechanism) so that these mechanisms will operate again when valve V10 is again opened by contact of feeler 56 with the next apex spindle bolster 58. Shortly thereafter (as indicated at item 3 of FIG. 10) the timing motor shuts itself off, as by the actuation of a suitable microswitch by a cam driven by the timing motor.

If a bobbin sticks, the resulting actuation of one of the two air valves V20 (previously described) exhausts the compressed air from the cylinder A22 releasing an interlock valve V28 which partially controls the circuits for crosshead vertical and tailing mechanisms.

The release of valve V28 permits fluid to flow through that valve into two different branches. Thus, fluid is admitted to the operator of pilot operated valve V23 which blocks the flow of fluid to crosshead vertical motor A26 so that the vertical movement of the crosshead is brought to a stop. Second, release of valve V28 admits fluid to the inlet of a valve V27. (This valve V27 is normally actuated by the stuck bobbin cam portion of the timing cam at a point in the cycle, as indicated in the timing chart FIG. 10, item 16, but, since the valve V28 normally blocks the flow of fluid to valve V27, the latter is usually ineffective.) The flow of fluid through valve V27 admits fluid to the operator of a pilot operated valve V29 to block the circuit of the tailing mechanism, so that the tailing mechanism will not engage the unremoved full bobbins when the doffing machine has traveled to the next trio of ring spinners.

Fluid is also admitted through valve V27 to the cylinder A25 at the waste bin 500 to block the latter and cut the yarn, as previously described; since there is accordingly no force pulling yarns from the metering roll, the yarns start winding around that roll.

Since the crosshead is prevented, at this stage in the stuck bobbin cycle, from rising to the top of its stroke the interlock valve V5 is blocked and no rotation of the crosshead takes place.

Thereafter the actuation of the valve V24 (and the release of valve V22) by the timing cam causes descent of the crosshead and release of the bobbin knobs. Release of valve V22 also admits compressed air to cylinder A22, thus causing valve V28 to move to its actuated position, which in turn removes pressure from the operator of valve V23, allowing valve V23 to return to its normal position, and also deenergizes waste bin cut off cylinder A25. The timing cam then releases valve V24, causing the crosshead to rise again, and the machine goes through the motions of the remainder of the cycle and travels to the next trio of ring spinners to begin a new cycle, leaving the yarns winding on the metering roll of the previous trio. In the next cycle, the tailing of the bobbins of the previous trio is prevented (as previously described) and the valve V29 is reset (by the tailer reset cam portion of the timing cam, as indicated in the timing chart, FIG. 10, item 17) to permit future normal tailing operations.

During some portions of a normal cycle, valves V20 will be in the actuated position. During these periods valve V28 is held in its actuated (unreleased) position, blocking the flow of air therethrough, by air cylinder A28 which is in its extended position whenever valve 22 is in such position that the bobbin chucks are open.

When the doffing machine reaches the end of its predetermined travel on the aisle, it is positioned, for performance of the tailing operation at the last trio of ring spinners by engagement of its centering shoe with a detent plate 72' (identical with detent plate 72) (FIG. 62) mounted on the extrusion machine EM. At this position the doffing machine runs through its cycle, but obviously is effective only for the tailing. Thereafter the machine proceeds to its ready position at the next extrusion machine EM2, where it is stopped (awaiting the operation of the timer of that extrusion machine), by return of its valve V1 to its center position by contact of said valve V1 with a movable actuator 520' (like the actuator 520 of the first extrusion machine EM). Subsequent movement of actuator 520' by its timer returns valve V1 to its "forward" position to start the whole sequence at the second extrusion machine EM2.

At the end of the second extrusion machine EM2, which is otherwise identical with the first machine EM, there is a stop 530 which is engaged by the valve V1 during the travel of the doffing machine to shift the valve V1 to its "reverse" position, admitting fluid to the motors A1 and A2 to drive them in the reverse direction and thus return the doffing machine to its original position. It will be appreciated that the doffing machine may be similarly operated for only one extrusion machine by suitable placing of a stop 530 on each extrusion machine, or a series of more than two extrusion machines may be doffed by a single doffing machine.

It is to be understood that the foregoing detailed description is given merely by way of illustration, and that variations may be made therein without departing from the spirit of this invention.

The embodiments of the invention in which an exclusive property or privilege is claimed are defined as follows:

1. A doffing machine for operating sequentially at successive winding stations of a multistation winding machine at each station of which a strand is wound onto a package while being traversed along the length of said package by traversing means moving back and forth along the package, said doffing machine being movable from winding station to winding station during its sequential operation, means, carried by said doffing machine, for performing at least one portion of a package doffing cycle while said traversing means continues its back-and-forth movement, and means responsive to the position of the traversing means at a winding station for initiating operation at said station of said doff-performing means.

2. A doffing machine for operating sequentially at successive winding stations of a multistation winding machine at each station of which a strand is wound onto a package while being traversed along the length of said package by traversing means moving back and forth along the package, said winding machine having individually operable winding brakes at said successive winding stations, said doffing machine being movable from winding station to winding station during its sequential operation, and having means for actuating the winding brake at a station while the traversing means at said station continues its back and forth movement and at a predetermined phase of said back and forth movement.

3. A doffing machine for operating sequentially at successive winding stations of a multistation winding machine at each station of which a strand is wound onto a package while being traversed along the length of said package by traversing means moving back and forth along the package, said doffing machine being movable from winding station to winding station during its sequential operation, and having means for taking up the strand from said traversing means at a station while the traversing means continues its back and forth movement.

4. A doffing machine as set forth in claim 3 and having suction means for taking up the strand from said traversing means at a station while the traversing means continues its back and forth movement.

5. A machine for use in the doffing of a strand package at a winding station at which the strand is wound onto said package while being traversed along the length of said package by traversing means moving back and forth along the package, said machine having means for taking up the strand from said traversing means, said means for taking up the strand including a suction head for sucking in the strand passing between said traversing means and said package, and means for moving said take-up means from an inoperative position into a position to engage the strand passing between said traversing means and said package.

6. A winding apparatus comprising a multistation winding machine at each station of which a strand is wound onto a package while being traversed along the length of said package by a traveler running around said package on a circular track moving back and forth along the package, a doffing machine for operating sequentially at successive winding stations of said multistation winding machine, said doffing machine being movable from winding station to winding station during its sequential operation, said apparatus having means for stopping the movement of the traveler on said track while said track continues its back and forth movement.

7. Apparatus as set forth in claim 6 in which said stopping means halts the movement of said traveler at a predetermined position on said track.

8. A winding apparatus as set forth in claim 7, said stopping means halting the movement of the traveler at said predetermined position when said doffing machine is at the winding station having the traveler which is being stopped, said predetermined position being in that portion of the circular track which is closest to said doffing machine.

9. A machine as set forth in claim 5 in which said suction head has an arcuate yarn-receiving opening adapted to the position with its arc substantially concentric with said package.

10. A winding apparatus having a movable strand guide for traversing a strand on a yarn package being wound, and means for establishing a current of fluid at said guide to bring said guide to a halt at a predetermined position.

11. A winding apparatus as set forth in claim 10 in which said means establishes a current of gas directed at said guide.

12. A winding apparatus as set forth in claim 10 in which said means establishes opposed currents of fluid directed at said guide.

13. A winding apparatus as set forth in claim 10 in which said guide is movable in a path around said package, and said means establishes opposed currents of gas directed around opposite sides of the package to bring said guide to a halt at a point in its path determined by the interaction of said currents.

14. A traveler ring for a ring spinner, said ring having a passage for the admission of gas, said gas passage being adapted to be connected to a zone at a pressure other than atmospheric, to establish a current of gas directed at the traveler carried by said ring said gas passage being further characteried by a construction such that gas is directed at the traveler in the direction to oppose the movement of the traveler and is also directed at the reach of the yarn passing to the traveler.

15. A traveler ring for a ring spinner, said ring having means for establishing a stream of gas against the reach of yarn passing to the traveler on said ring.

16. A traveler ring for a ring spinner, said ring having a passage for the admission of gas and having an inwardly disposed circular track for a traveler an inner ring defining within said track an annular passage for fluid in the path of said traveler, and inlet means for admitting fluid to said passage to establish a current of fluid directed at the traveler, the construction and arrangement of the passage being such that a current of gas is directed from said passage at the reach of yarn passing to the traveler.

17. A traveler ring as set forth in claim 16, said inlet means providing a two-branched gas path for establishing a current from each branch.

18. A strand-handling apparatus for use with a strand-winding machine in which the strand is wound onto a package and is traversed on the package by a traveler of a ring spinner, said traveler moving on a circular track about said package, and mounted on a rail which moves back and forth along said package, said apparatus having means including a suction head suitable for selectively receiving strands between the traveler and the package and at a predetermined location adjacent to portions of the circular path of the traveler, means for stopping the movement of the traveler at a point in its path adjacent said predetermined location, means for moving said take-up means from an inoperative position to said predetermined location and means for shielding from said suction head the reach of the strand passing to the traveler while keeping said reach under tension and establishing a current of gas to blow said reach away from said suction head.

19. A strand-handling apparatus as set forth in claim 18, said shielding means and stopping means including a passage for gas adjacent said track, inlet means for admitting gas to said passage constructed and arranged to establish two currents of gas moving in opposite directions in said passage to thereby stop the movement of traveler at a predetermined portion of the track determined by the opposing forces of said track, and an opening for discharging from said passage, a current of said gas in a direction to blow said reach away from said suction head.

20. A doffing apparatus suitable for use with a strand-winding machine to which a strand is supplied continuously and in which the strand is wound onto a rotating package while being traversed along the length of said package by traversing means moving back and forth continuously along the package, means normally inoperative during the winding operation, for taking up the continuously supplied strand when the rotation of the wound package is stopped, takeup operating means for rendering said takeup means operative to receive the strand before said strand reaches the package, to thereby take up the strand when the rotation of the package is stopped, and for moving the takeup means separately from the traversing means to a position, adjacent one end of the package, from which the strand passing to said takeup means can be readily engaged with the end of an empty package donned onto said winding machine after the wound package has been removed.

21. Apparatus as set forth in claim 20 in which the takeup means has a suction head for receiving the continuously-supplied strand, and the takeup device is movable to said position without interrupting the normal back and forth motion of said traversing means.

22. A doffing apparatus suitable for use with a strand-winding machine to which a strand is supplied continuously and in which the strand is wound onto a rotating package while being traversed along the length of said package by traversing means moving back and forth continuously along the package, means, normally inoperative during the winding operation, for taking up the continuously supplied strand when the rotation of the wound package is stopped, takeup operating means for rendering said takeup means operative to receive the strand before said strand reaches the package, to thereby take up the strand when the rotation of the package is stopped, and for moving the takeup means to a position, adjacent one end of the package, from which the strand passing to said takeup means can be readily engaged with the end of an empty package donned onto said winding machine after the wound package has been removed, said takeup operating means operating and moving said takeup without interrupting the normal back and forth motion of said traversing means.

23. A doffing machine for operating sequentially at successive winding stations of a multistation winding machine at each station of which a strand is wound onto a package while being traversed along the length of said package by traversing means moving back and forth along the package, said doffing machine being movable from winding station to winding station during its sequential operation, means, carried by said doffing machine, for performing at least one portion of a package doffing cycle, and means for synchronizing, at each station, the operations of said doffing machine with the movements of said traversing means at said station.

24. A doffing machine as set forth in claim 23 and in which said synchronizing means is responsive to the position of the traversing means at said station.

25. A winding apparatus comprising a multistation winding machine at each station of which a strand is wound onto a rotating package while being traversed along the length of said package by a traveler running around said package on a circular track moving back and forth along the package and to each station of which said strand is supplied continuously, the tracks of all said stations being mounted for back and forth traversing movement in unison, a doffing machine for operating sequentially at successive winding stations of said multistation winding machine, said doffing machine being movable from winding station to winding station during its sequential operation, means responsive to the movement of the track at each station for synchronizing the doffing operations at said station with the movements of the track at said station, said doffing machine having a strand takeup means having a suction head, means for moving said suction head to a position adjacent said traveler during the traversing movement of said track, means for decelerating the rotating package and the moving traveler to enable said suction head to take up continuously the strand between said traveler and said package, said decelerating means including means for braking a package driving device on said winding machine and means establishing a current of air to stop the traveler at a predetermined location adjacent said suction head, means for simultaneously establishing an air curtain directed at the reach of the strand passing to said traveler to prevent said reach from being sucked into said head, means for moving said suction head away from said traveler and towards an end of said package while said suction head continues to take up yarn and said track continues its traversing motion, means for releasing the braking of said package driving device after a time period sufficient for the removal of the wound package and its replacement by an empty package, and means for throwing the strand passing to said suction head onto said empty package to start the winding of the continuously supplied strand thereon.

26. A doffing machine for operating sequentially at successive winding stations of a multistation winding machine at each station of which a strand is wound onto a package while being traversed along the length of said package by traversing means moving back and forth along the package, said doffing machine being movable from winding station to winding station during its sequential operation, means, carried by said doffing machine, for performing at least one portion of a package doffing cycle at each station, and means for removing waste unwound strand material at each station, said removing means being operative at a station after the doffing has been performed at the latter station and the machine has moved to the next station.

27. A doffing machine for operating sequentially at successive winding stations of a multistation winding machine at each station of which a strand is wound onto a package while being traversed along the length of said package by traversing means moving back and forth along the package, said doffing machine being movable from winding station to winding station during its sequential operation, means, carried by said doffing machine, for performing at least one portion of a packing doffing cycle at each station, and means for tailing a newly started yarn package at each station, said tailing means being operative at a station after the doffing has been performed at the latter station and the machine has moved to the next station.

28. A doffing machine as set forth in claim 27, said machine being particularly adapted for use with a winding machine winding of yarn onto a flanged bobbin, said tailing means having a normally retracted nose and means for extending said nose into a position in which it is in close proximity to the rotating flange of the newly started bobbin and is in the path of rotation of a reach of the wound yarn extending from said flange.

29. A tailing device for operating sequentially at successive stations of a multistation yarn-winding machine on which the yarn is wound onto a flanged bobbin carried on a rotating spindle, said device being movable from winding station to winding station during its sequential operation and having means for bringing said device successively into registry with each of said yarn stations, a normally retracted nose, and means for extending said nose into the path of rotation of a reach of the wound yarn extending from a flange of a freshly started bobbin at a winding station when said device is in registry with the latter station.

30. A tailing device as set forth in claim 29 and having means responsive to the respective positions of the bobbin flanges at successive winding stations and operatively associated with said nose for bringing said nose into predetermined relationship to the respective flange when said nose is extended into the path of said reach.

31. A tailing device as set forth in claim 30, said flange position responsive means including a cam surface moving with said nose and adapted to be engaged and deflected by said flange during the movement of said nose from its retracted position.

32. A tailing device as set forth in claim 30 and including means operatively connected to said nose for engaging said spindle to clean the same when said nose is extended.

33. A tailing device as set forth in claim 29, said nose being resiliently mounted so that it can be deflected out of its extended position on contact with a yarn traversing element of said latter winding machine at said latter station.

34. A spindle cleaning device for operating sequentially at successive stations of a multistation yarn winding machine having stations at which yarn is wound onto a package carried on a rotating spindle, said device being movable from winding station to winding station during its sequential operation and having means for bringing said device successively into registry with each of said yarn stations, a normally retracted spindle cleaner, and means for extending said spindle cleaner into close proximity to a portion of a rotating spindle adjacent to a yarn package at a winding station when said device is in registry with the latter station.

35. A spindle cleaning device as set forth in claim 34 and comprising a brush adapted to be brought into contact with said portion of the rotating spindle when the cleaner is extended, a vacuum head adjacent to said brush for sucking up the debris removed from said spindle by said brush, and means responsive to the respective positions of the yarn packages at successive winding stations and operatively associated with said brush for bringing said brush into predetermined relationship to the respective package when said cleaner is extended.

36. A winding apparatus comprising a multi-station winding machine having aligned winding stations at each of which a strand is wound onto a package while being traversed along the length of said package by a traverse guide moving back and forth along the package, a doffing machine for operating sequentially at successive winding stations of said multistation winding machine, said doffing machine being movable from winding station to winding station during its sequential operation, means for bringing said doffing machine into registry with successive winding stations, means on said doffing machine for performing at least a portion of a package doffing cycle, said doff-performing means being movable from a retracted inoperative position clear of said winding machine to an extended operative position, and means for moving said doff-performing means to extended position when said doffing machine is in registry with a winding station and for moving said doff-performing means to retracted position prior to substantial movement of said doffing machine toward the next winding station, the construction and arrangement being such that the back and forth movement of the traverse guide is uninterrupted during the doffing.

37. A winding apparatus comprising a multistation winding machine having aligned winding stations at each of which a strand is wound onto a package while being traversed along the length of said package by a traverse guide moving back and forth along the package, a doffing machine for operating sequentially at successive winding stations of said multistation winding machine, said doffing machine being movable from winding station to winding station during its sequential operation, means for bringing said doffing machine into registry with successive winding stations, means on said doffing machine for performing at least a portion of a package doffing cycle, means for driving said doffing machine from one winding station to the next and comprising two wheels for engaging a floor adjacent to said winding machine, a hydraulic motor for each of said wheels, a hydraulic pump for driving hydraulic fluid to said motors at a predetermined speed, and connections between said pump and said motors so arranged that said fluid passes through said motors in series.

38. Apparatus as set forth in claim 37 and comprising means responsive to the position of said doffing machine in relation to a winding station for discontinuing supply of hydraulic fluid to said motors when said doffing machine is approximately in registry with the latter winding station.

39. A winding apparatus comprising a multi-station winding machine having aligned winding stations at each of which a strand is wound onto a package while being traversed along the length of said package by a traverse guide moving back and forth along the package, a doffing machine for operating sequentially at successive winding stations of said multi-station winding machine, said doffing machine being movable from winding station to winding station during its sequential operation, means for bringing said doffing machine into registry with successive winding stations, means on said doffing machine for performing at least a portion of a package doffing cycle, means on said doffing machine for driving said doffing machine from one winding station to the next, said driving means including a drive wheel on which said doffing machine is supported, means responsive to the approach of said doffing machine to approximate registry with the winding station for inactivating said drive wheel, and means on said doffing machine separate from said drive wheel and co-acting with indexing means on said winding machine for forcing said doffing machine into exact registry with the latter winding stations, said separate means and indexing means co-acting to move said doffing machine in a direction along the line of travel of said doffing machines from one winding station to the next and in a direction to said line of travel.

40. A winding apparatus comprising a multi-station winding machine having aligned winding stations at each of which a strand is wound onto a package while being traversed along the length of said package by a traverse guide moving back and forth along the package, a doffing machine for operating sequentially at successive winding stations of said multi-station winding machine, said doffing machine being movable from winding station to winding station during its sequential operation, means for bringing said doffing machine into registry with successive winding stations, means on said doffing machine for performing at least a portion of a package doffing cycle, means on said doffing machine for driving said doffing machine from one winding station to the next, said driving means including a drive wheel, a hydraulic motor for said drive wheel and a hydraulic pump for supplying hydraulic fluid to said motor to drive said motor, and means, responsive to the approach of said doffing machine to approximate registry with a winding station for gradually decreasing the flow of said fluid to said motor.

41. A winding apparatus as set forth in claim 39 and comprising means on said doffing machine for substituting a non-rolling firm support for the rolling drive wheel support when said machine is placed in exact registry with the latter winding station.

42. A winding apparatus comprising a multi-station winding machine having aligned winding stations at each of which a strand is wound onto a package while being traversed along the length of said package by a traverse guide moving back and forth along the package, a doffing machine for operating sequentially at successive winding stations of said multi-station winding machine, said doffing machine being movable from winding station to winding station during its sequential operation, means for bringing said doffing machine into registry with successive winding stations, means on said doffing machine for performing at least a portion of a package doffing cycle, means on said doffing machine for driving said doffing machine from one winding station to the next, said driving means including a drive wheel on which said doffing machine is supported, means on said doffing machine separate from said drive wheel and coacting with indexing means on said winding machine for forcing said doffing machine into exact registry with the latter winding station and for substituting a non-rolling firm support for the rolling drive wheel support when said machine is placed in exact registry with the latter winding station.

43. A winding apparatus comprising a multi-station winding machine having aligned winding stations at each of which a strand is wound onto a package while being traversed along the length of said package by a traverse guide moving back and forth along the package, a doffing machine for operating sequentially at successive winding stations of said multi-station winding machine, said doffing machine being movable from winding station to winding station during its sequential operation, means for bringing said doffing machine into registry with successive winding stations, means on said doffing machine for performing at least a portion of a package doffing cycle, a track along said winding machine, supporting wheels on said doffing machine so that it can roll from one winding position to the next, said wheels including a wheel engaging said track and another wheel spaced further from said winding machine than said track-engaging wheel, means for driving said doffing machine to cause it to roll along said track, and means for raising the portion of the doffing machine remote from said winding station to tip an upper portion of said doffing machine towards a winding station when said winding machine is in registry with the latter winding station.

44. Apparatus as set forth in claim 43 in which the raising means comprises a jack having a supporting foot adapted to support said remote portion of the doffing machine and to decrease the weight of said machine resting on said other wheel, and means, responsive to the position of said doffing machine in relation to said station, for operating said jack, said winding station and said doffing machine having abutment means adapted to be brought into contact when said tipping occurs, to facilitate accurate positioning of said doffing machine with respect to said station.

45. A winding apparatus comprising a multi-station winding machine having ring spinner winding stations, at each of which a strand is wound onto a package while being traversed along the length of the package by a ring moving back and forth along the package, said strand being fed from a stationary guide mounted, on a movable support, within an imaginary cylinder formed by projecting said package along its axis, a doffing machine for operating sequentially at successive winding stations of said winding machine, said doffing machine being movable from winding station to winding station during its sequential operation, and means for effecting a movement of said guide support to displace said guide from said imaginary cylinder and permit axial movement of said package out of said ring without interference from said guide, said last-named means being movable from a retracted inoperative position on said doffing machine to an extended operative position when said doffing machine is in registry with a winding station.

46. A winding apparatus comprising a multi-station winding machine having ring spinner winding stations, at each of which a strand is wound onto a package while being traversed along the length of the package by a ring moving back and forth along the package, said strand being fed from a stationary guide mounted, on a movable support, within an imaginary cylinder formed by projecting said package along its axis, a doffing machine for operating sequentially at successive winding stations of said winding machine, said doffing machine being movable from winding station to winding station during its sequential operation, and means for effecting a movement of said guide support to displace said guide from said imaginary cylinder and permit axial movement of said package out of said ring, without interference from said guide, during the operation of said doffing machine, said last-named means operating while said ring continues its back and forth motion.

47. A winding apparatus as set forth in claim 45, in which said stationary guide is a balloon guide mounted on a lever normally extending into said imaginary cylinder, said lever being swingable to a new position outside said cylinder, said apparatus having means for continuously supplying yarn to said balloon guide and having on said ring a traveler for receiving the strand from the balloon guide, means for halting the traveler at a point on said ring remote from said balloon guide, the straight line path of the strand from the balloon guide to the stopped traveler passing through said cylinder, and means for deflecting the strand from said straight line path to bring it outside said cylinder.

48. A winding apparatus as set forth in claim 47 and including an arm movable through said cylinder to swing said lever from its normal position to said new position, said arm being laterally movable out of said cylinder to deflect said strand from said straight line path.

49. A winding apparatus comprising two multi-station winding machines having an aisle between them, each of said multi-station winding machines having aligned winding stations at each of which a strand is wound around an individual central support to form a wound strand package, a storage mounting for said supports, a doffing machine for operating sequentially at successive winding stations of said multi-station winding machine, said doffing machine being movable from winding station to winding station during the sequential operation, said doffing machine having means for engaging a wound strand package at a winding station and conveying said wound package, while so engaged, to said storage mounting and for engaging an unwound central support at said storage mounting and conveying said unwound central support while still engaged, through the winding station vacated by the removal of the last-mentioned wound package, said doffing machine being movable in straight path in said aisle and operable on a winding machine on only one side of said path at any given time, said storage mounting extending parallel to said aisle on the other side of said path.

50. A winding apparatus comprising a multi-station winding machine having aligned winding stations at each of which a strand is wound around an individual central support to form a strand package, a series of spaced individual storage mountings for said individual central supports, and means for successively removing wound central supports from winding stations and placing said wound supports at said individual storage mountings and removing unwound central supports from said storage mountings and placing them at said winding stations for the winding of strands thereon, said series of individual storage mountings comprising a row of vertical pins for receiving said central supports and extending parallel to said multi-station winding machine, said row and said winding machine being disposed so as to form an aisle for the passage of said doffing machine.

51. A doffing machine for operating sequentially at successive winding stations of a multistation winding machine at each station of which a strand is wound onto a package while being traversed along the length of said package by traversing means moving back and forth along the package, said doffing machine being movable from winding station to winding station during its sequential operation, means, carried by said doffing machine, for removing a wound package from a winding station, without interrupting the back and forth movement of the traverse guide, when said doffing machine is in registry with said winding station.

52. A doffing machine as set forth in claim 51 and including means for synchronizing the operation of said removing means with the position of the traversing means at said station so that the removal of said package occurs at a predetermined stage in the back and forth cycle of movement of said traversing means.

53. A doffing machine for operating sequentially at successive winding stations of a multistation winding machine at each station of which a strand is wound onto a package while being traversed along the length of said package by traversing means moving back and forth along the package, said doffing machine being movable from winding station to winding station during its sequential operation, means, carried by said doffing machine, for operating said doffing machine including a driven hydraulic pump for supplying hydraulic liquid under pressure to drive doffing mechanisms of said doffing machine, means on said doffing machine for removing a wound strand package from a winding station with which said machine is in registry, said removing means including means, movable to a zone above said package, for engaging said package, and pneumatically actuated means for operating said package-engaging means, and means on said doffing machine for supplying compressed air to said pneumatically actuated means.

54. A doffing machine as set forth in claim 53 and including an air compressor operated by said hydraulic liquid under pressure, the construction and arrangement being such that hydraulic liquid is not admitted to the zone above said package.

55. A winding apparatus comprising a multi-station winding machine having aligned winding stations at each of which a strand is wound around an individual central support to form a wound strand package, a storage mounting for said supports, a doffing machine for operating sequentially at successive winding stations of said multi-station winding machine, said doffing machine being movable from winding station to winding station during its sequential operation, said doffing machine having means for engaging a wound strand package at a winding station and conveying said wound package, while so engaged, to said storage mounting and for engaging an unwound central support at said storage mounting and conveying said unwound central support, while engaged, to the winding station vacated by the removal of the last-mentioned wound package, said package engaging means being constructed and arranged to support said package axially from the free end of said package and including aligning means enterable into an aperture in said free end during the movement of said package engaging means toward its package-engaging position, and a yieldable support for said package-engaging means to enable said package-engaging means to accomodate its position into registry with said package by co-operable engagement of said aligning means and the wall of said aperture, despite minor differences in the alignment of said winding stations.

56. A doffing machine for operating sequentially at successive winding stations of a multistation winding machine at each station of which a strand is wound onto a package, said doffing machine being movable from winding station to winding station during its sequential operation, means, carried by said doffing machine, for successively engaging wound packages at said winding stations and for removing said packages from said winding stations, said means being constructed and arranged to approach said packages axially from their free ends, and including aligning means enterable into an aperture in said free end of a package to be removed during the movement of said package-engaging means toward its package-engaging position, and a yieldable support for said package engaging means to enable said package engaging means to accommodate its position into registry with said package by cooperable engagement of said aligning means and the wall of said aperture despite minor differences in the alignment of said winding stations.

57. A doffing machine for operating sequentially at successive winding stations of a multi-station winding machine at each station of which a strand is wound onto a package, on a central core, said doffing machine being movable from winding station to winding station during its sequential operation, means, carried by said doffing machine, for effecting a doffing cycle including the removal of wound packages at said winding stations and replacement of said packages with unwound central cores for the winding of strands thereon, said doffing machine having means, responsive to the sticking of a package at a winding station, for altering said doffing cycle, said sticking-responsive means being effective to cause the stuck package to remain at said winding station and to discontinue the supply of the strand to the stuck package.

58. A doffing machine for operating sequentially at a plurality of winding stations of a multistation winding machine, at each station of which a plurality of strands is wound onto a corresponding plurality of packages, said doffing machine being movable from winding station to winding station during its sequential operation and including means for effecting a doffing cycle including the removal of said plurality of packages at each of said stations and replacement of said plurality of packages with a corresponding plurality of unwound central cores for the winding of strands thereon, said doffing machine having means responsive to the sticking of one of said plurality of packages at said winding station for altering said doffing cycle to cause all of the wound packages of said plurality to remain at said winding station.

59. A doffing machine for operating sequentially at successive winding stations of a multi-station winding machine at each station of which a strand is wound onto a package, on a central core, said doffing machine being movable from winding station to winding station during its sequential operation, means, carried by said doffing machine, for effecting a doffing cycle, including removal of wound packages at said winding stations and replacement of said packages with unwound central cores for the winding of strands thereon, said doffing machine having means, responsive to the sticking of a package at a winding station, for altering said doffing cycle, means for engaging a wound package at its winding station and moving to remove said wound package from that station but releasing said package without such removal when the resistance of said package to such removal exceeds a predetermined value and means for sensing such release of the package, said responsive means being responsive to said sensing means.

60. A doffing machine as set forth in claim 59, in which said engaging means resiliently and releasably engages said package and said sensing means includes an element movably mounted with respect to said engaging means and in contact with said package when said package is engaged by said engaging means and remaining in contact with said package when the removal-resistant package is released by said engaging means.

61. A doffing machine as set forth in claim 60, and in which said engaging and removing means includes jaws for engaging said package, pneumatic means for resiliently and releasably pressing said jaws against said package, a movable support for said jaws, means for moving said support to a position where said jaws can engage said package at its winding station and after moving said support in a direction to remove the package engaged by said jaws from its winding station, said support continuing in the direction of its removing movement after the release of said jaws of a removal-resistant package, said element being movably mounted on said support.

62. A doffing machine as set forth in claim 60 in which said package has a hollow central core and said element is slidably mounted on said movable means and is located to enter the hollow of said central core, said element having a portion sized to enter said hollow and a portion sized to engage said package and limit the movement of the element into said hollow.

63. A doffing machine as set forth in claim 60 in which said package has a hollow central core and said element is slidably mounted on said movable means and is located to enter the hollow of said central core during the movement of said support to said position, said element having a portion sized to enter said hollow and a portion sized to engage said package and limit the movement of the element into said hollow, the end of said hollow-entering portion of said element being tapered for engaging a side of said hollow at the entrance to said hollow when said element is not in exact alignment with said hollow, said support being yieldably mounted to effect, in response to such element-to-side engagement, an alignment of said element with said hollow and a corresponding alignment of said jaws and said package.

64. A doffing machine as set forth in claim 58, in which said means for effecting a doffing cycle includes means for removing said packages from said stations, said removing means including a plurality of devices, each adapted to grip one said plurality of packages, a pneumatic actuator for each of said devices, means for supplying compressed air to said actuators in a direction to cause said devices to grip said packages at the time in the doffing cycle when said packages are to be removed, and means, controlled by said sticking-responsive means, for discontinuing said supply of compressed air to thereby release said packages from said devices.

65. A doffing machine for operating sequentially at successive winding stations of a multi-station winding machine at each station of which a strand is wound onto a package while being traversed along the length of said package by traversing means moving back and forth along the package, said doffing machine being movable from winding station to winding station during its sequential operation, means, carried by said doffing machine, for performing at least one portion of a package doffing cycle at each station, and means for tailing a newly started yarn package at each station, said tailing means being operative at a station after the doffing means has been performed at the latter station, and the machine has moved to the next station and means responsive to the sticking of a wound package at a winding station for preventing operation of said tailing means at the station at which said package has stuck.

66. A winding apparatus comprising a multi-station winding machine having aligned winding stations at each of which a strand is wound around an individual central support to form a wound strand package, a storage mounting for said supports, a doffing machine for operating sequentially at successive winding stations of said multi-station winding machine, said doffing machine being movable from winding station to winding station during its sequential operation, said doffing machine having means for engaging a wound strand package at a winding station and conveying said wound package, while still engaged, to said storage mounting and for engaging an unwound central support at said storage mounting and conveying said unwound central support while still engaged, to the winding station vacated by the removal of the last-mentioned wound package, said doffing machine having means, responsive to the sticking of an unwound central support at said storage mounting, for altering said doffing cycle.

References Cited

UNITED STATES PATENTS

| | | | |
|---|---|---|---|
| 594,347 | 11/1897 | Foster | 57—119 |
| 2,449,742 | 9/1948 | Foster et al. | 57—53 |
| 2,601,386 | 6/1952 | Gregory et al. | 57—53 |
| 2,628,468 | 2/1953 | Greene | 57—52 |
| 3,128,590 | 4/1964 | Escursell-Prat | 57—34.5 X |
| 3,132,463 | 5/1964 | Glastra et al. | 57—52 |
| 3,300,960 | 1/1967 | Banks et al. | 57—53 |

FOREIGN PATENTS

| | | |
|---|---|---|
| 908,981 | 10/1962 | Great Britain. |

FRANK J. COHEN, *Primary Examiner.*

UNITED STATES PATENT OFFICE
CERTIFICATE OF CORRECTION

Patent No. 3,374,616                                                    March 26, 1968

William P. Hidden et al.

It is hereby certified that error appears in the above numbered patent requiring correction and that the said Letters Patent should read as corrected below.

Column 1, line 16, "operaion" should read -- operation --. Column 3, lines 3 and 4, after "mechanism" insert -- of the doffing machine, the doff-readying mechanism --. Column 5, line 66, "(not shown" should read -- (not shown) --. Column 7, line 30, "ned of arod" should read -- end of a rod --. Column 8, line 70, "accomplishes" should read -- accomplished --. Column 11, line 6, "upwardly" should read -- upward --. Column 14, line 11, "276" should read -- 376 --; line 26, "and" should read -- the --. Column 16, line 49, "gain" should read -- again --. Column 18, line 32, "trailing" should read -- tailing --; line 71, "asile" should read -- aisle --. Column 19, line 7, "pulses" should read -- pushes --; line 9, "regulated" should read -- regulatable --.

Signed and sealed this 9th day of September 1969.

(SEAL)
Attest:

EDWARD M. FLETCHER, JR.                          WILLIAM E. SCHUYLER, JR.
Attesting Officer                                         Commissioner of Patents